(12) United States Patent  
Hirayama et al.

(10) Patent No.: US 8,011,711 B2
(45) Date of Patent: Sep. 6, 2011

(54) TONNEAU COVER DEVICE FOR VEHICLE

(75) Inventors: Isao Hirayama, Hiroshima (JP);
Noriaki Haba, Hiroshima (JP);
Tomoatsu Tani, Settsu (JP)

(73) Assignees: Mazda Motor Corporation, Hiroshima (JP); Ashimori Industry Co., Ltd., Osaka (JP)

( * ) Notice: Subject to any disclaimer, the term of this patent is extended or adjusted under 35 U.S.C. 154(b) by 0 days.

(21) Appl. No.: 12/230,503

(22) Filed: Aug. 29, 2008

(65) Prior Publication Data

US 2009/0058128 A1 Mar. 5, 2009

(30) Foreign Application Priority Data

Sep. 3, 2007 (JP) ................................. 2007-227639
Sep. 10, 2007 (JP) ................................. 2007-233970
Sep. 10, 2007 (JP) ................................. 2007-234040

(51) Int. Cl.
*B60J 11/06* (2006.01)
(52) U.S. Cl. ............... 296/24.43; 296/37.16; 296/136.03
(58) Field of Classification Search .................... 296/98, 296/146.8, 106, 76, 136.01, 136.04, 136.1, 296/24.43, 37.16; 160/23.1, 24, 30, 370, 160/370.22; 224/542
See application file for complete search history.

(56) References Cited

U.S. PATENT DOCUMENTS

| | | | | |
|---|---|---|---|---|
| 5,224,748 A | * | 7/1993 | Decker et al. | 296/37.16 |
| 6,349,986 B1 | * | 2/2002 | Seel et al. | 296/37.16 |
| 6,402,217 B1 | | 6/2002 | Ament et al. | |
| 6,773,046 B2 | * | 8/2004 | Nakamitsu et al. | 296/37.16 |
| 7,021,692 B2 | * | 4/2006 | Laudenbach et al. | 296/76 |
| 7,207,613 B2 | * | 4/2007 | Walter et al. | 296/24.4 |
| 2006/0208518 A1 | * | 9/2006 | Ament et al. | 296/37.16 |
| 2007/0120391 A1 | * | 5/2007 | Hori et al. | 296/100.15 |
| 2007/0182190 A1 | * | 8/2007 | Walter et al. | 296/37.16 |

FOREIGN PATENT DOCUMENTS

| | | | |
|---|---|---|---|
| JP | 2001-233135 | | 8/2001 |
| JP | 2003025919 A | * | 1/2003 |
| JP | 2005231517 A | * | 9/2005 |

* cited by examiner

*Primary Examiner* — Glenn Dayoan
*Assistant Examiner* — SunSurraye Westbrook

(57) ABSTRACT

In a tonneau cover device for a vehicle, an interlocking mechanism (interlocking means) 40 comprises a pair of pulleys 45, 46 disposed separated in a vertical direction at each of the left and right sides of a cargo compartment, a first linking wire 51 wrapped around the pulleys 45, 46 and connected to the rear end of a tonneau cover, a rotary member 50 whereabout the first linking wire 51 is wrapped or wound between the pulleys 45, 46, and a second linking wire 53 having an end thereof connected to the back door, another end thereof wrapped around and engaged with the rotary member 50, and rotating the rotary member 50 interlocked with opening and closing of the back door.

17 Claims, 42 Drawing Sheets

FRONT OF VEHICLE

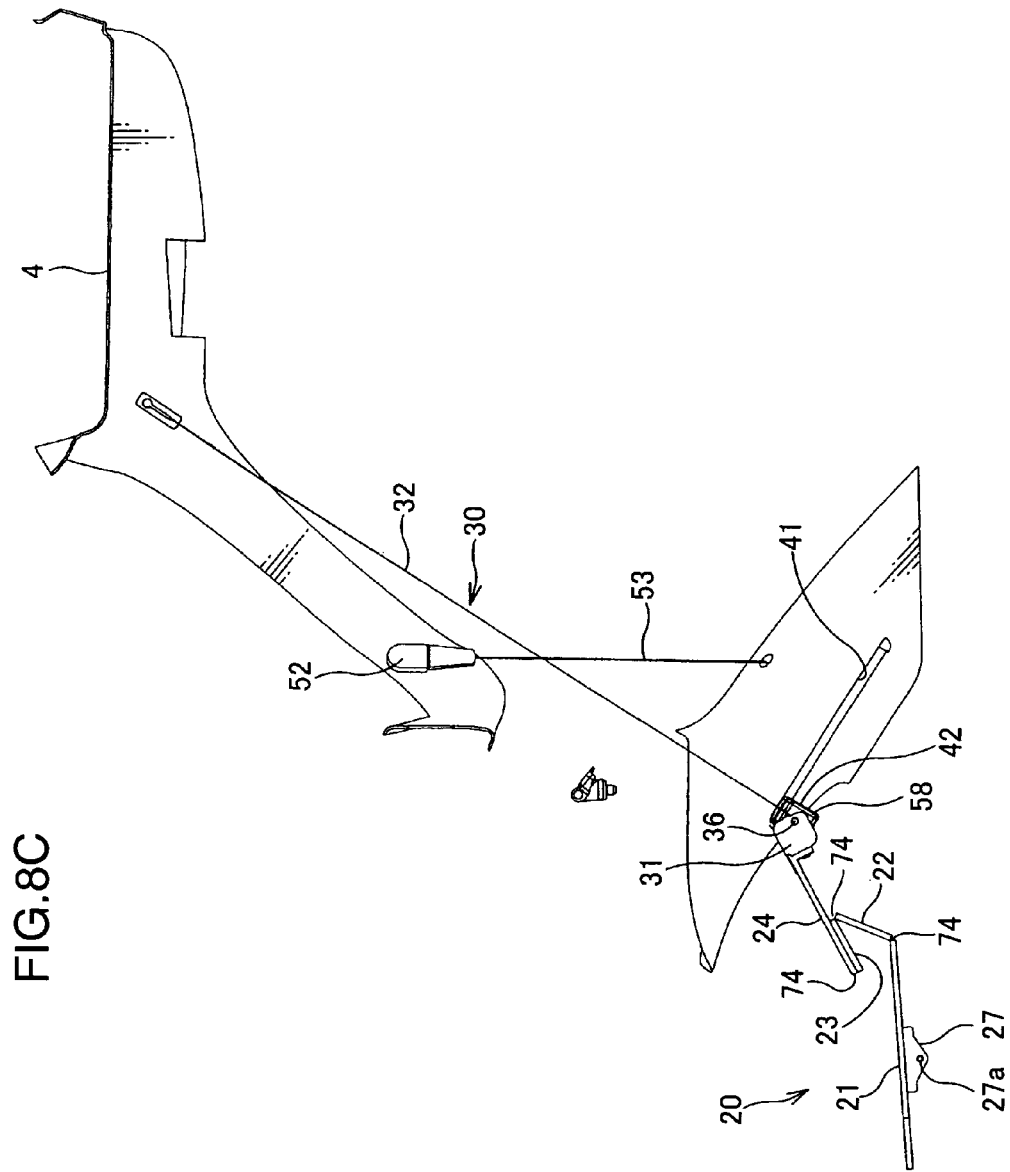

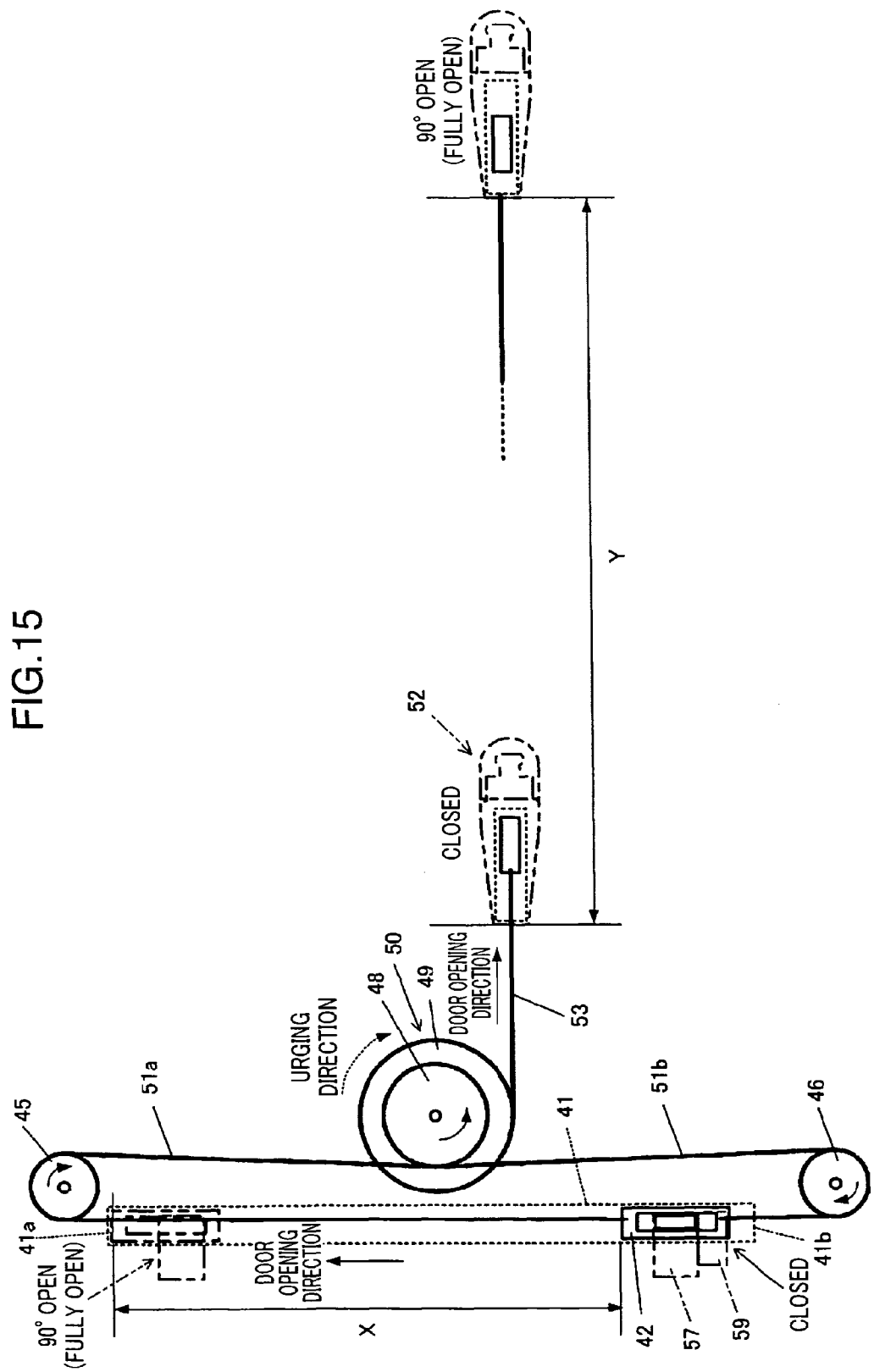

PRESCRIBED ANGLE ±0°

PRESCRIBED ANGLE +5°

PRESCRIBED ANGLE +5° OR MORE

PRESCRIBED ANGLE −5° OR LESS

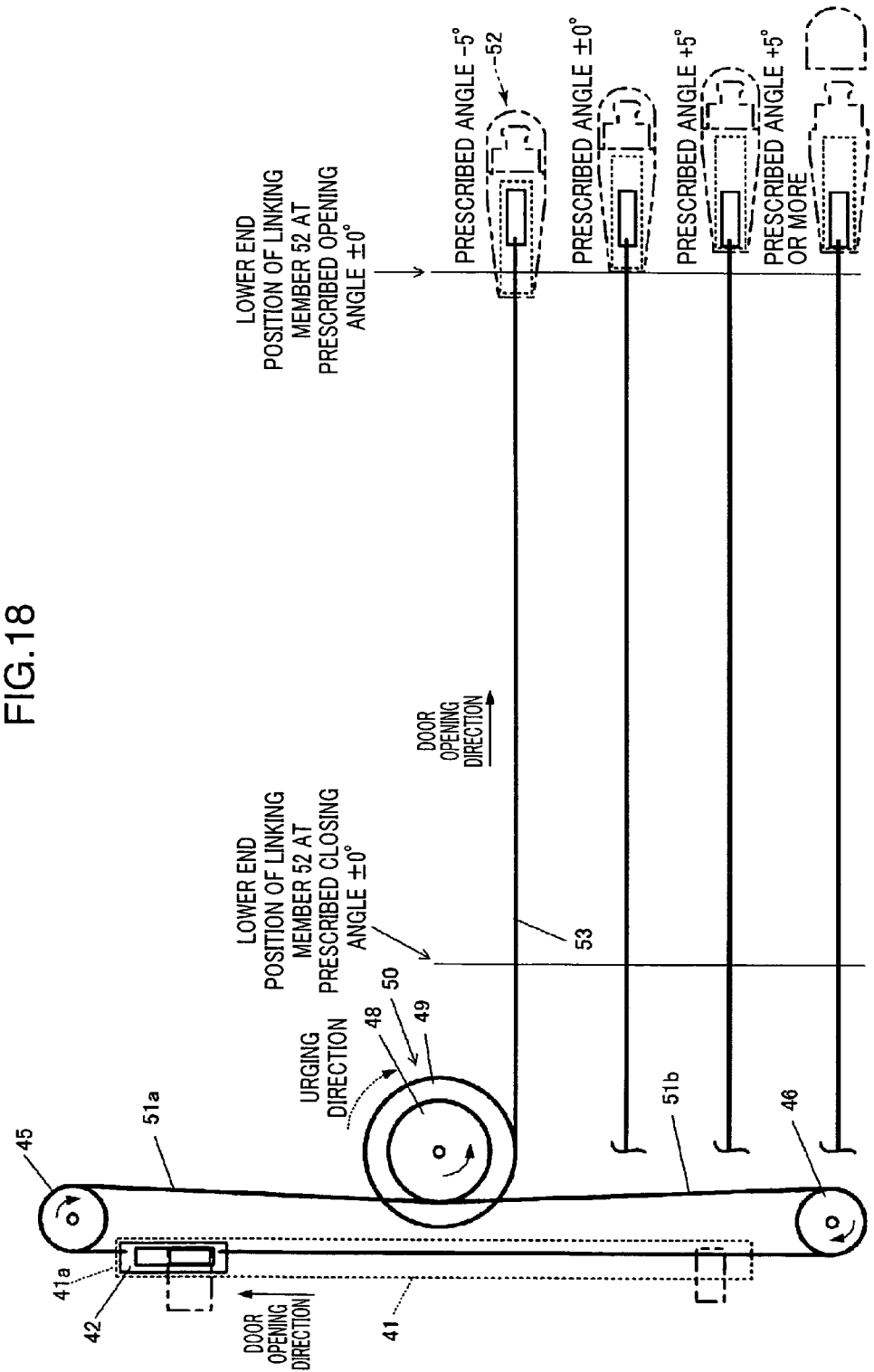

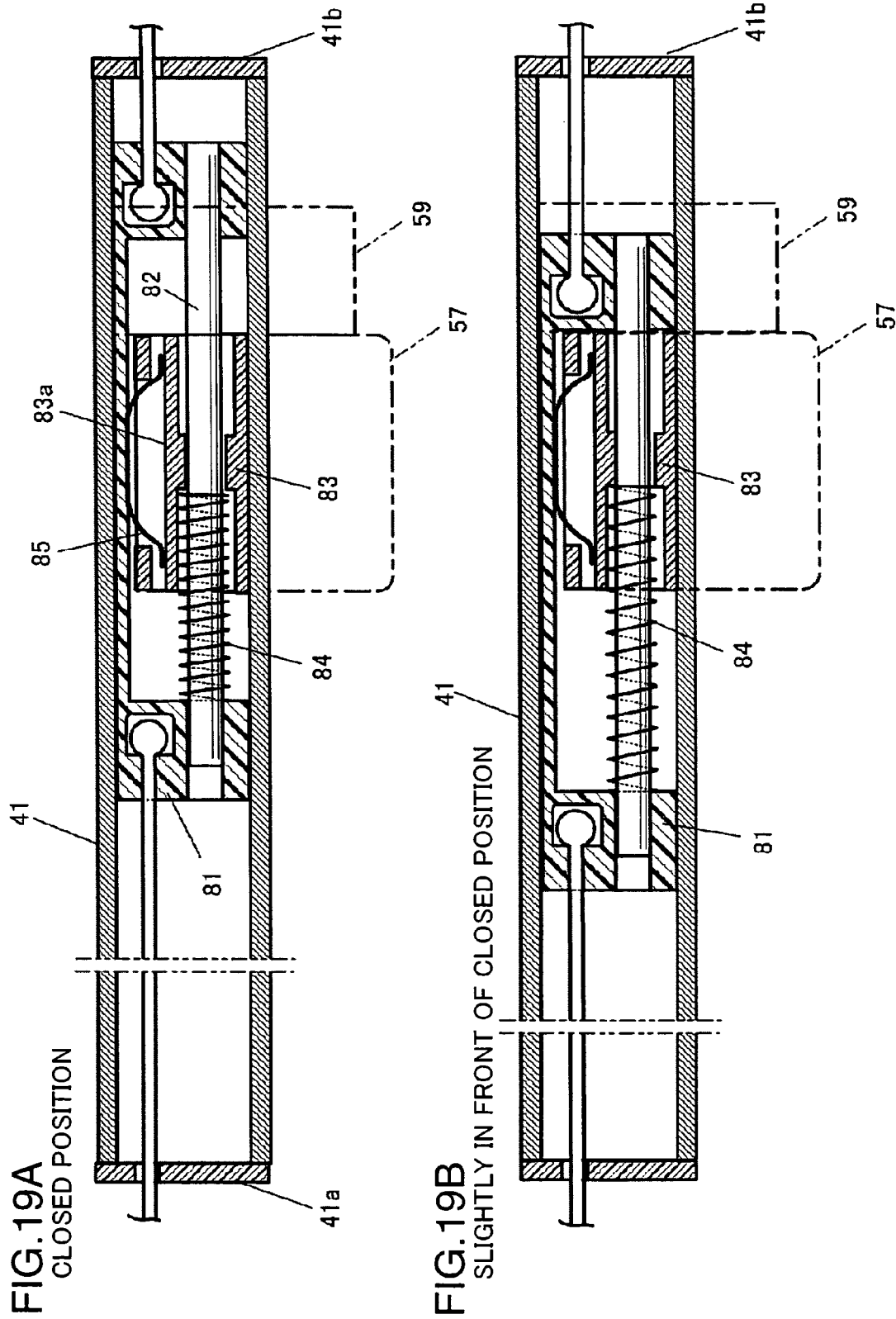

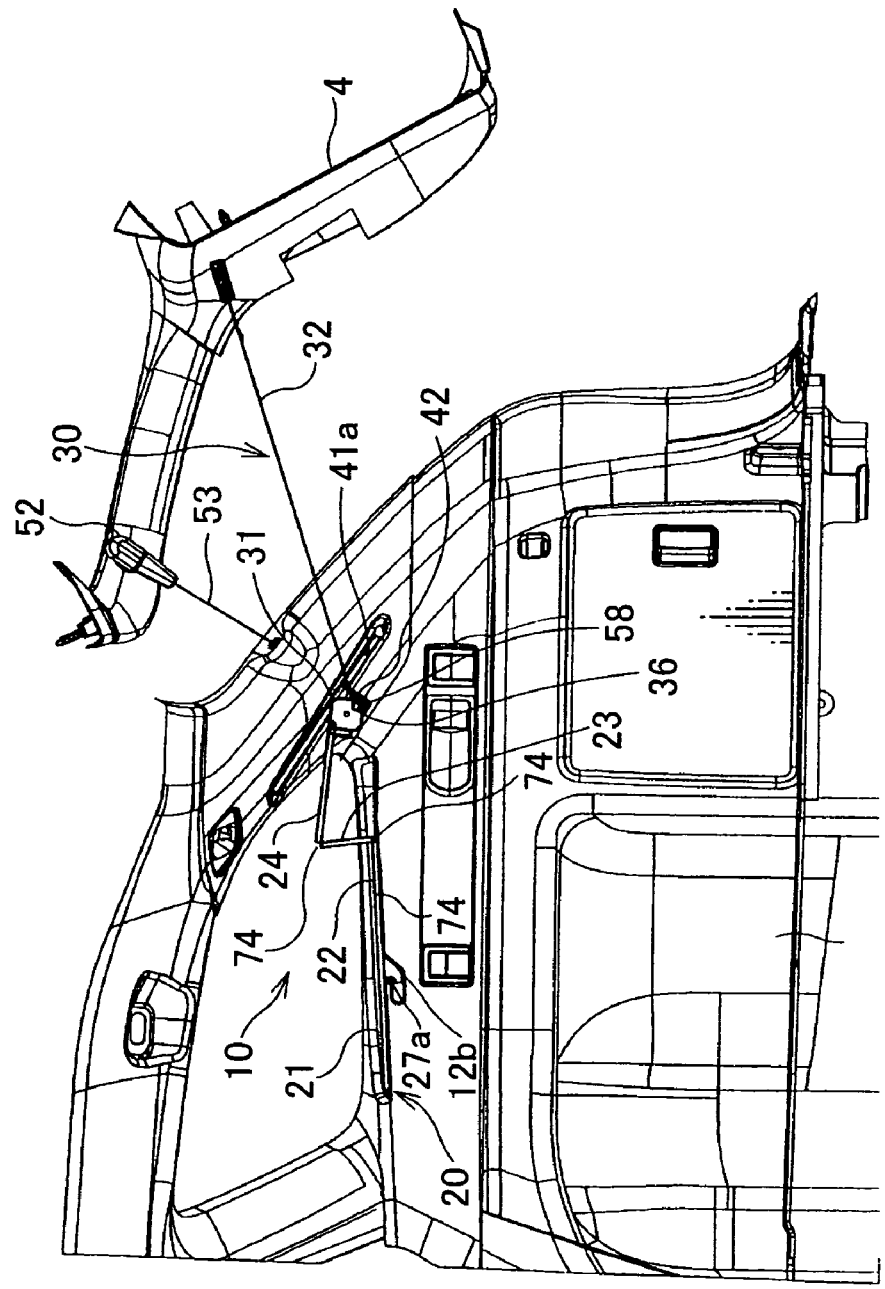

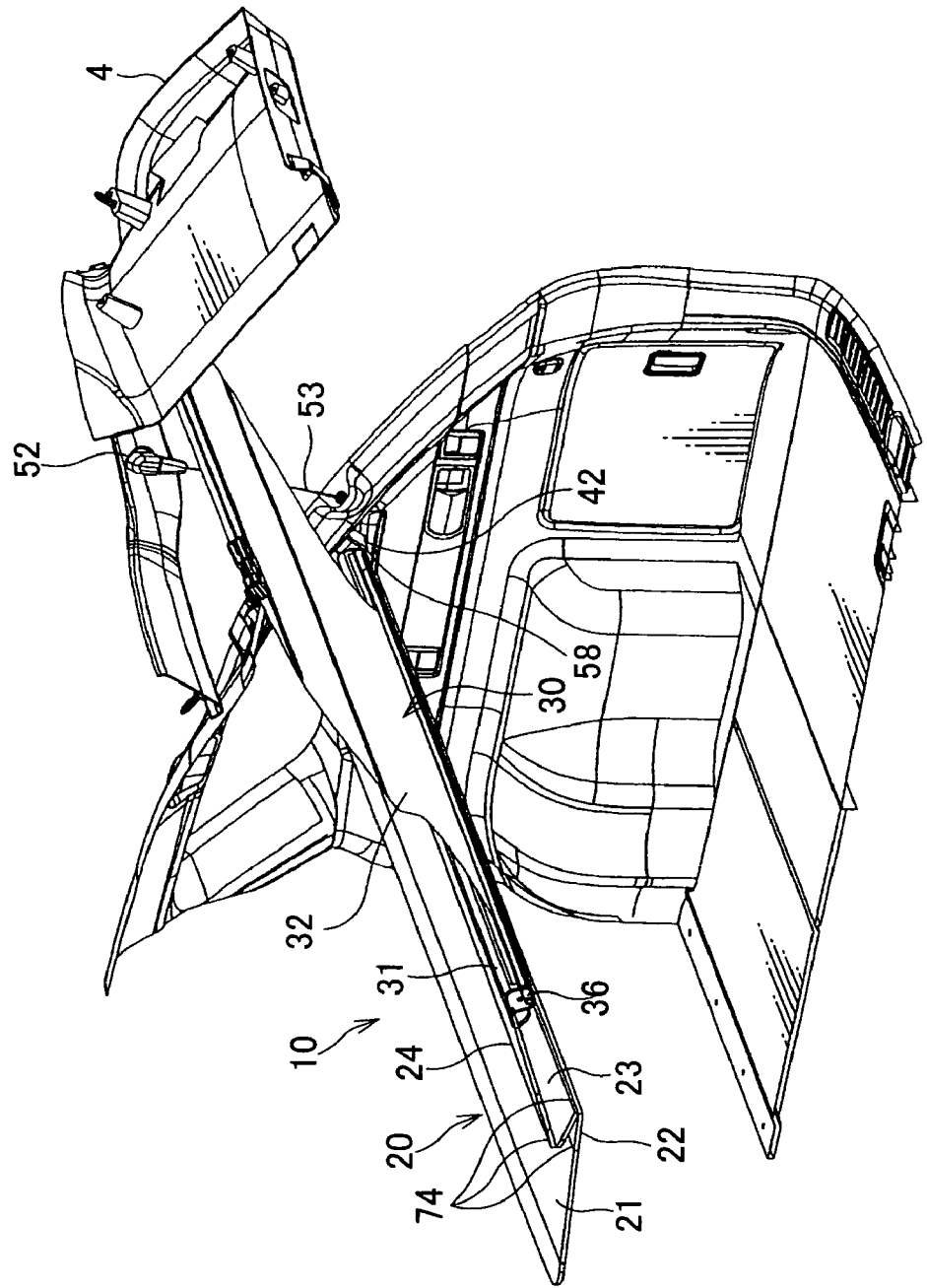

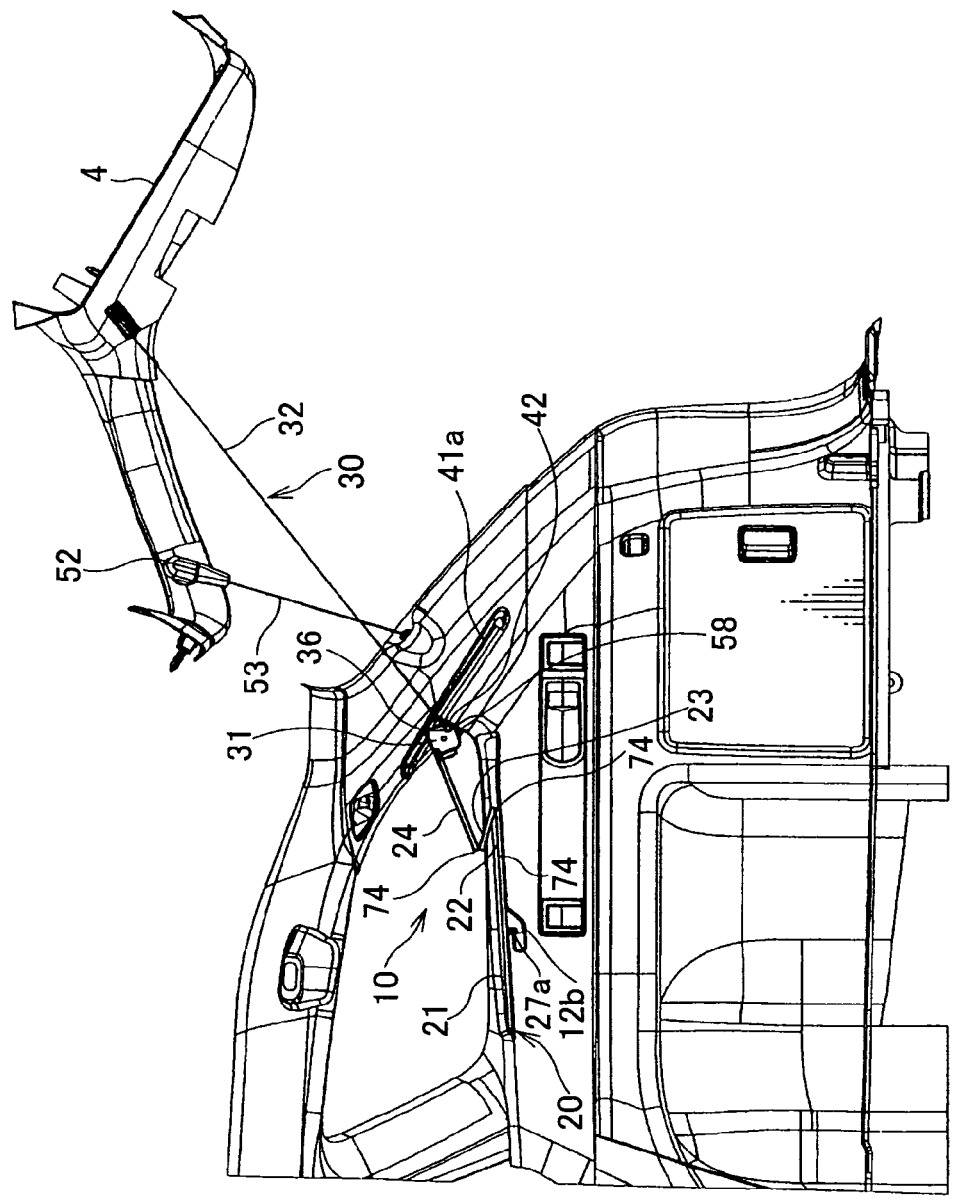

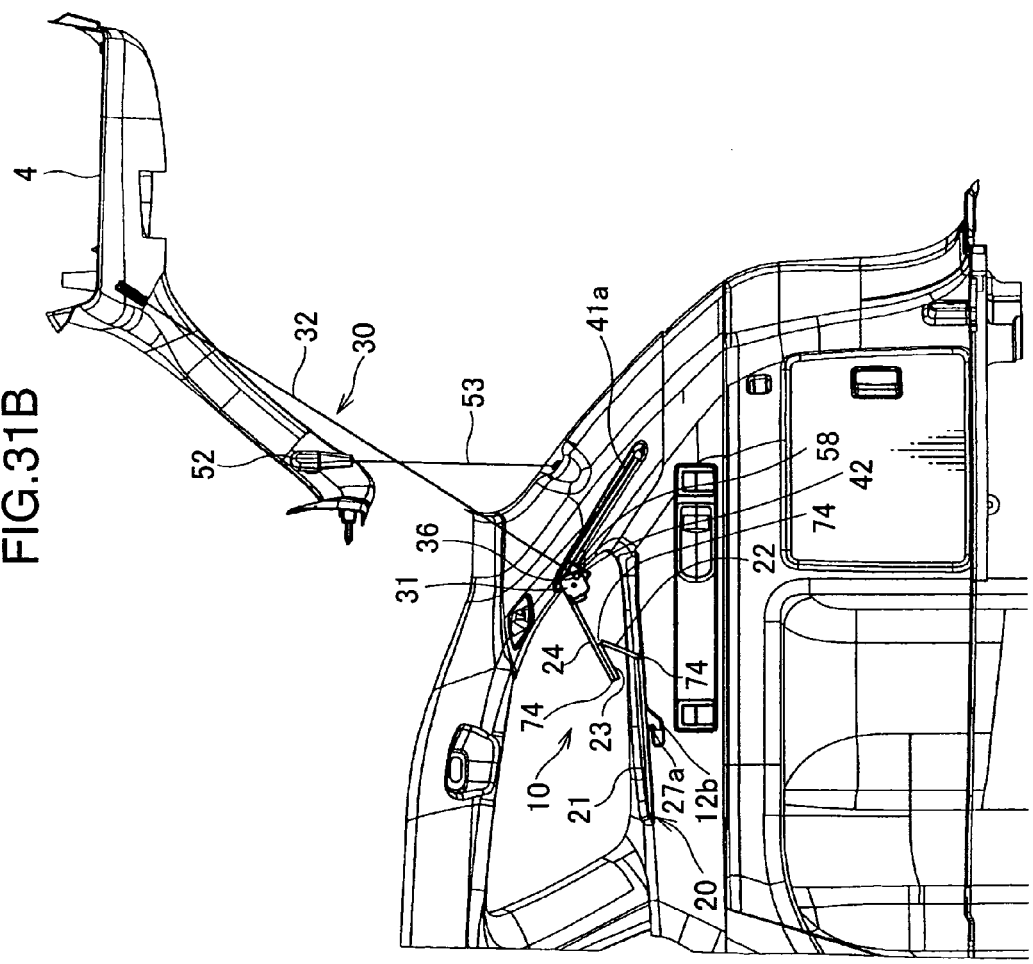

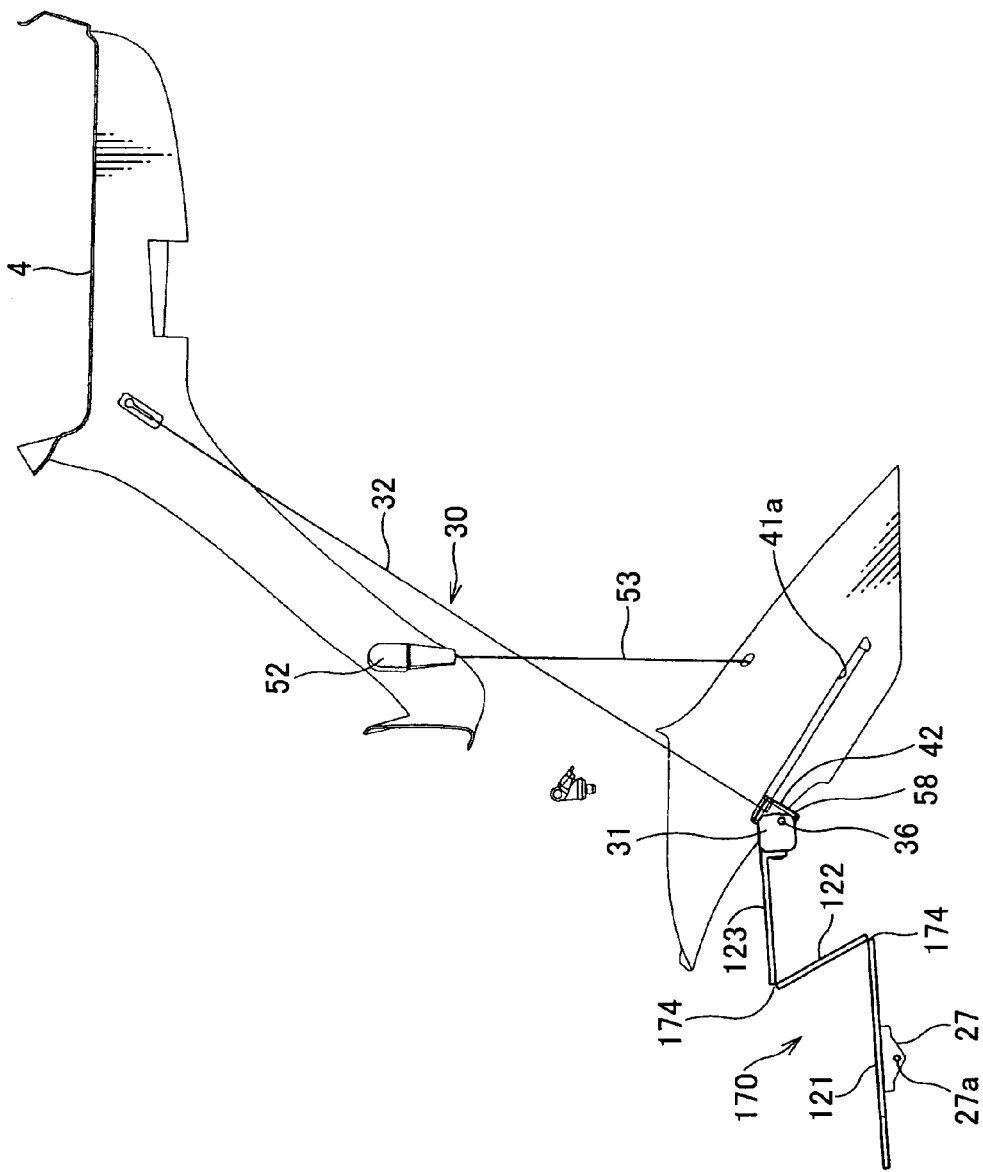

TONNEAU COVER DEVICE FOR VEHICLE

BACKGROUND OF THE INVENTION

1. Field of the Invention

The present invention relates to a tonneau cover device for a vehicle having an interlocking means moving a rear end thereof in a substantially vertical direction above a cargo compartment floor of a rear section of a chassis interlocked with opening and closing of a back door, which belongs to the technical field of interior fittings of a vehicle.

2. Description of the Related Art

A cargo compartment floor is provided at a rear section of a chassis, and in certain cases, an opening section for loading and unloading cargo, etc. onto and from the cargo compartment floor and a back door covering the opening section and capable of opening and closing are provided at a rear face of the chassis.

In such a vehicle, a tonneau cover device capable of being deployed substantially horizontally above the cargo compartment floor can be provided in order to prevent cargo having been placed on the cargo compartment floor from being viewed from outside the vehicle via a rear section window, etc.

For example, devices comprising guide rails mounted at a rear end thereof on side-section inner surfaces at the left and right of the chassis, a slider supported by each guide rail so as to be capable of sliding, a tonneau cover having a front end supported by the side-section inner surfaces at the left and right of the chassis and a rear end supported by the sliders, and connecting members connecting the back door and the sliders, and configured so as to turn such that, when the back door opens, the rear end of the tonneau cover moves upwards due to the slider being moved in an upward direction via the connecting member, and when the back door closes, the rear end of the tonneau cover moves downwards due to the slider being moved in a downward direction via the connecting member have been disclosed as this type of tonneau cover device (for example, see U.S. Pat. No. 6,402,217). With such a device, a raising operation of the tonneau cover is unnecessary upon loading and unloading cargo, etc. onto and from the cargo compartment floor, thus improving convenience.

It should be noted that, as the tonneau cover device of U.S. Pat. No. 6,402,217 is configured such that the sliders are moved directly upwards and downwards by the connecting members interlocked with opening and closing of the back door, a degree of opening and closing of the back door is limited by a position of the sliders and a degree by which the sliders can move upwards and downwards, etc., and this is also manifested in restricted vehicle-design freedom.

SUMMARY OF THE INVENTION

It is an object of the present invention to provide a tonneau cover device for a vehicle capable of improving freedom in vehicle design.

In order to resolve this problem, the present invention is configured as described hereinafter.

In a vehicle comprising a back door covering an opening section on a rear surface thereof and capable of opening and closing and a cargo compartment floor extending forward from the opening section, a tonneau cover device according to a first aspect of the present invention in order to resolve the problem comprises a tonneau cover deployed above the cargo compartment floor and separated therefrom and an interlocking means moving a rear end of the tonneau cover in a substantially vertical direction interlocked with opening and closing of the back door, the interlocking means comprising a pair of pulleys disposed separated in a vertical direction at each of the left and right sides of the cargo compartment, a first linking member wrapped around the pulleys and connected to the rear end of the tonneau cover, a rotating member wherearound the first linking member is wrapped or wound, and a second linking member having an end connected to the back door, having another end wrapped around and engaged with the rotating member, and rotating the rotating member interlocked with opening and closing of the back door.

With this first aspect of the present invention, when the back door opens and closes, the second linking member moves and the rotating member rotates interlocked with this motion. Consequently, the first linking member, wrapped around or wound around the rotating member and the pair of pulleys, rotates and the rear end of the tonneau cover, connected to the first linking member, moves in a substantially vertical direction.

In such a case, it is sufficient for the second linking member to rotate the rotating member interlocked with opening and closing of the back door, and therefore, the relationship between the motion direction of the second linking member and the positions of the pair of pulleys, etc. can be freely set. Accordingly, the positions of, for example, a connection section whereat the second linking member is connected to the back door, the rotating member, and the pair of pulleys can be freely set, or in other words, restrictions related to the shape of vehicle side surfaces such as, for example, the rear pillar can be eliminated and the degree of freedom in vehicle design can be enhanced.

These and other objects, features and advantages of the present invention will become apparent upon reading of the following detailed description along with the accompanied drawings.

BRIEF DESCRIPTION OF DRAWINGS

FIG. 8C is a view showing a condition wherein the back door is fully opened.

FIG. 15 is a diagram for explaining an effect of the interlocking mechanism.

FIG. 18 is a view explaining an operational advantage gained using the connecting member.

FIGS. 19A and 19B are detailed structural views of a slider member.

FIG. 29B is a side view showing the same condition.

FIG. 30A is a perspective view showing a condition wherein the back door has opened through rotation by approximately 60° from the closed position.

FIG. 30B is a side view showing the same condition.

FIG. 31B is a side view showing the same condition.

FIG. 32 is a view of a variation of the present invention showing a front-side tonneau cover divided into three board members arranged in a longitudinal direction of the vehicle.

DETAILED DESCRIPTION OF INVENTION

Hereinafter, a tonneau cover device of a vehicle according to an embodiment of the present invention is explained.

Figure 1:
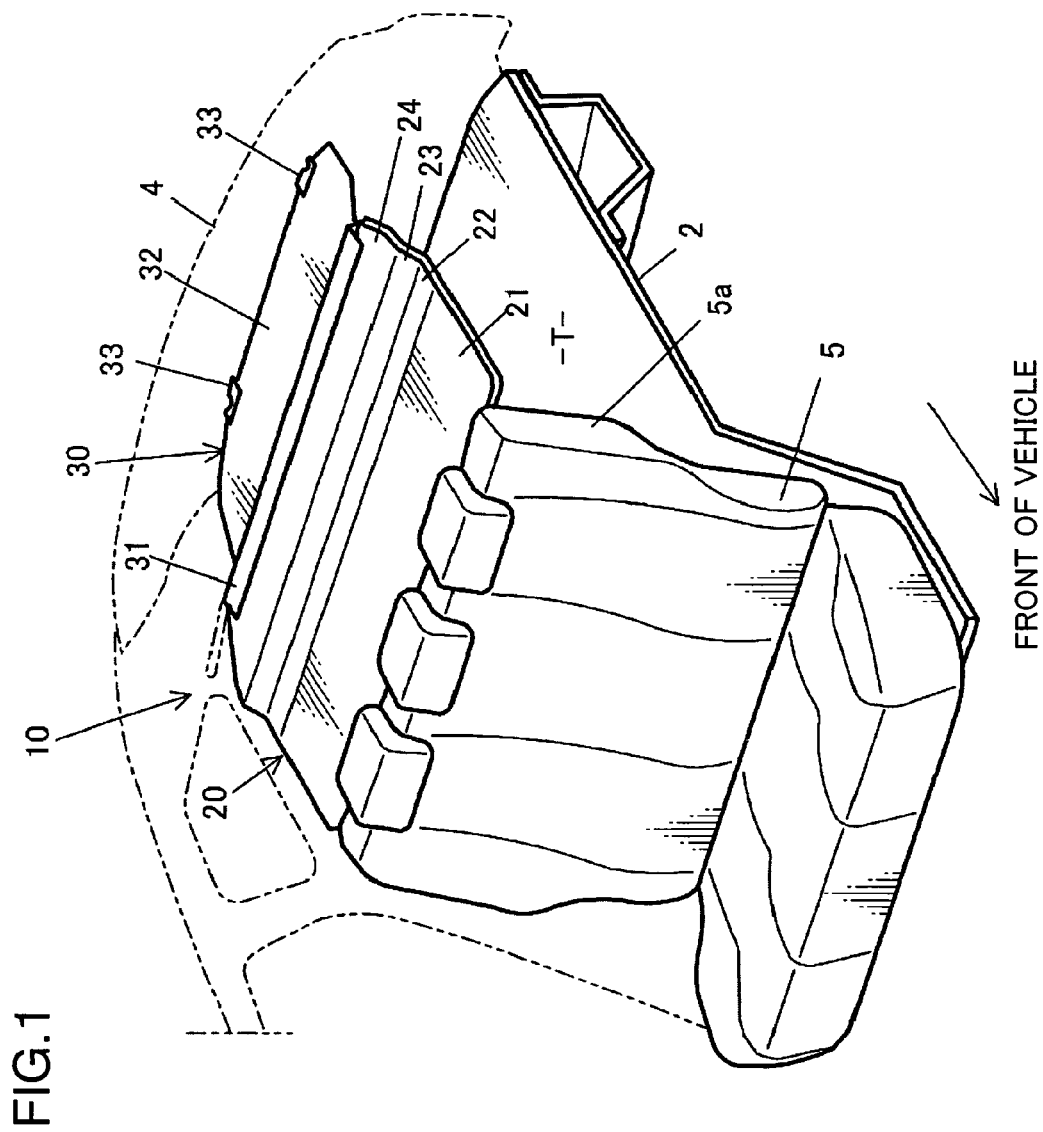
FIG. 1 is a perspective view of a vehicle rear section according to an embodiment of the present invention seen inclined downward from a forward position.
Figure 2:
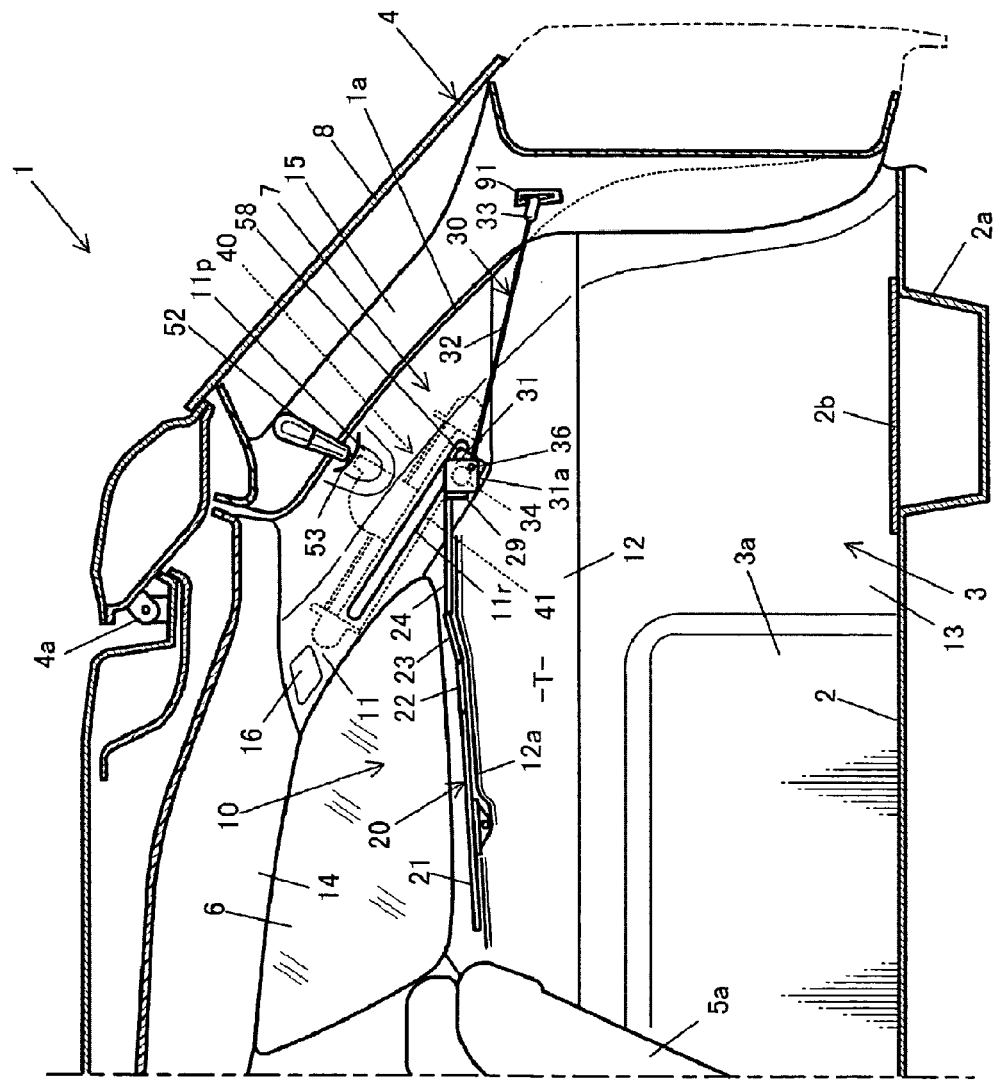
FIG. 2 is a side view of the vehicle rear section.
Figure 3A:
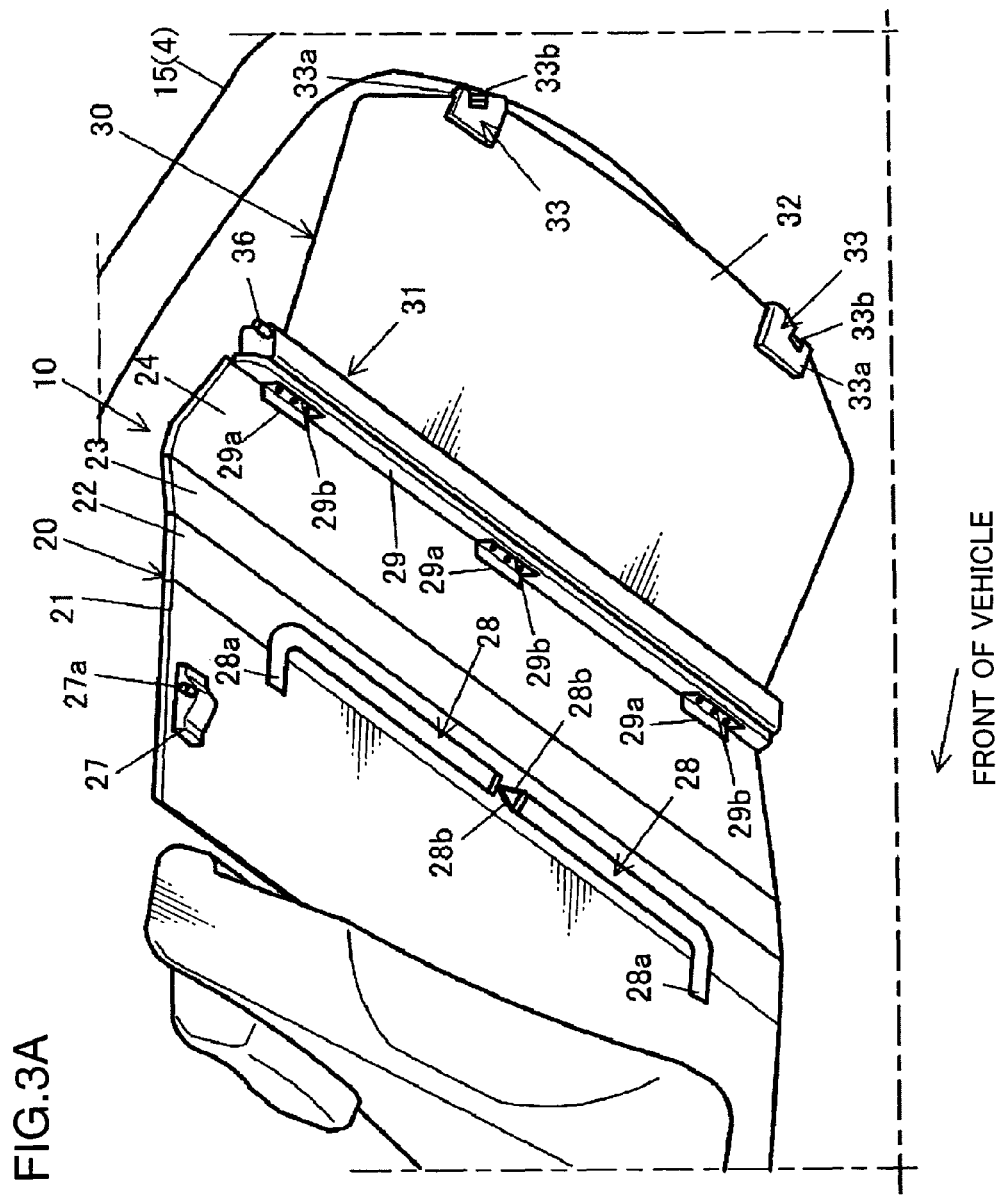
FIG. 3A is a perspective view of the vehicle rear section seen inclined upward from a forward position.
Figure 3B:
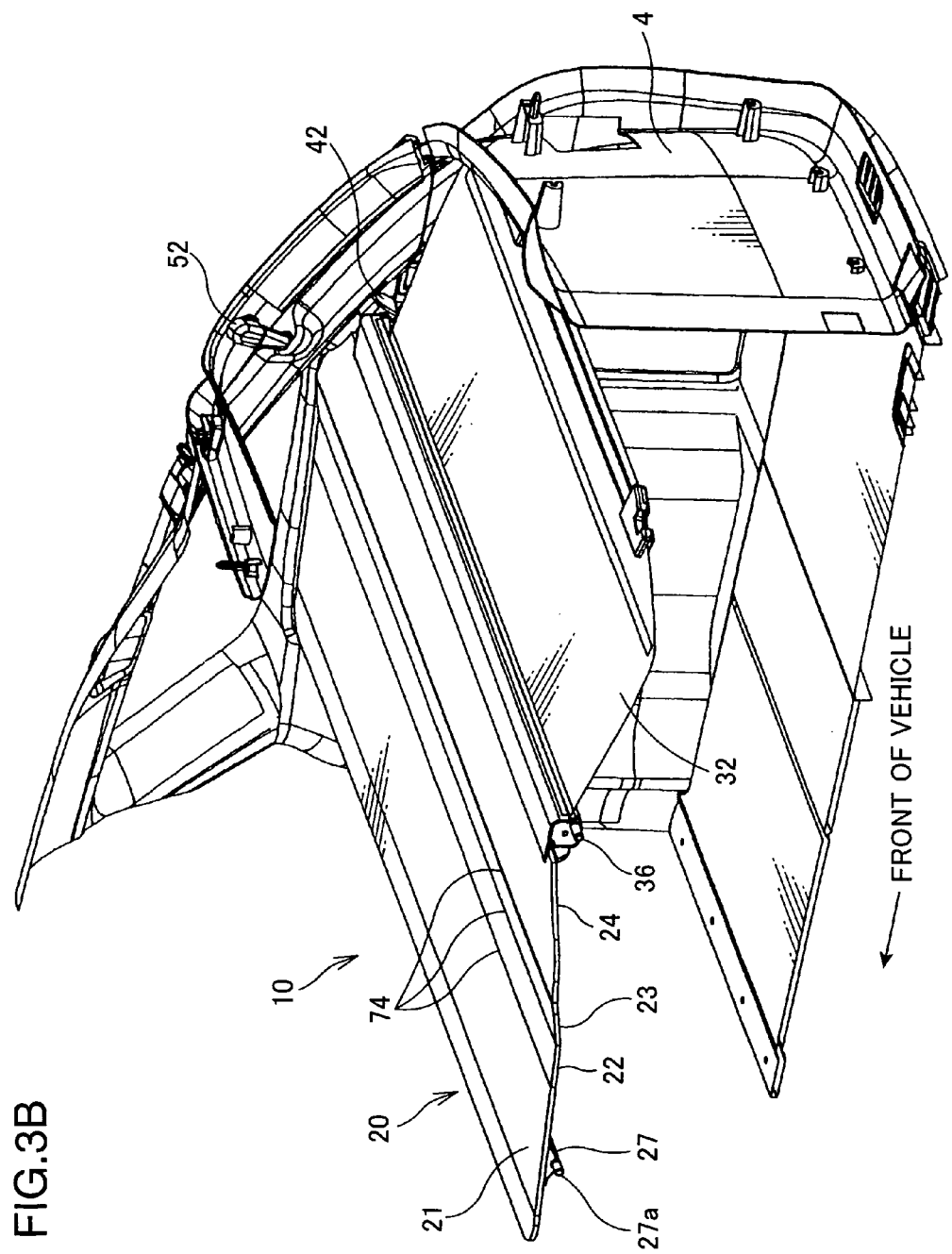
FIG. 3B is a perspective view of a vehicle rear section seen inclined downward.

FIG. 1 is a downward-inclined perspective view of a cargo compartment wherein the tonneau cover device is attached, FIG. 2 is a side view of the cargo compartment wherein the tonneau cover device is attached, and FIG. 3A is an upward-inclined perspective view of the cargo compartment wherein the tonneau cover device is attached. FIG. 3B is a perspective view of a vehicle rear section seen inclined downward.

A cargo compartment T of a vehicle 1 of this embodiment is, as shown in FIG. 1, provided behind a rear seat 5 of a chassis rear section and comprises a space defined by a rear floor panel 2 constituting a cargo compartment floor, a side surface section 3 (see FIG. 2), a back door 4 provided on a chassis rear surface, and a seat back 5a of the rear seat 5, etc.

The rear floor panel 2 is provided substantially horizontally at the chassis rear section and is configured such that cargo can be placed on an upper surface thereof. Furthermore, a sub-trunk section 2a is formed recessed downwards and extending in a transverse direction of the vehicle at a rear section of the rear floor panel 2. The sub-trunk section 2a is covered from above by a trunk board 2b.

The chassis side surface section is provided substantially vertically and extending in a longitudinal direction of the vehicle at a chassis side section. A wheel housing 3a swelling into a passenger compartment and shaped in accordance with a rear wheel shape is formed at a lower section of the chassis side surface section 3 and quarter window glass 6 is attached at an upper section thereof.

A rear pillar 7 extending vertically and inclined forward is provided at a chassis-rear side of the quarter window glass 6. The rear pillar 7 is inclined forward by a relatively large degree in accordance with chassis design considerations, and in addition, is inclined inward in a transverse direction of the vehicle such that a gap between the left and right rear pillars 7 grows smaller towards the top thereof.

The back door 4 is pivotally supported at an upper end thereof by an upper end of the chassis rear section via a rotary hinge 4a and is configured so as to cover an opening section 1a of the chassis rear surface and to be capable of freely opening and closing. Furthermore, back window glass 8 is attached to an upper section of the back door 4 in order to secure a rearward field of view.

An inner panel 9 of the chassis side surface section 3 forming part of the chassis is covered from inside the passenger compartment by a rear pillar trim 11, a trunk side upper trim 12, and a trunk side lower trim 13, etc. Furthermore, the inner panel 9 is covered by a roof trim 14, etc. at a roof section and is covered by a door trim 15, etc. at the back door 4.

A tonneau cover device 10 deployed substantially horizontally above the rear floor panel 2 and separated therefrom is provided inside the cargo compartment T, and the tonneau cover device 10 prevents cargo inside the cargo compartment T from being viewed from outside thereof.

The tonneau cover device 10 comprises a board-shaped front tonneau cover 20 provided at a chassis front side, a winding type rear tonneau cover 30 provided at a chassis rear side, and an interlocking mechanism 40 moving a rear end of the front tonneau cover 20 and a front end of the rear tonneau cover 30 in a substantially vertical direction interlocked with opening and closing of the back door 4.

Figure 8A:
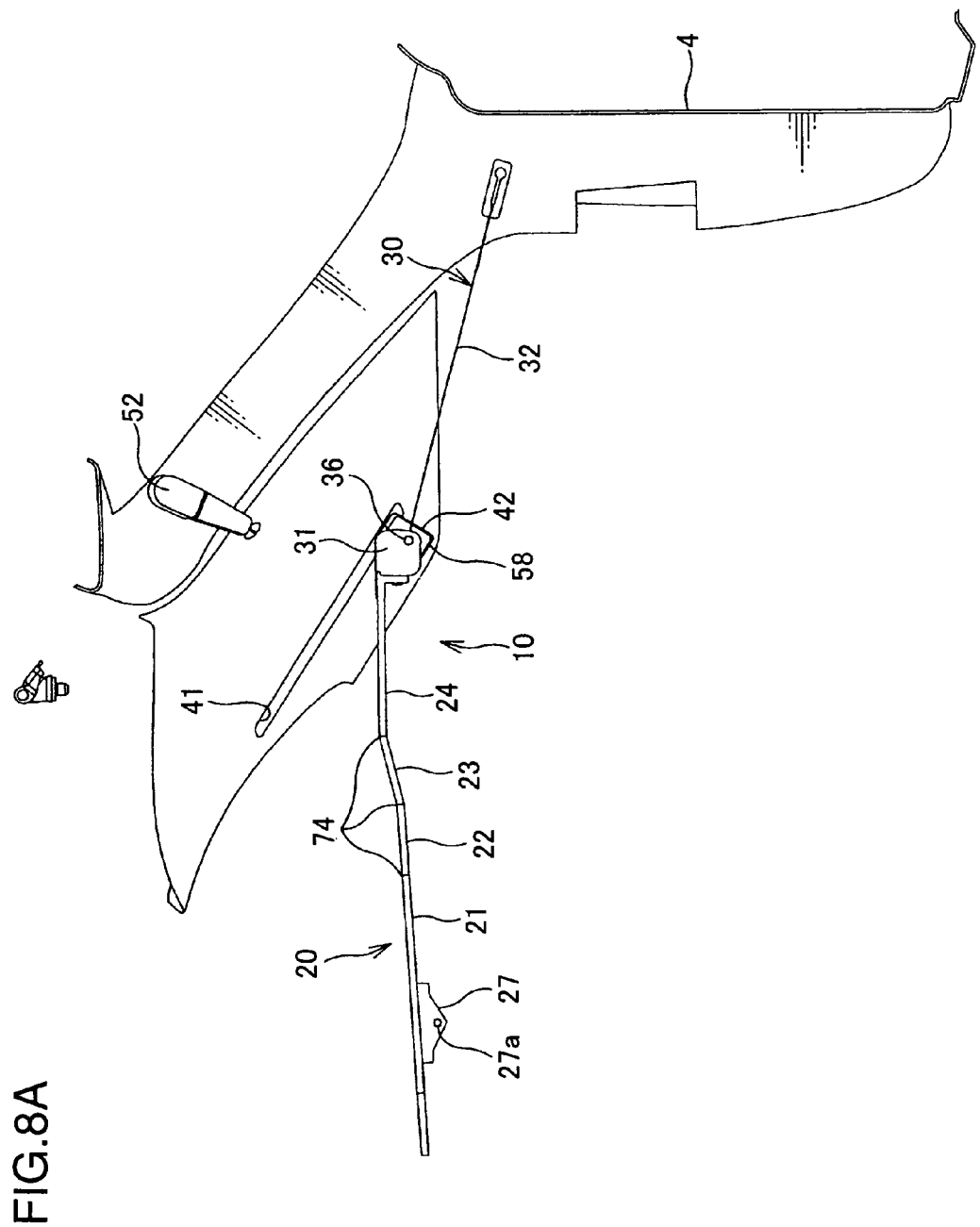
FIG. 8A is a view showing a closed condition of the back door.
Figure 8B:
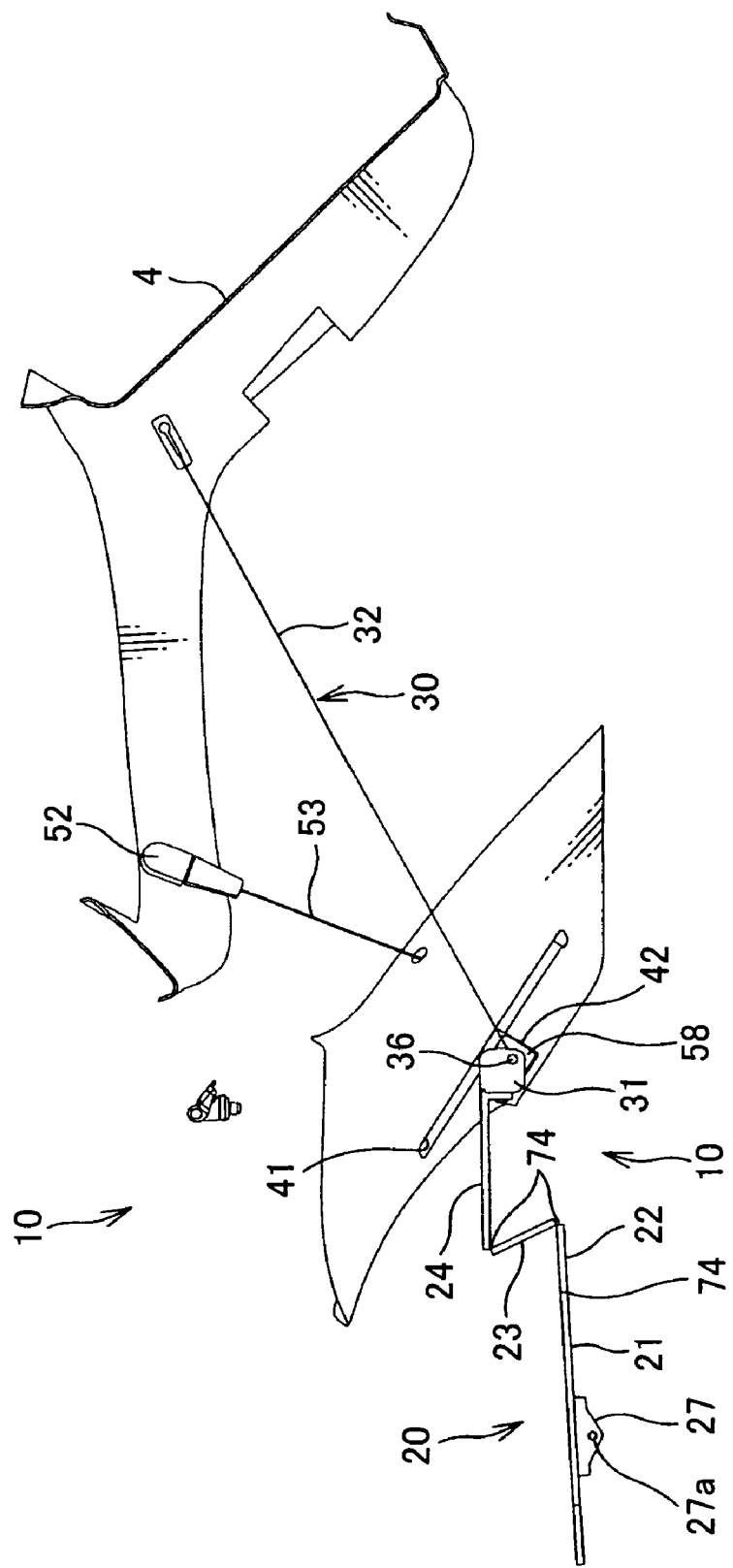
FIG. 8B is a view showing a condition wherein the back door is opened to an intermediate position.

It should be noted that FIG. 8A shows a condition wherein the back door 4 is closed, FIG. 8B shows condition wherein the back door 4 is opened to an intermediate position, and FIG. 8C shows a condition wherein the back door 4 is fully opened. As shown in FIG. 8A, in a condition wherein the back door 4 is fully closed, a pair of sliders 42 are positioned at a rear end section (that is, a lower end section) of a pair of guide rails 41, and the tonneau cover device 10 is deployed having a substantially planar shape so as to cover the top of the cargo compartment T. If the back door 4 opens in this condition, as shown in FIG. 8B, the slider 42 moves towards a front end section (that is, an upper end section) of the guide rail 41 as a result of being driven by the interlocking mechanism 40, and folding of the front tonneau cover 20 towards the front begins. When the back door 4 reaches the fully opened condition thereof, as shown in FIG. 8C, the slider 42 is positioned at a front end section (that is, an upper end section) of the guide rail 41, and the front tonneau cover 20 is in a condition of further folding and forms a wider space at the top of the cargo compartment T.

It should be noted that the front tonneau cover 20 comprises a plurality of board members 21, 22, 23, 24 formed of synthetic plastic or plywood, etc., and both left and right edge sections of the front tonneau cover 20 are mounted on platform sections 12a formed on the trunk side upper trim 12 so as to extend in a longitudinal direction of the vehicle.

Each of the board members 21, 22, 23, 24 is continuously covered at each of a top surface and a bottom surface thereof by covering members 25, and the board members 21, 22, 23, 24 are formed as one (see FIG. 6) by stitching together the upper and lower covering members 25 between adjacent board members 21, 22, 23, 24 using stitching thread 26, etc. Intervals between each of the board members 21, 22, 23, 24 are set so as to be sufficiently long to allow vertical folding thereof For this reason, each of the board members 21, 22, 23, 24 is capable of folding so as to form a crest (that is, folding such that a ridge line thereof moves upward) or so as to form a dip (that is, folding such that a ridge line thereof moves downward).

A first board member 21 is formed having a substantially rectangular shape with the longest side thereof oriented in the longitudinal direction of the vehicle. A hinge unit 27 comprising a hinge pin 27a is fixed to both left and right sides of a bottom surface of the first board 21 as shown in FIG. 3A (left side only in FIG. 3A).

Figure 4:
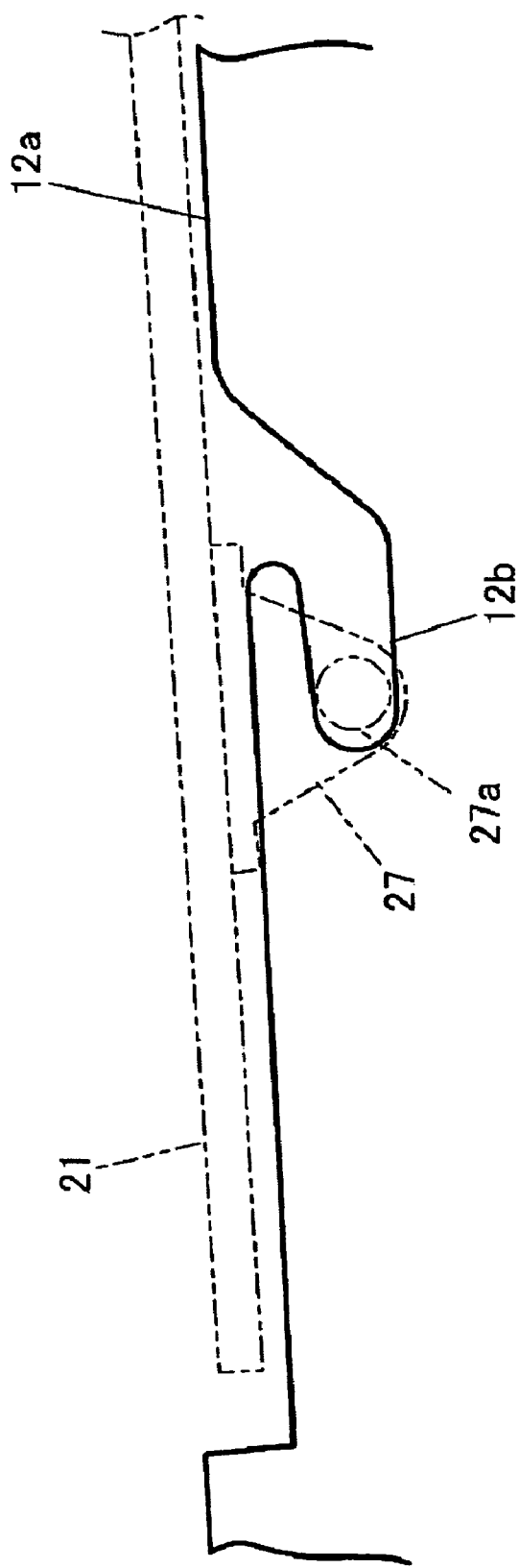
FIG. 4 is an expanded view of a support section of chassis side-section inner surface supporting a side section of a front-section tonneau cover.

As shown in FIG. 4, the hinge pin 27a is fixed and held by a holder recess 12b formed in the platform section 12a of the trunk side upper trim 12 as a result of insertion from above into the holder recess 12b. As a result of the hinge pin 27a being fixed and held by the holder recess 12b in this way, a position of the tonneau cover device 10 in the cargo compartment T is regulated.

Furthermore, as shown in FIG. 3A, a pair of fastening bands 28 for holding the tonneau cover device 10 in the folded condition upon removal thereof from the chassis is provided on the bottom surface of the first board 21.

A fastening band 28 is provided on both left and right sides. An end section 28a thereof is joined and fixed to a bottom surface of the first board member 21, and a metal hook 28b is provided at another end section. If the left and right fastening bands 28 are joined using the hooks 28b, hanging down during deployment is prevented.

Figure 6:
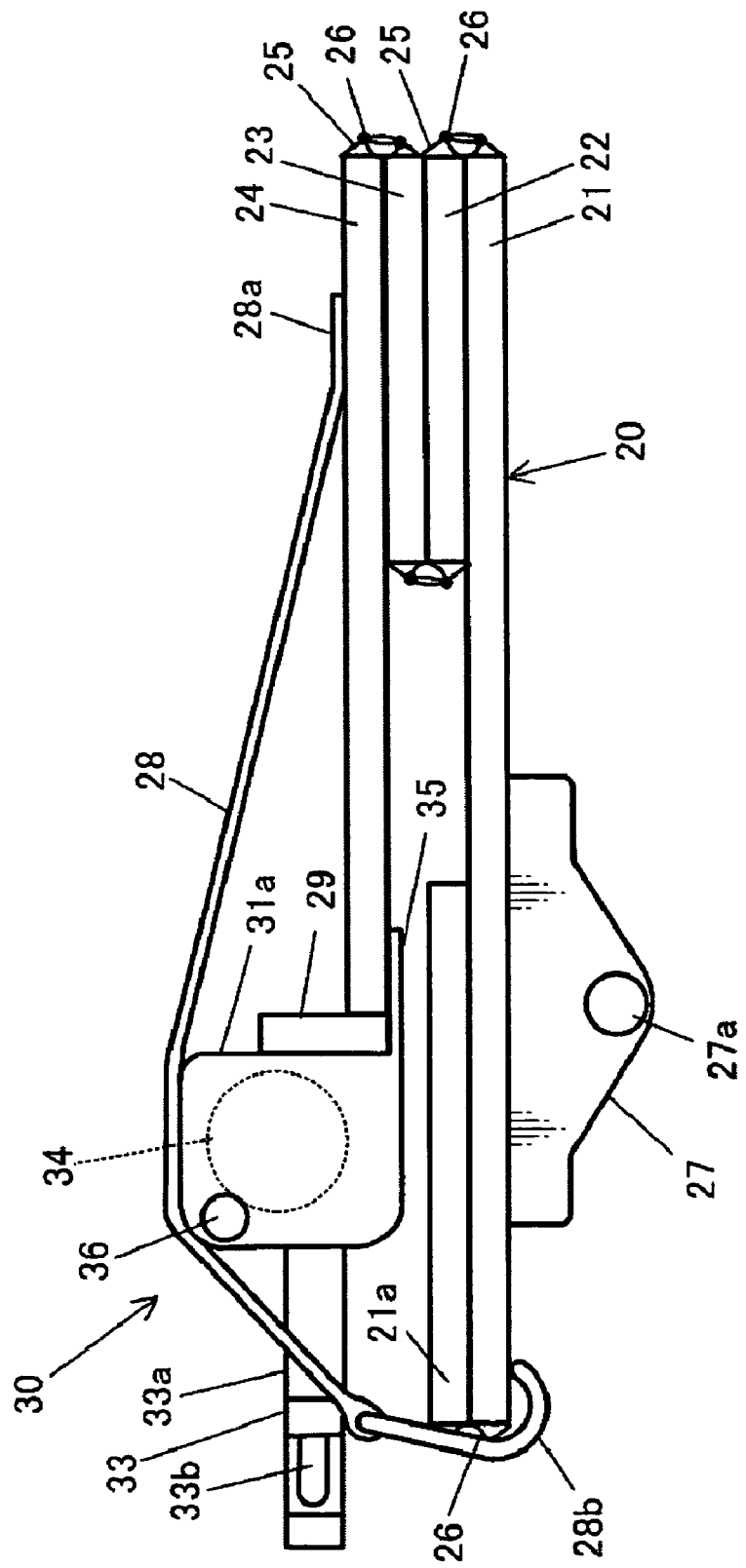
FIG. 6 is an expanded view of a folded-up condition of the tonneau cover.
Figure 7:
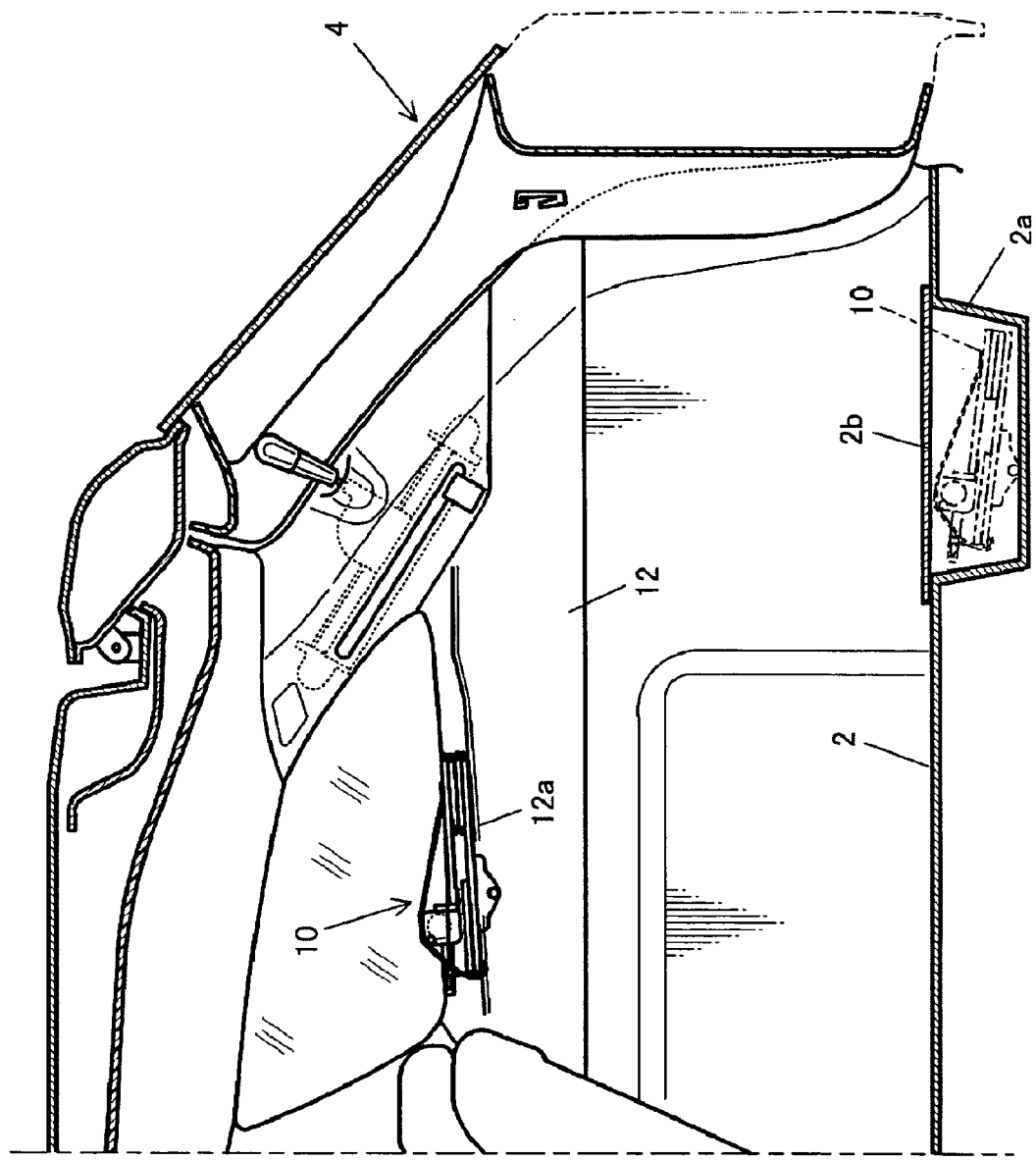
FIG. 7 is a diagram illustrating a folded-up and housed condition, etc. of the tonneau cover.

FIGS. 6 and 7 are side views showing a folded condition of the front tonneau cover 20 and the rear tonneau cover 30. As shown in these figures, the front tonneau cover 20 is folded such that the board members 21, 22, 23, 24 are overlaid in the vertical direction. In this folded condition, the first board member 21 is the lowest board, the second board member 22 and the third board member 23 are folded in sequence thereabove, and the fourth board member 24 is the highest board. Furthermore, a tip board 21a constituting a section of the first board member 21 is folded at an opposite side to that of the second board member 22, etc. so that a length in the longitudinal direction of the vehicle becomes compact upon folding.

It should be noted that a folding configuration of the first board 21 is identical to that explained above.

By folding in this way, a winding unit 31, etc. of the rear tonneau cover 30 becomes positioned above the tip board 21a, and the front tonneau cover 20 and the rear tonneau cover 30 can be bound in this condition by wrapping around the fastening bands 28 and engaging the hooks 28b on the bottom surface of the first board 21.

By folding, the front tonneau cover 20 and the rear tonneau cover 30 in a compact manner in this way, the front tonneau cover 20 and the rear tonneau cover 30 can, as shown by the dashed lines of FIG. 7, be stored inside the sub-trunk section 2a upon removal.

As shown in FIG. 3A, a fixing board 29 fixing the winding unit 31 of the rear tonneau cover 30 is provided behind the fourth board 24. The fixing board 29 is connected to a bottom surface of a rear end section of the fourth board member 24 via three connecting members 29a so as to be capable of rotating with respect to the fourth board member 24. Furthermore, the winding unit 31, extending in the transverse direction of the vehicle, is fixed to the fixing board 29 via a fixing bolt 29b, connecting the front tonneau cover 20 and the rear tonneau cover 30.

Meanwhile, as shown in FIG. 2 and FIG. 3A, the rear tonneau cover 30 comprises the winding unit 31, a sheet member 32 pulled out from the winding unit 31, and a pair of engaging handles 33 fixed to a rear end of the sheet member 32.

The winding unit 31 has a casing 31a of a substantially square column shape extending in the transverse direction of the vehicle, and an winding roller 34 for winding of the sheet member 32 is provided in the interior thereof. An urging member (not shown) pulling the sheet member 32 in a winding direction is provided on the wind-up roller 34.

Furthermore, a fixing piece 35 (see FIG. 6) engaging with the fourth board member 24 is provided at an upper end of a front section of the winding unit 31 such that the winding unit 31 changes position as one with the fourth board member 24 upon upward displacement of the fourth board member 24 when the tonneau cover device 10 is deployed. In addition, an engagement boss 36 fitting into and supported by (i.e., connected to) a slider explained hereinafter is provided so as to extend in the transverse direction of the vehicle at each end section of the winding unit 31 in the transverse direction of the vehicle.

The sheet member 32 comprises wide synthetic leather or cloth sheeting deployed over a full width of the vehicle in the transverse direction thereof and can be pulled out towards the rear of the chassis from an extraction opening (not shown) extending in the transverse direction of the vehicle at a lower end of a rear section of the winding unit 31.

The sheet member 32 covers the top of the rear section of the cargo compartment T as shown in FIG. 2 as a result of pulling out thereof to an intermediate point, is wound into the winding unit 31 upon release of engagement with the back door 4, and upon opening of the back door 4, is pulled out and upwards by a large degree following the back door 4 so as to form a substantially vertical screen between an upper section of the cargo compartment T and a rear section of the chassis.

Furthermore, a side recess (not shown) of a substantially semi-circular notched shape is formed at each side of the sheet member 32. Upon deployment of the sheet member 32 to form a screen, the side recesses prevent interference with the edges of the opening section 1a of the chassis rear surface.

Figure 5:
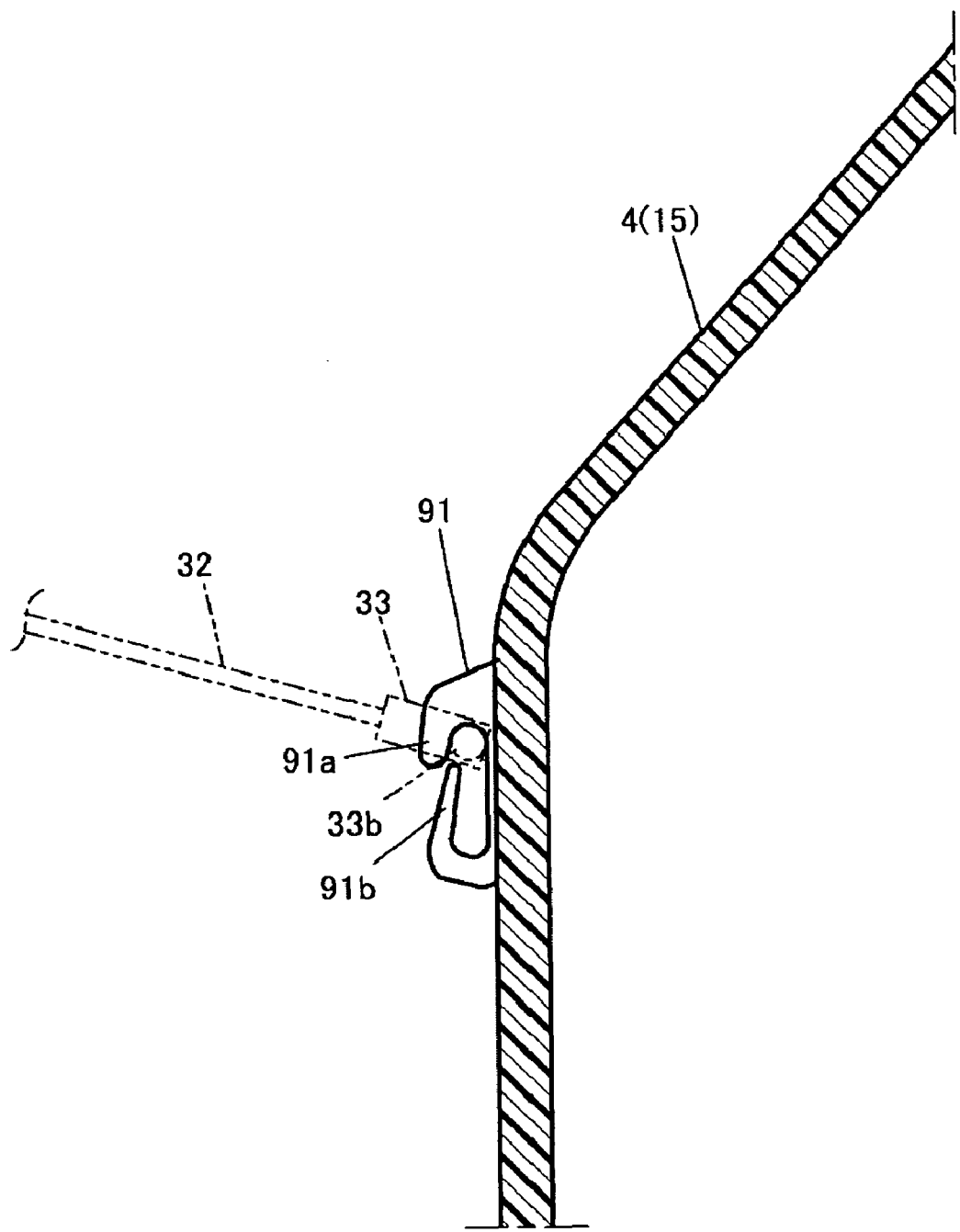
FIG. 5 is an expanded view of a connection section of a back door whereto a rear end section of a rear-section tonneau cover is connected.

As shown in FIG. 3A, an engaging handle 33 is provided on both the left and the right of a rear end of the sheet member 32 and comprises a base 33a and a pin 33b provided inside the base 33a. When, as shown in FIG. 5, each of the pins 33b of the engaging handles 33 is inserted into upper and lower engagement sections 91a, 91b of an engagement hook 91 provided on the back door 4, the engaging handles 33 become fixed to the back door 4. It should be noted that the pins 33b can be released from the engagement hooks 91 in order to house the sheet member 32 in the winding unit 31.

Figure 9A:
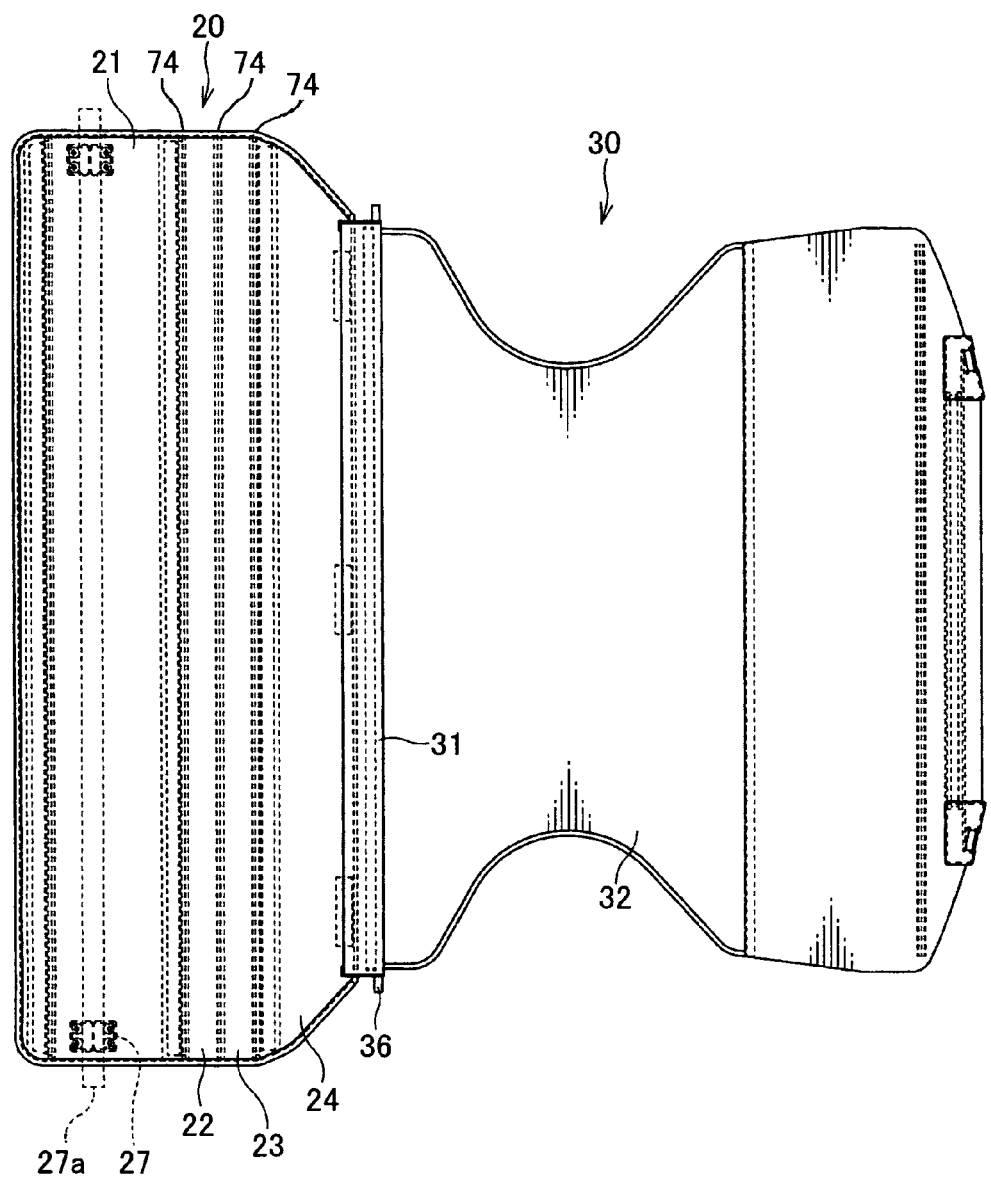
FIG. 9A is a plan view showing the tonneau cover in full.
Figure 9B:
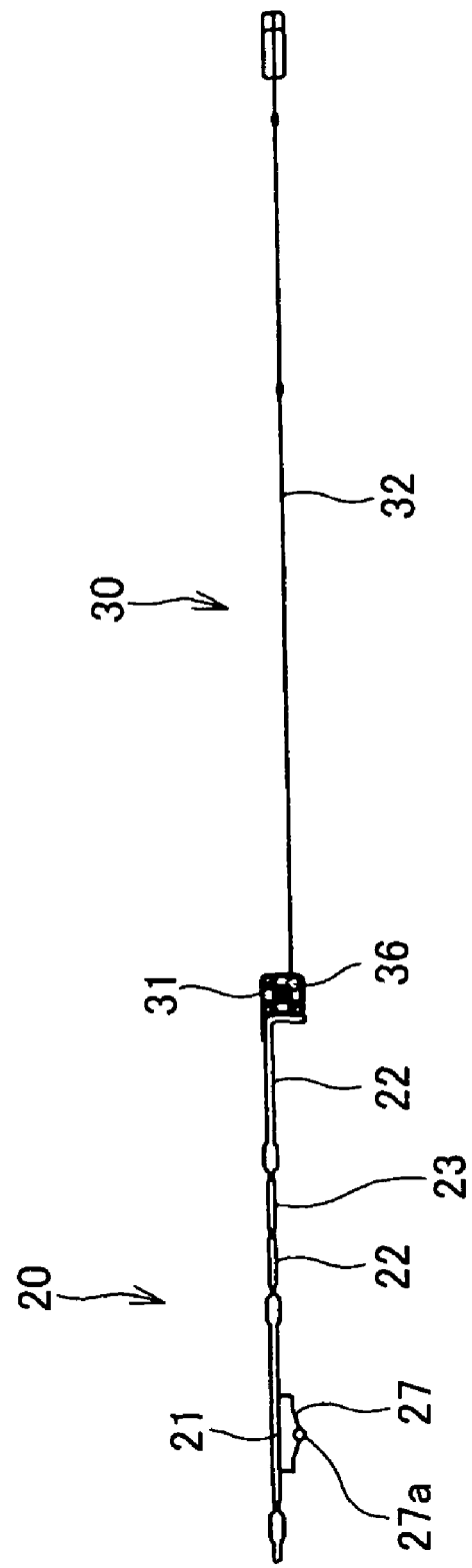
FIG. 9B is a side view corresponding to FIG. 9A.

Furthermore, FIG. 9A is a plan view showing the front tonneau cover 20 (in the deployed condition corresponding to the back door 4 being closed) and the rear tonneau cover 30 (in the pulled-out condition) in full, and FIG. 9B is a side view corresponding to FIG. 9A. It should be noted that, although bending sections 74 (that is, connection sections formed from the covering members 25 and the stitching thread 26 so as to facilitate bending) facilitating mutual bending of the board members 21, 22, 23, 24 have been explained with reference to FIG. 6, any type of configuration including a hinge mechanism facilitating 180° bending between adjacent pairs of board members 21, 22, 23, 24 can be employed.

Figure 10:
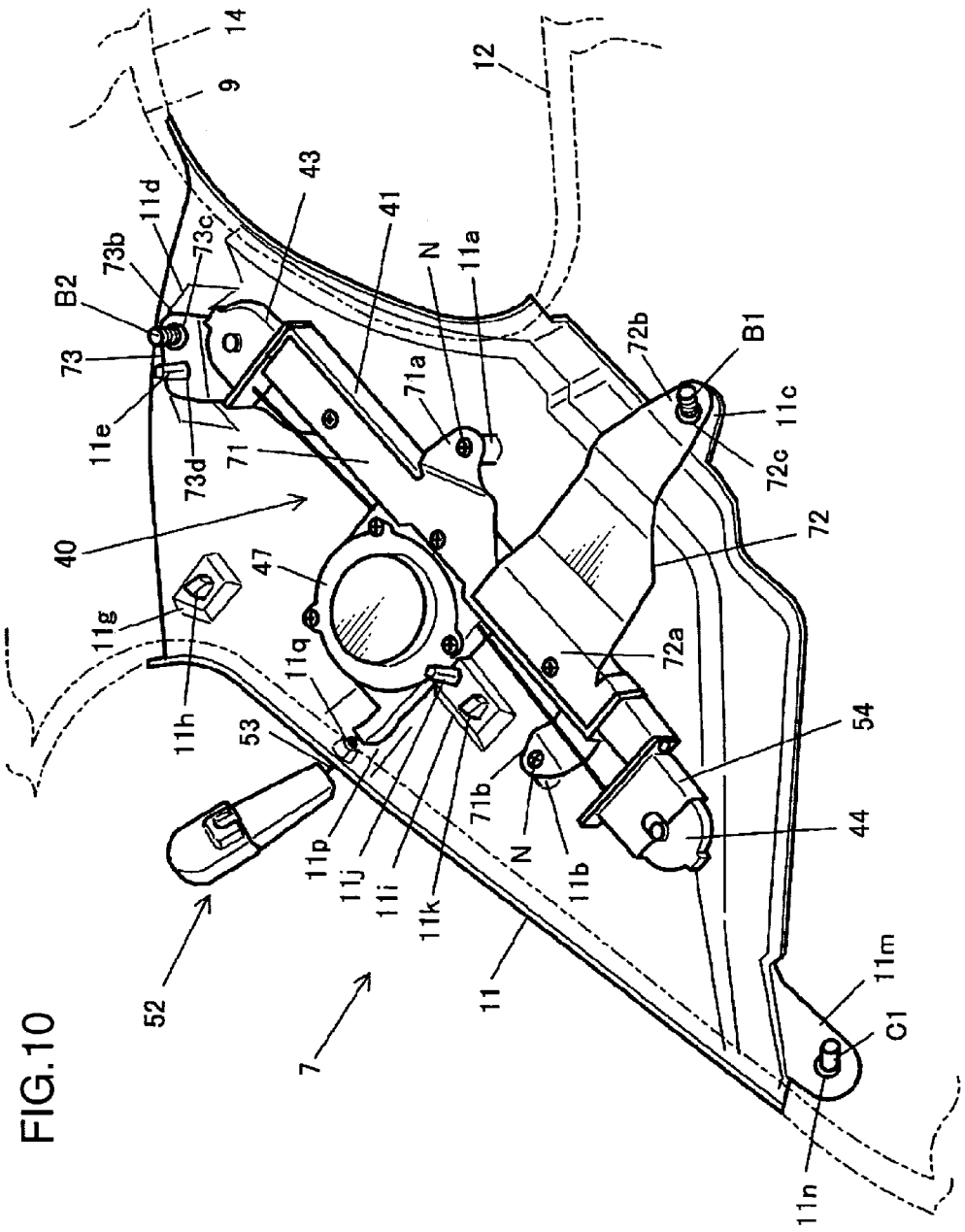
FIG. 10 is an expanded view of a mounting section of an interlocking mechanism for a rear pillar (that is, a perspective view seen from a rear face of a rear pillar trim).
Figure 11:
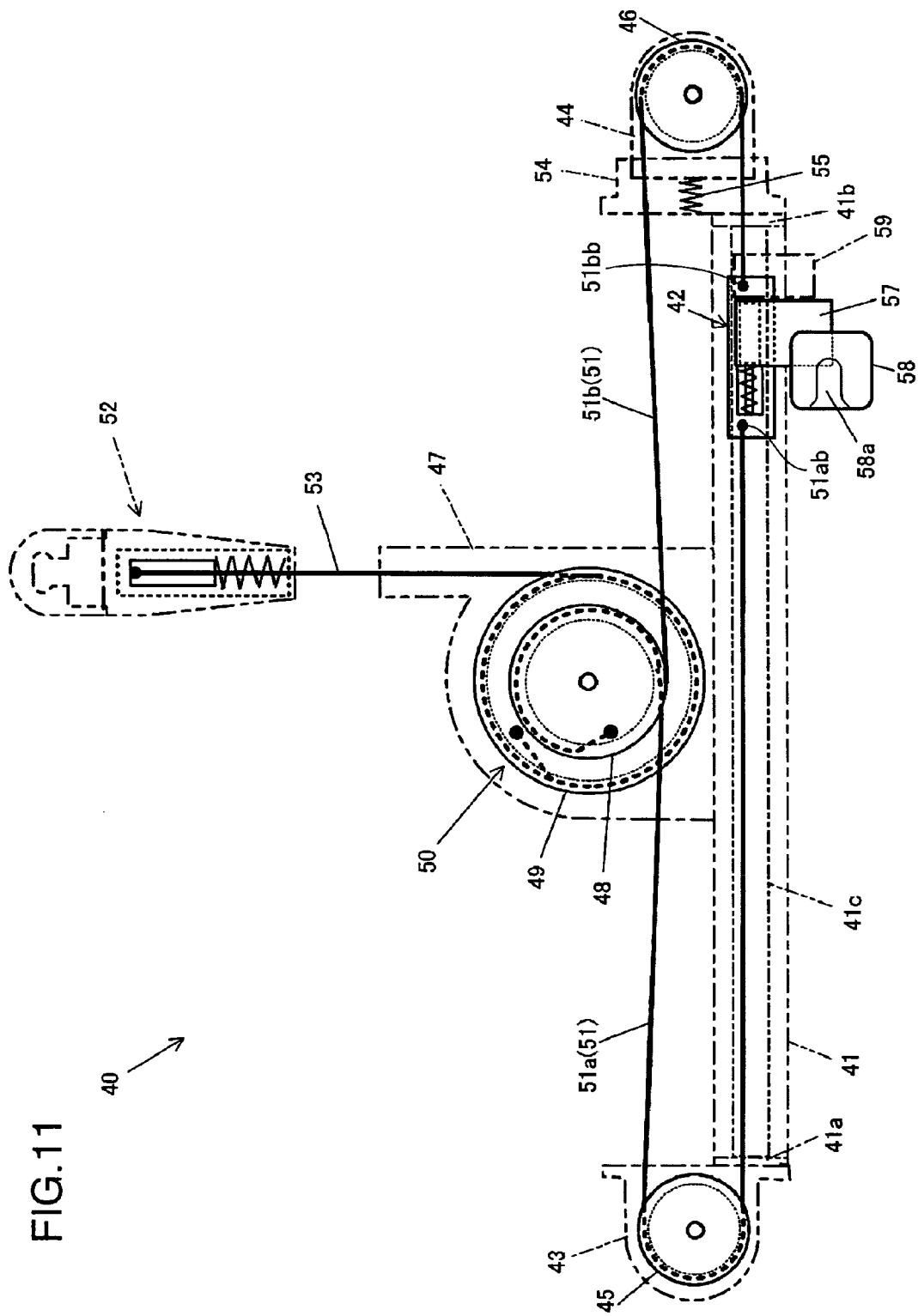
FIG. 11 is a basic structural view of the interlocking mechanism.

Hereinafter, the interlocking mechanism 40 is explained. In specific terms, the interlocking mechanism 40 is, as shown in FIG. 10, provided in a space between the inner panel 9 (a chassis structural member) and the rear pillar trim 11 of the rear pillar 7, and as shown in FIG. 11, comprises the guide rail 41, the slider 42 capable of sliding along the guide rail 41, a pair of pulley support cases 43, 44 each provided at both end sections of the guide rail 41, a first pulley 45 and a second pulley 46 housed within the pulley support cases 43, 44 and supported thereby so as to be capable of rotating, a rotary member support case 47 mounted at the approximate center of the guide rail 41 in a longitudinal direction thereof, a rotary member 50 housed within the rotary member support case 47 and supported thereby so as to be capable of rotating, a first linking wire 51 wrapped around the first pulley 45, the second pulley 46, and a first rotary member 48, a linking member 52 fixed to an inner surface (that is, the door trim 15) of the back door 4, and a second linking wire 53 having an end thereof connected to the linking member 52 and another end thereof wrapped around and connected to a second rotary member 49. It should be noted that the interlocking mechanism 40 is provided on each of the left and right rear pillars 7.

The pulley support cases 43, 44 each comprise a pair of half cases 43a, 43b, 44a, 44b forming spaces capable of housing the first pulley 45 and the second pulley 46.

The pulley support case 43 disposed at an upper position than the other in the rear pillar 7 is directly fixed to an end section of the guide rail 41, and the other pulley support case 44 is mounted on the other end section of the guide rail 41 via a case support member 54 so as to be capable of moving on the guide rail 41 in the longitudinal direction thereof. A spring 55 urging the pulley support case 44 away from the guide rail 41 in the longitudinal direction thereof is provided between the case support member 54 and the pulley support case 44.

The rotary member 50 comprises the coaxially-mounted first rotary member 48 and second rotary member 49. Each of the first rotary member 48 and second rotary member 49 comprises a positioning section 49c (in FIG. 13, that of the first rotary member 48 is facing away from the plane of view and cannot be seen), and by mutually engaging the positioning sections 49c, the first rotary member 48 and second rotary member 49 can be made to rotate in unison with a prescribed circumferential phase therebetween.

It should be noted that the rotary member 50 is provided in between the pair of pulleys 45, 46 as shown in FIG. 11. Although not shown in Figs., however, the rotary member 50 could be provided in con-centrically with one of the pair of pulleys 45, 46. In this case, the first linking wire 51 is to be wound around between the pulleys 45, 46 and the second rotary member 49 is provided in concentrically with either one of the pulleys 45, 46.

A first channel 48a and a second channel 48b (see FIG. 13) are provided in parallel on an outer circumference section of the first rotary member 48, and a channel 49a is provided on an outer circumference section of the second rotary member 49.

An outer diameter of the second rotary member 49 is larger than an outer diameter of the first rotary member 48. It should be noted that a pull-out amount of the second linking wire 53 in a case wherein the slider 42 moves from a lower end position to an upper end position is taken into consideration in setting an outer diameter ratio.

The rotary member support case 47 comprises a pair of half cases 47a, 47b forming a space capable of housing the rotary member 50. A clockwork spring mechanism 56 (not shown) is mounted on an outer surface side of one of the half cases 47b.

The clockwork spring mechanism 56 (equivalent to a spiral spring 500 explained hereinafter with reference to FIG. 27) comprises a clockwork spring, a clockwork spring housing case whereto an end of the clockwork spring is fixed and forming a space housing the clockwork spring in combination with the outer-side half case 47b, and a rectangular shaft member 56a passing through the half case 47b and whereto the other end of the clockwork spring is fixed.

The guide rail 41 comprises a channel-shaped steel member having a substantially C-shaped cross-section, and one of a pair of cover members 41a, 41b is mounted on each end section thereof.

A holder mounting bracket 57 extending to an exterior section of the guide rail 41 via a slit 41c of the guide rail 41 is mounted on the slider 42, and a specific configuration thereof is explained hereinafter. A tip side of the holder mounting bracket 57 protrudes to a surface side of the rear pillar trim 11 via a slit 11r (see FIG. 2) formed in the rear pillar trim 11 so as to be parallel to the guide rail 41, and a substantially rectangular shaped holder member 58 holding one of the engagement bosses 36 on each end of the winding unit 31 is mounted on the tip side of each holder mounting bracket 57. It should be noted that a width of the slit 11r is smaller than a dimension of the holder member 58.

A stopper member 59 is mounted at a position removed by a prescribed distance from the cover member 41b at the lower end of the guide rail 41 in a longitudinal direction thereof, and the holder mounting bracket 57 makes contact with the stopper member 59 when the slider 42 has moved to a side corresponding to the cover member 41b.

Figure 12:
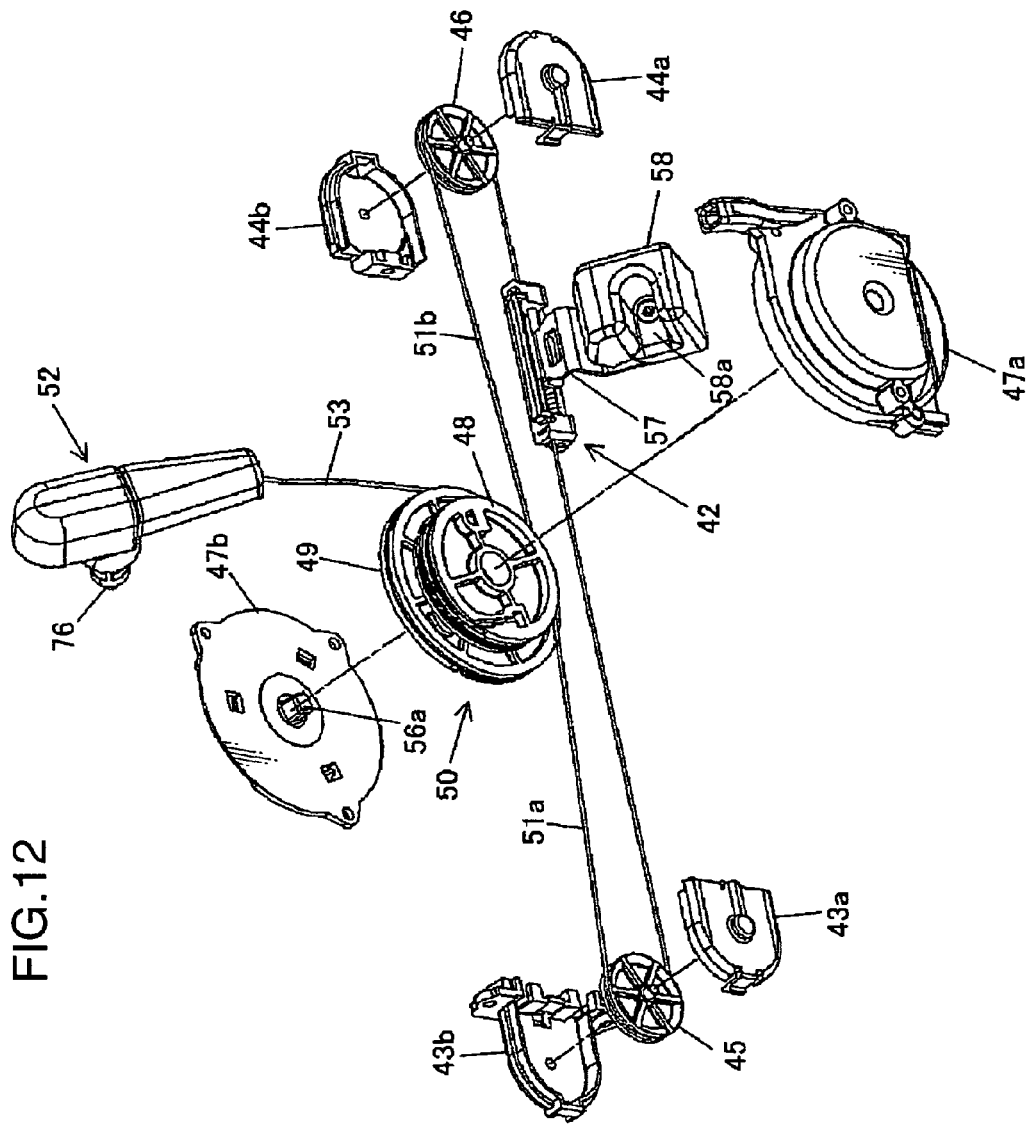
FIG. 12 is an exploded view (part 1) of the interlocking mechanism.

A fitting groove 58a for insertion of the engagement bosses 36 of the winding unit 31 is formed in each holder member 58, and by inserting the engagement bosses 36 into the fitting grooves 58a from above, the winding unit 31 are supported by the holder members 58 (see FIG. 12).

The first linking wire 51 comprises a first member 51a wrapped around the first channel 48a of the first rotary member 48 via the first pulley 45 and having an end section 51ab fixed to an end section of the slider 42 and another end section 51aa engaged with a first engagement section 48c of the first rotary member 48 and a second member 51b wrapped around the second channel 48b of the first rotary member 48 in an opposite direction to that of the first member 51a and having an end section 51bb fixed to another end section of the slider 42 and another end section 51ba engaged with a second engagement section 48d of the first rotary member 48. Each of the first member 51a and the second member 51b is sufficiently long to allow the slider 42 to move from one end section of the guide rail 41 to another end section thereof.

The second linking wire 53 is connected as explained above at one end section thereof to the linking member 52, is wrapped around the channel 49*a* of the second rotary member 49 at another end section, and has an end section 53*a* engaged with an engagement section 49*b* of the second rotary member 49. It should be noted that the second linking wire 53 is guided to an exterior of the rear pillar trim 11 via a through hole 11*q* provided in a protrusion 11*p* formed protruding towards the interior of the vehicle at a rear edge section of the rear pillar trim 11 (see FIG. 2).

The spring 55 is provided in order to make it easier to house the rotary member 50 inside the rotary member support case 47 from a side thereof in a condition wherein the first linking wire 51 and the second linking wire 53 are wrapped around the rotary member 50 by reducing a tension in the first linking wire 51. Specifically, the tension in the first linking wire 51 is reduced by pushing the pulley support case 44 towards the pulley support case 45, compressing the spring 55.

A clip engagement hole capable of housing a clip member 76 (see FIG. 13) is formed in the linking member 52, and the linking member 52 is fixed to the back door 4 by inserting the clip member 76 fixed to the back door 4 into the clip engagement hole. In addition, the linking member 52 is, in the fixed condition thereof, supported so as to be capable of rotating about the clip member 76. It should be noted that a specific configuration of the linking member 52 is explained hereinafter.

Next, a mounting configuration of the interlocking mechanism 40 is explained.

The interlocking mechanism 40 is, as shown in FIG. 10, fixed to the rear pillar trim 11 or the inner panel 9 constituting a part of the chassis via a plurality of brackets 71, 72, 73 attached to the guide rail 41 by screws or fastening, etc.

A first bracket 71 has a long rectangular shape oriented in a longitudinal direction of the guide rail 41 and comprises a first mounting section 71*b* at a lower end thereof and extending perpendicular thereto towards the rear of the vehicle and a second mounting section 71*a* at an approximate center thereof in the longitudinal direction and extending perpendicular thereto towards the front of the vehicle. The first mounting section 71*b* and the second mounting section 71*a* are secured by a screw N at each of a pair of embossed sections 11*a*, 11*b* formed so as to protrude from an inner surface of the rear pillar trim 11.

A second bracket 72 comprises a base end section 72*a* secured at a lower end of the guide rail 41 overlapping a lower end of the first bracket 71 and tongue-shaped tip section 72*b* extending towards the front of the vehicle perpendicular thereto to a mounting section 11*c* formed at a lower section of a front edge of the rear pillar trim 11 protruding therefrom. A bolt through hole 72*c* is formed in each of the tip section 72*b* of the second bracket 72 and the mounting section 11*c* of the rear pillar trim 11 (the bolt through hole 72*c* of the mounting section 11*c* is not shown), and in a condition wherein the tip section 72*b* and the mounting section 11*c* are overlapped, a bolt B1 is passed through each of the bolt through holes 72*c* to jointly fasten the second bracket 72 and the inner panel 9 of the chassis.

A third bracket 73 comprises a base end section (not shown in FIG. 10) fixed at an upper end of the guide rail 41 and a tongue-shaped tip section 73*b* extending upward and wherein a bolt through hole 73*c* and a positioning hole 73*d* are formed. A recess 11*d* recessed towards an outer side of the vehicle in the transverse direction thereof is formed at an upper section of the rear pillar trim 11, and at a bottom section of the recess 11*d*, a positioning pin 11*e* and a bolt through hole 11*f* (not shown) are formed protruding towards an outer side of the vehicle in the transverse direction thereof. Furthermore, in a condition wherein the positioning pin 11*e* of the bottom section of the recess 11*d* is fitted into the positioning hole 73*d* of the tip section 73*b* of the third bracket 73, a bolt B2 is passed through the bolt through hole 73*c* and the bolt through hole 11*f* to jointly fasten the third bracket 73 to the inner panel 9 of the chassis.

An embossed section 11*g* is formed so as to protrude from an inner surface of the rear pillar trim 11 at an upper-rear side thereof, and a clip 11*h* for fixing to the inner panel 9 is formed protruding from the embossed section 11*g*. In addition, an embossed section 11*i* is formed so as to protrude from an inner surface of the rear pillar trim 11 behind an approximately central section thereof in the vertical direction, and a similar clip 11*j* and a positioning pin 11*k* for positioning with respect to the inner panel 9 are formed on the embossed section 11*i*.

A mounting section 11*m* is formed protruding downward from a rear section of a lower edge section of the rear pillar trim 11, and by passing a separate clip C1 through a hole 11*n* formed in the mounting section 11*m* and a hole formed on the inner panel 9 so as to match the hole 11*n*, a lower section of the rear pillar trim 11 is fixed to the chassis.

It should be noted that the fastening bolt B2 of the recess 11*d* of the rear pillar trim 11 is covered and concealed by placing a cap 16 over the recess 11*d* from a front surface side (see FIG. 2). Furthermore, the fastening bolt B1 and the clip C1 can also be covered and concealed using the trunk side upper trim 12 by mounting the trunk side upper trim 12 on the chassis behind the rear pillar trim 11.

Hereinafter, an operation of a tonneau cover device configured in this way is explained.

First of all, in a condition wherein the back door 4 is fully closed, as shown in FIG. 2 (and FIG. 8A), the linking member 52 of the interlocking mechanism 40 is positioned in the vicinity of a rear end of the rear pillar 7 and the second linking wire 53 is in a state of minimum pull-out. Furthermore, the slider 42 is, as shown in FIG. 15, positioned at a lower end position whereat the holder mounting bracket 57 makes contact with the stopper member 59. Accordingly, as shown in FIG. 2, the plurality of board members 21, 22, 23, 24 of the front tonneau cover 20 are in a state of mounting at left and right end sections thereof upon the platform sections 12*a* of the left and right trunk side upper trim 12, and the front tonneau cover 20 is in a substantially flat condition. Meanwhile, the rear tonneau cover 30 is connected to the back door 4 at the rear section thereof, and as a result the front section thereof being pulled forward, forms a substantially-horizontal sheet. That is to say, the rear tonneau cover 30 is positioned above the rear floor panel 2 and covers the space therebeneath.

Next, as shown in FIG. 8B, when the back door 4 opens, the second linking wire 53 wound around the second rotary member 49 is pulled out against a winding force (an urging force) of the spring of the clockwork spring mechanism 56 as a result of motion of the linking member 52 of the interlocking mechanism 40 upwards and towards the rear pursuant to the opening. Furthermore, the first rotary member 48 rotates in unison with the second rotary member 49 at this time, and as a result thereof, the slider 42 moves upwards along the guide rail 41 due to an action of the first linking wire 51.

Consequently, the rear end of the front tonneau cover 20 moves upwards and towards the front, and as the distance between a front-end pivot section and a rear-end connection section thereof becomes gradually smaller, the rear-side board members 23, 24 fold in sequence and lifting begins from the rear-side board member 24.

Meanwhile, the rear tonneau cover 30 is pulled out from the winding unit 31 against the winding force. It should be noted that the rear tonneau cover 30 is prevented from hanging down at this time by the winding force of the winding unit 31.

Figure 14:
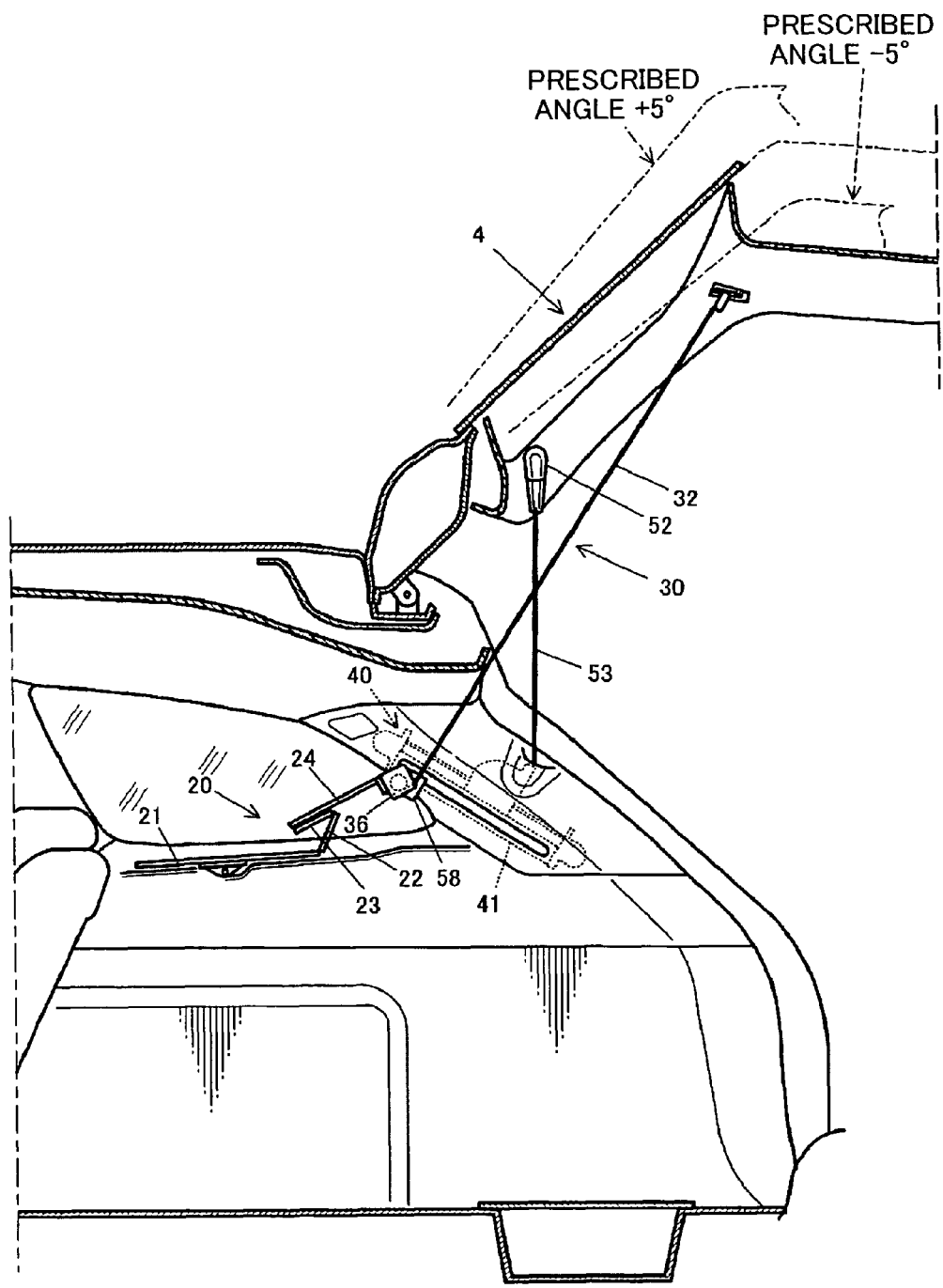
FIG. 14 is a side view of the vehicle rear section with the back door in a fully open condition.

Furthermore, when the back door 4 is fully opened as shown in FIG. 15, the slider 42 moves to an upper end section of the guide rail 41 as shown in FIG. 14 due to pulling out of the second linking wire 53, the front tonneau cover 20 is lifted up in the folded condition as a result thereof, and the rear end of the rear tonneau cover 30 is raised up such that the rear tonneau cover 30 deploys to form a screen. Accordingly, loading and unloading of cargo onto and from the cargo compartment floor can be easily performed.

Figure 16A:
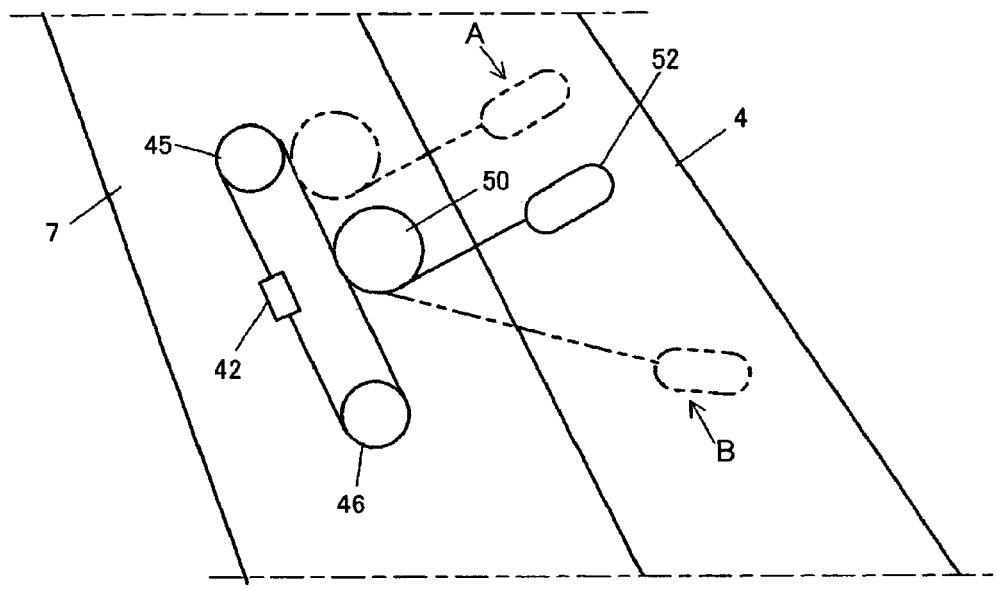
FIGS. 16A and 16B are views explaining alternative arrangement conditions of the interlocking mechanism.
Figure 16B:
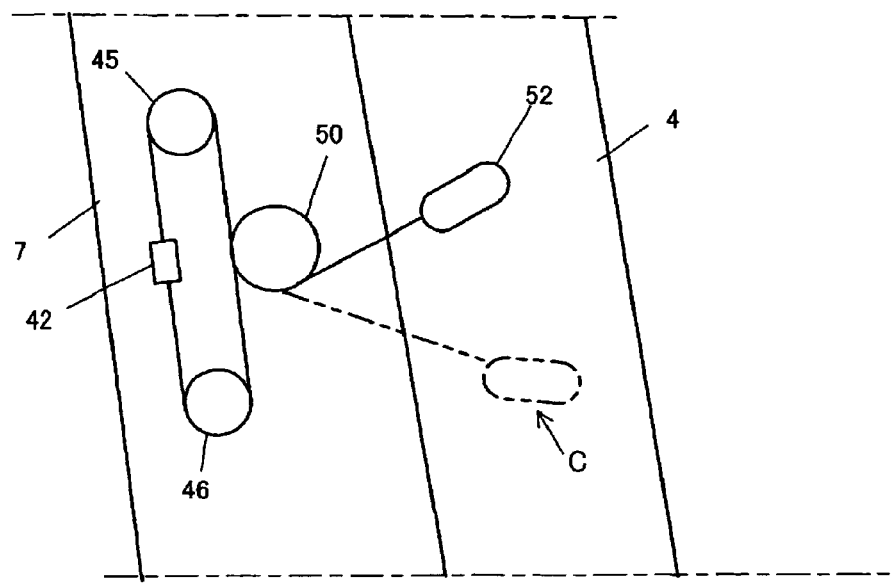

Although in this embodiment, the back door 4 and the first linking wire 51 are, as explained above, linked via the linking member 52, the second linking wire 53, and the rotary member 50 in such a case, it is sufficient that the second linking wire 53 can turn the rotary member 50 through interlocking with opening and closing of the back door 4, and the relationship between, for example, the motion direction of the second linking wire 53 and positioning of the first pulley 45 and the second pulley 46, etc. can be freely set. Therefore, the position of the connection section of the second linking wire 53 with respect to the back door 4 and positioning of the rotary member 50 and the first pulley 45 and the second pulley 46, etc. can, for example, be freely set as shown by dashed lines A, B of FIG. 16A. That is to say, restrictions related to the shape of vehicle side surfaces such as, for example, the rear pillar 7 can be eliminated and the degree of freedom in vehicle design can be enhanced. For example, even in a case wherein the rear pillar 7 extends in a substantially vertical direction, each of the above-explained members can be provided and the required functionality can be achieved by a configuration shown by solid lines or dashed lines C of FIG. 16B.

Furthermore, as the rotary member 50 comprises the first rotary member 48 wherearound the first linking wire 51 is wound or wrapped and the second rotary member 49 wherearound the second linking wire 53 is wrapped and whereupon the second linking wire 53 is engaged, a diameter of the first rotary member 48 differs from a diameter of the second rotary member 49, and in addition, the first rotary member 48 and the second rotary member 49 are disposed coaxial and configured so as to rotate in unison, a motion amount X of the connection section of the first linking wire 51 and the tonneau cover device 10 (that is, a motion amount of the slider 42) and a pull-out amount Y of the second linking wire 53 from the second rotary member 49 upon opening and closing of the back door 4 can be freely and independently set by adjusting a ratio between the diameter of the first rotary member 48 and the diameter of the second rotary member 49. That is to say, possible angles of opening and closing, etc. of the back door 4 can be freely set, irrespective of the motion amount X. Furthermore, the relationship between, for example, the motion direction of the second linking wire 53 and positioning of the first pulley 45 and the second pulley 46, etc. and the shape, etc. of the rear pillar 7 can be set arbitrarily, and possible angles of opening and closing, etc. of the back door 4 can be freely set.

As a guide rail 41 defining a path of motion of the connecting section of the tonneau cover device 10 and the first linking wire 51 (that is, the engagement boss 36 and the holder member 58) is provided, slight movement to the front, back, left, and right of the rear end of the path of motion of the front tonneau cover 20 can be prevented. Furthermore, as the guide rail 41 is provided on the rear pillar 7 in a forward-inclined condition, the guide rail 41 and the rear pillar 7 can be designed in parallel in a case wherein the rear pillar 7 is inclined forward.

As the rear pillar 7 comprises a pillar member 9 and the rear pillar trim 11 covering the pillar member 9, and in addition, in a case wherein the guide rail 41 is disposed in a space between the pillar member 9 and the rear pillar trim 11, the rotary member 50 is disposed in a space between the guide rail 41 and a rear end edge of the rear pillar trim 11, the rotary member 50 can be positioned so as to make effective use of dead space inside the rear pillar 7.

As the front tonneau cover 20 is divided in a longitudinal direction comprising a plurality of board members 21, 22, 23, 24 and is connected so as to be capable of bending at intervals between adjacent board members, in a case wherein the front end thereof is supported by the left and right sides of the cargo compartment and the rear end thereof is connected to the first linking wire 51, when the back door 4 is opened or closed, the front tonneau cover 20 folds up in an interlocked manner therewith. Furthermore, appearance can be improved through the use of the board members.

As the board members 21, 22, 23, 24 of the front tonneau cover 20 are connected so as to be capable of being overlaid and folded in a condition wherein the connection sections of the rear end section (that is, the engagement bosses 36 and the holder members 58) have been removed, the front tonneau cover 20 can be made compact when not needed.

As the rear tonneau cover 30 is provided such that the front end section thereof is connected to the rear end section of the front tonneau cover 20 and the rear end section thereof is connected to the back door 4, the space between the rear end section of the front tonneau cover 20 and the back door 4 can be favorably covered. Furthermore, as the rear tonneau cover 30 is configured as a sheet member so as to be capable of winding, even in a case wherein a distance between the connection sections connecting with the rear end section of the front tonneau cover 20 (that is, the engagement bosses 36 and the holder members 58) and the connecting sections connecting with the back door 4 changes in line with opening or closing of the back door 4, the rear tonneau cover 30 can favorably adapt to this change.

As the front tonneau cover 20 and the rear tonneau cover 30 are configured so as to be capable of being removed from the chassis, the front tonneau cover 20 and the rear tonneau cover 30 can be removed when not needed so as to enlarge the cargo compartment upwards.

As shown by the dashed lines in FIG. 14, error in an angle of opening of the back door 4 of, for example, approximately ±5° with respect to a prescribed opening angle occurs in each manufactured vehicle due to differences in a degree of expansion of a damper for supporting the back door 4 in the open condition and other production variance, etc. Therefore, in a case wherein the opening angle varies towards a positive side, or in other words, wherein the back door 4 opens by an excessive degree greater than the prescribed opening angle, after the slider 42 makes contact with the cover member 41a of the guide rail 41, the slider 42 is further pulled up while being pressed against the cover member 41a, and as a result, the first linking wire 51 or the second linking wire 53 is liable to break, the other components constituting the interlocking mechanism 40 are liable to be damaged, or the chassis side members whereupon the interlocking mechanism 40 is mounted are liable to be damaged. Furthermore, in a case wherein the opening angle varies towards a negative side, or in other words, wherein the back door 4 does not open to the prescribed opening angle, the slider 42 does not move as far as an upper end position of the guide rail 41, or in other words, the rear end of the front tonneau cover 20 and the front end of the rear tonneau cover 30 do not rise to the prescribed positions, and as a result thereof, the rear end of the front tonneau cover 20 or the rear tonneau cover 30 more easily poses an obstruction to loading and unloading cargo onto and from the rear floor panel 2. In the interlocking mechanism 40 according to this embodiment of the present invention, however, the above-mentioned linking member 52 is configured as explained hereinafter in order to prevent the occurrence of problems even when error occurs with respect to the prescribed angle.

Figure 17A:
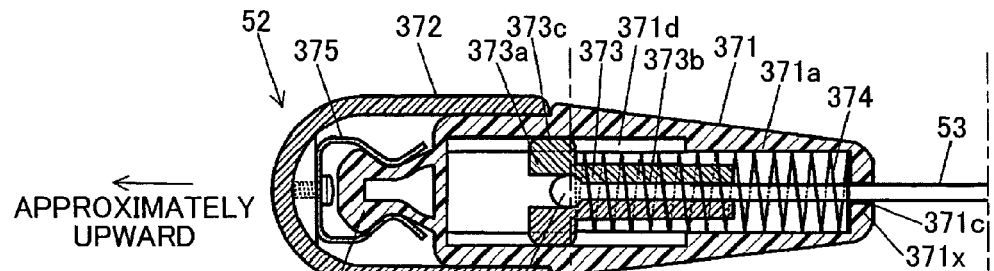
FIGS. 17A to 17D are views explaining a detailed construction of a connecting member and an operational advantage thereof.
Figure 17B:
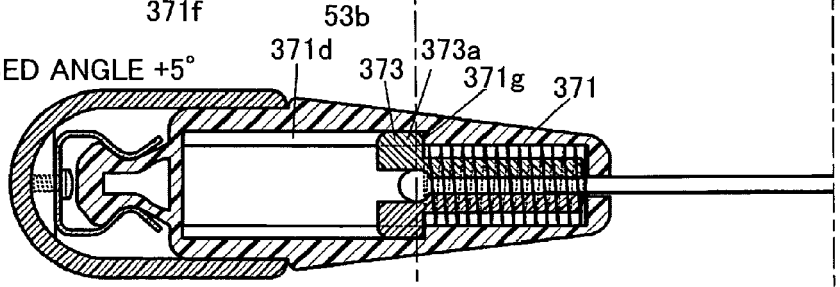

In specific terms, as shown in FIGS. 17A to 17B, the linking member 52 comprises a first bracket 371 having a hollow, cylindrical shape, a cap-shaped second bracket 372 covering an end section of the first bracket 371, a moving member 373 provided at a hollow section of the first bracket 371 so as to be capable of sliding in a longitudinal direction thereof, a coil-shaped spring 374 interposed between a large diameter section 373a of the moving member 373 and a lower end wall 371x of the first bracket 371, and a leaf spring 375 secured by a screw to a top section inner surface of the second bracket 372.

Figure 13:
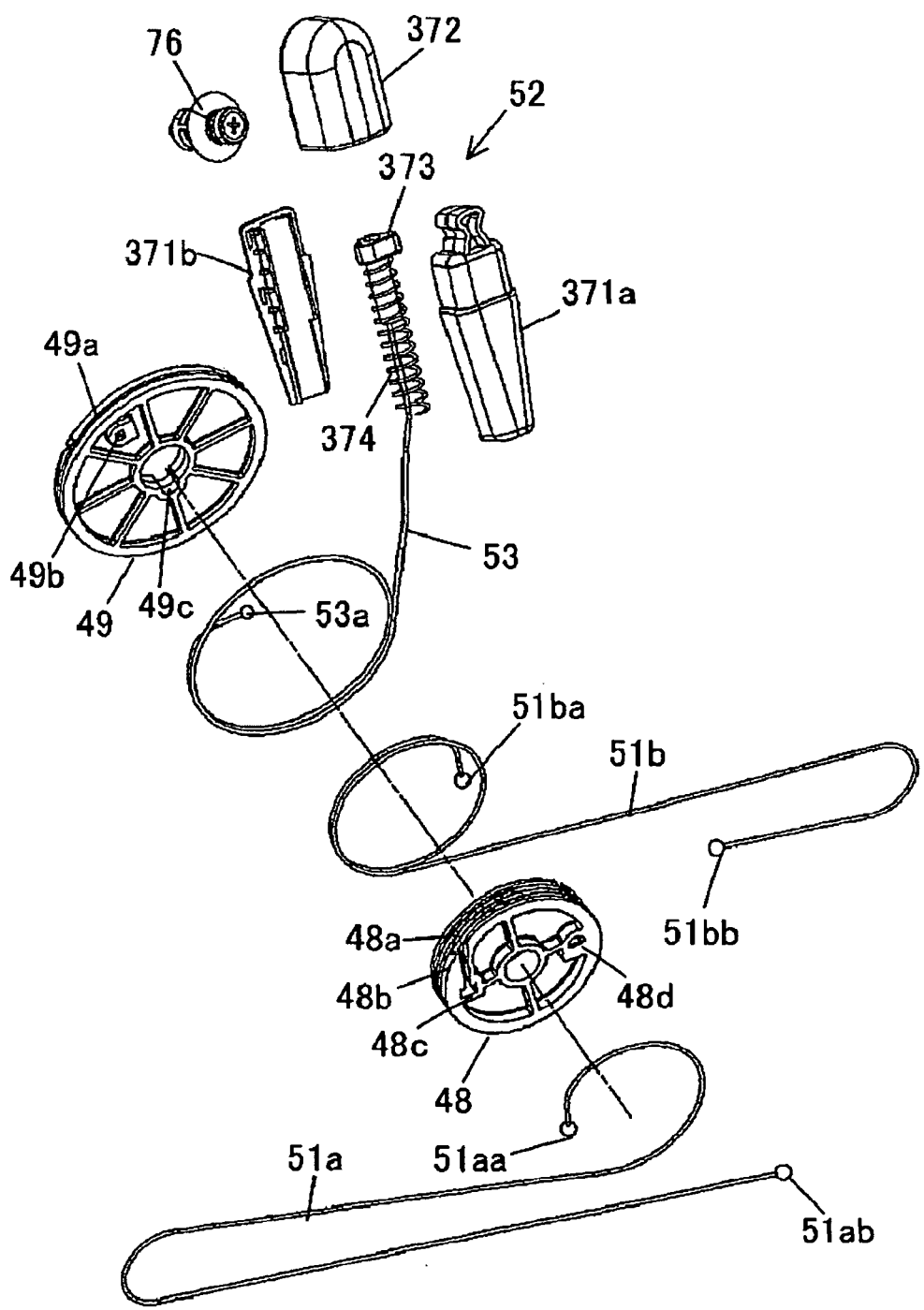
FIG. 13 is an exploded view (part 2) of the interlocking mechanism.

As shown in FIG. 13, the first bracket 371 comprises a pair of half cases 371a, 371b. Furthermore, a through hole 371c wherethrough the second linking wire 53 passes is provided at a base section of the first bracket 371. A diameter of the through hole 371c is significantly larger than a diameter of the second linking wire 53.

A clip engagement hole capable of housing a clip member 76 (see FIG. 13) fixed to the back door 4 is formed in the second bracket 372, and the second bracket 372 (and, therefore, the linking member 52) is fixed to the back door 4 by inserting the clip member 76 into the clip engagement hole. It should be noted that the linking member 52 is, in the fixed condition thereof, supported so as to be capable of rotating about the clip member 76.

A through hole 373b wherethrough the second linking wire 53 passes is formed at the center of the moving member 373 in a radial direction thereof and extending in a longitudinal direction thereof. A diameter of the through hole 373b is larger at the large diameter section 373a such that an end section 53b of the second linking wire 53 can engage with the moving member 373. As a result, the first bracket 371 is connected to the rotary member 50 via the second linking wire 53.

A spring force of the spring 374 is set so as to be larger than a spring force of the clockwork spring mechanism 56 of the rotary member 50.

A channel 371d is formed on an inner surface of the hollow section of the first bracket 371 extending in a longitudinal direction thereof, a protrusion 373c is formed on the large diameter section 373a of the moving member 373, and the protrusion 73c fits into the channel 371d of the first bracket 371. This configuration prevents twisting of the second linking wire 53 due to rotation of the moving member 373.

A protrusion section 371f protruding towards the second bracket 372 and having an hourglass-shaped mid-section in the longitudinal direction thereof is formed at a bottom section 371e of the first bracket 371 facing the second bracket 372. Furthermore, the leaf spring 375 of the second bracket 372 is shaped so as to match a shape of the side surface of the protrusion section 371f, and the protrusion section 371f is clamped by an elastic force thereof. As a result, the first bracket 371 and the second bracket 372 are joined as one.

The degree to which the second linking wire 53 can be pulled out is set such that, as shown in FIG. 17A and FIG. 18, the moving member 373 of the linking member 52 compresses the spring 374 by a prescribed amount and is positioned at a central position of the range of possible motion thereof in a condition wherein the opening angle of the back door 4 is ±0° with respect to the prescribed angle, or in other words, in a case wherein the slider 42 has made contact with the cover member 41a of the guide rail 41 and can move no further upwards.

With such a configuration, in a case wherein the back door 4 opens by an amount equal to or greater than the prescribed angle but no more than 5° in excess thereof, as shown in FIG. 17B, the first bracket 371 and the second bracket 372 alone move further upwards together with the back door 4 while the spring 374 is further compressed. That is to say, the back door 4 can open by an additional amount even after the second linking wire 53 can no longer be further pulled out.

Figure 17C:
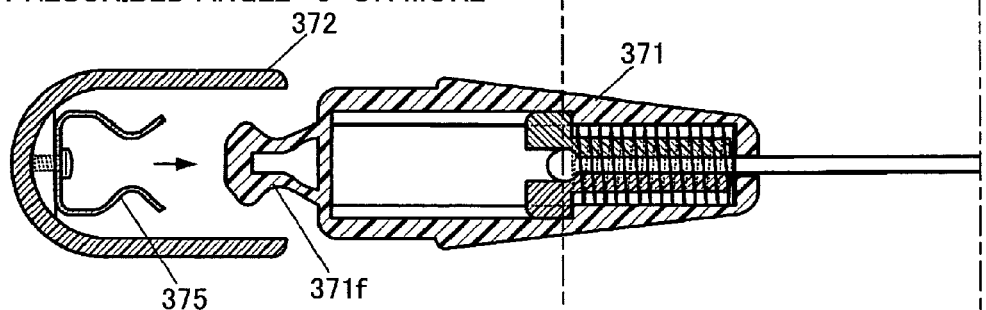

In a case wherein the back door 4 opens by at least 5° in excess of the prescribed angle, whereat the moving member 373 makes contact with a lower end 371g of the channel 371d of the first bracket 371 and can move no further, the leaf spring 375 of the second bracket 372 and the protrusion section 371f of the first bracket 371 disengage as shown in FIG. 17C. Accordingly, damage to the interlocking mechanism 40 and chassis components as explained above can be prevented. It should be noted that, with this configuration, in a case wherein a large load acts on an inner surface, etc. of the back door 4 via the second linking wire 53 and the linking member 52 upon motion of the back door 4 in the direction of opening thereof as a result of, for example, placing of a relatively heavy object on the tonneau cover device 10, the leaf spring 375 of the second bracket 372 and the protrusion section 371f of the first bracket 371 disengage, and as a result thereof, damage to the above-mentioned components as a result of the placing of heavy objects on the tonneau cover device 10 can be prevented.

Figure 17D:
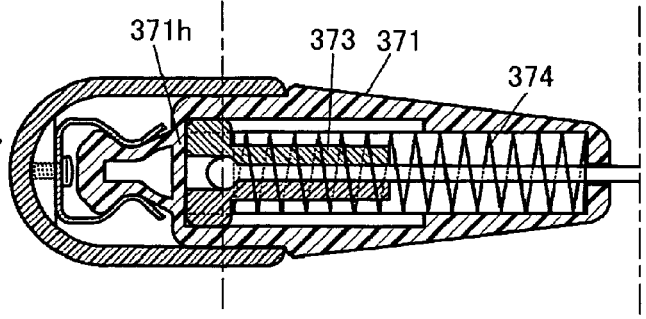

Meanwhile, in a case wherein the back door 4 opens by an amount less than the prescribed angle, the moving member 373 moves towards an upper end wall of the first bracket 371 as a result of a restoring force of the spring 374, and therefore, the second linking wire 53 is pulled towards the linking member 52, and as shown in FIG. 17D, the slider 42 moves upward until contact thereof with the cover member 41a of the guide rail 41. That is to say, the rear end of the front tonneau cover 20 and the front end of the rear tonneau cover 30 rise to the prescribed position even in a case wherein the back door 4 does not open as far as the prescribed angle, and obstruction to loading and unloading cargo onto and from the cargo compartment floor can be avoided.

It should be noted that, although the above explanation refers to problems and countermeasures associated only with error in the angle of the back door 4 upon opening thereof of approximately ±5° with respect to the prescribed angle, the angle of the back door 4 upon closing thereof is directly regulated in line with a position at which the back door 4 closes the opening section on the rear surface of the chassis, and therefore, no error occurs with respect to the prescribed angle thereof. However, even when the back door 4 is closed, problems due, for example, to disparity in a wire length of the first linking wire 51 or the second linking wire 53 and other production variance, etc. can lead to the slider 42 not moving to the prescribed lower end position of the guide rail 41, or in other words, the rear end of the front tonneau cover 20 and the front end of the rear tonneau cover 30 not dropping to the prescribed positions, and as a result thereof, the rear end of the front tonneau cover 20 and the front end of the rear tonneau cover 30 remain raised upward and appearance-related problems are likely. Furthermore, although a configuration may, as a countermeasure, be provided with a stopper regulating the prescribed lower end position, so that even in cases wherein error occurs, the lower end position is always regulated by the stopper, but excess in the length of a wire may occur upon contact of the slider 42 with the stopper in such a case, and the resultant wire looseness would likely lead to operation being adversely affected due to interference thereof with nearby members or to appearance-related problems. Accordingly, in the interlocking mechanism 40 according to this embodiment of the present invention, the above-mentioned slider 42 is configured as explained hereinafter in order to prevent the occurrence of problems even when the above-explained error or disparity occurs.

In specific terms, as shown in FIG. 19A, the slider 42 comprises an outer slider member 81, a shaft 82 whereupon wall sections at each end of the outer slider member 81 are fixed and supported, an inner slider member 83 supported by the shaft 82 so as to be capable of sliding in an axial direction thereof, and a coil spring 84 interposed on the shaft 82 between a lower-end wall section of the outer slider member 81 and the inner slider member 83. Furthermore, the holder mounting bracket 57 extending to an exterior section of the guide rail 41 via a slit 41c of the guide rail 41 is fixed to the inner slider member 83, and the holder member 58 is fixed to the holder mounting bracket 57. A spring force of the spring 84 of the slider 42 is set so as to be smaller than the spring force of the clockwork spring mechanism 56 of the rotary member 50.

Figure 20:
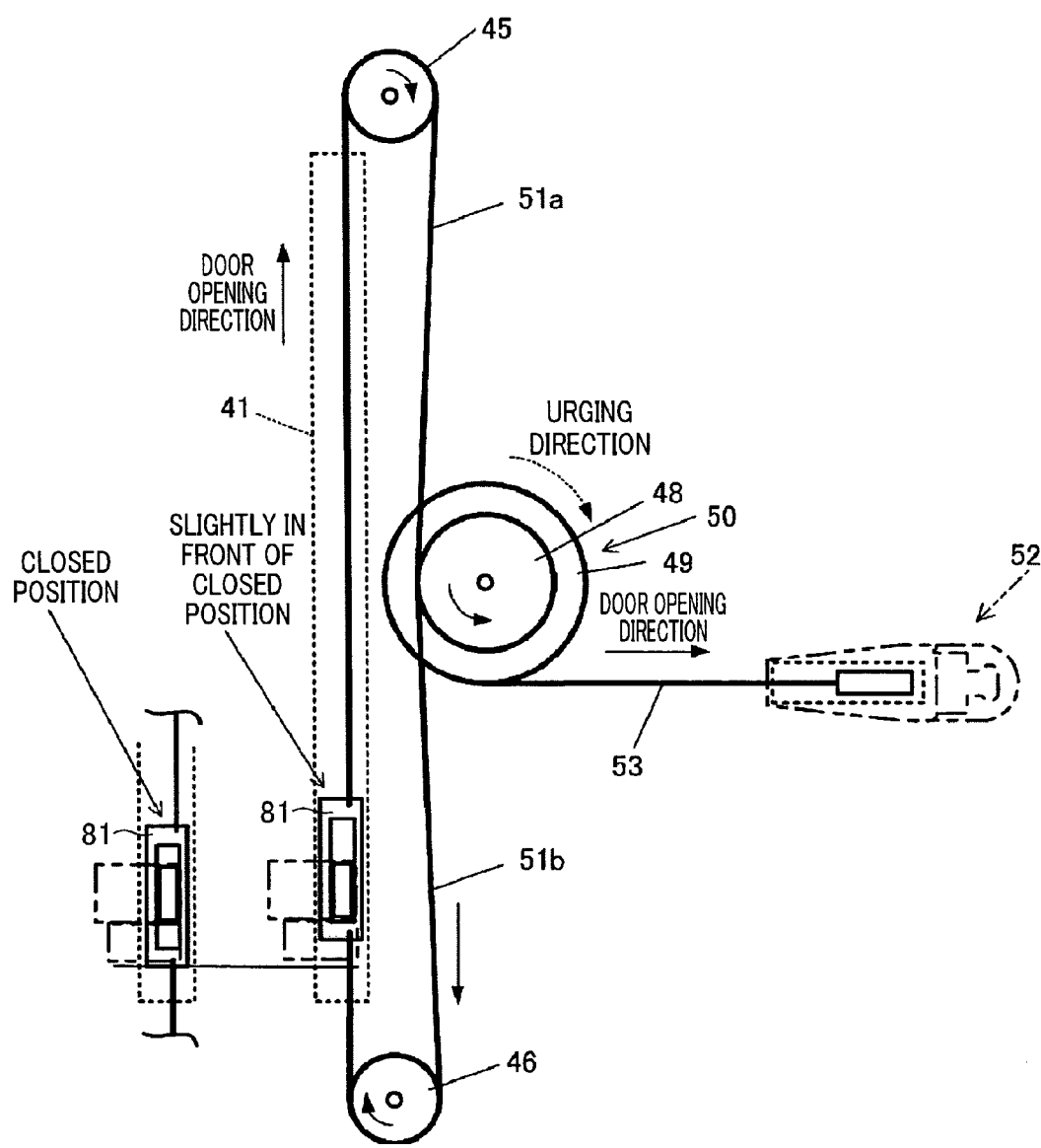
FIG. 20 is a view for explaining operational advantage gained using the slider member.

When the back door 4 is positioned slightly in front of the closed position thereof during closing thereof, as shown in FIG. 19B and FIG. 20, the holder mounting bracket 57 of the inner slider member 83 makes contact with the stopper member 59, and when the back door 4 is further closed, the outer slider member 81 alone moves further downwards as the spring 84 is compressed. Furthermore, when the back door 4 reaches the closed position thereof, the outer slider member 81 stops at a position before contact thereof with the cover member 41b of the guide rail 41 as shown in FIG. 19A and FIG. 20. That is to say, the lengths of the first member 51a and the second member 51b of the first linking wire 51 and the distance between the stopper member 59 and the cover member 41b of the guide rail 41 are set such that the above-described condition may be realized.

With such a configuration, when the back door 4 is closed, after the inner slider member 83 makes contact with the stopper member 59 at a position slightly in front of the closed position, the spring 84 is further compressed as the inner slider member 83 remains in said state of contact and the outer slider member 81 alone moves further downwards. Accordingly, the prescribed lower end position of the slider 42 on the guide rail 41 is regulated in a sure and reliable manner by the stopper member 59, and the first linking wire 51 and the second linking wire 53 remain free of looseness as a result of downward motion of the outer slider member 81 due to compression of the spring 84. Consequently, sure and reliable motion of the slider 42 to the lower end position of the guide rail 41 and prevention of interference with nearby members and appearance-related problems due to looseness in wires can both be achieved. Furthermore, as the holder mounting bracket 57 (and the holder member 58) remain urged against the stopper 59 by the spring 84 at the lower end position of the guide rail 41, the above-explained configuration also prevents looseness and rattling of the holder mounting bracket 57 at the lower end position, or in other words, looseness and rattling of the rear end of the front tonneau cover 20 and the front end of the rear tonneau cover 30.

It should be noted that, a recess 83a is formed in the inner slider member 83 at a position opposing an inner surface of the outer slider member 81, a leaf spring 85 is engaged with the recess 83a, and the leaf spring 85 acts so as to push the inner slider member 83 and the outer slider member 81 apart in a vertical direction as shown in FIGS. 19A and 19B, or in order words, to urge the inner slider member 83 and the outer slider member 81 against an inner surface of the guide rail 41. As a result thereof, looseness and rattling of the slider 42 inside the guide rail 41 is prevented.

It should be noted that, while the first linking wire 51 is engaged with and wrapped around the rotary member 50 at both ends thereof in this embodiment, the first linking wire 51 can also be similarly wound around the first pulley 45 and the second pulley 46. In such a case, measures can be taken to prevent sliding with respect to the rotary member 50.

Hereinafter, the guide rail 41, the interlocking mechanism 40 for the tonneau cover, and the slider 42 are described in detail with reference to FIGS. 22 to 28C.

Figure 22:
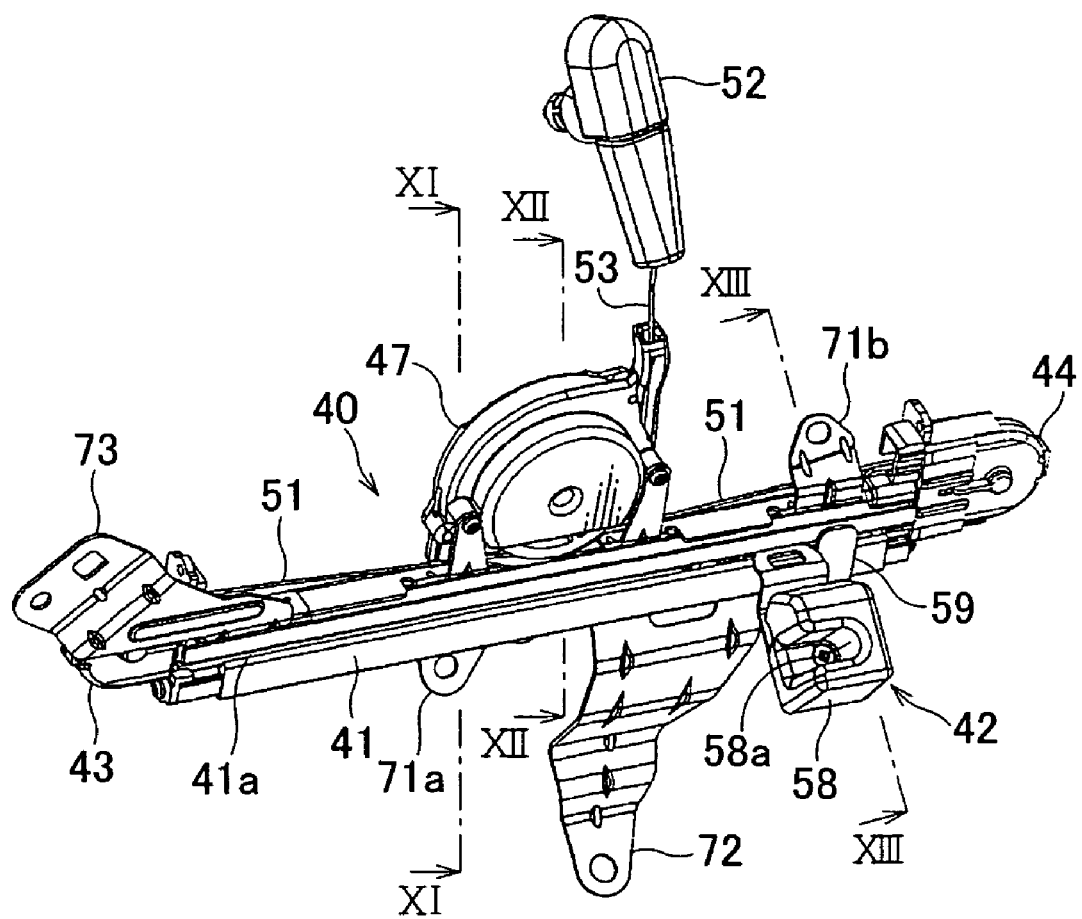
FIG. 22 is a perspective view showing a guide rail, a interlocking mechanism, and a slider.
Figure 23A:
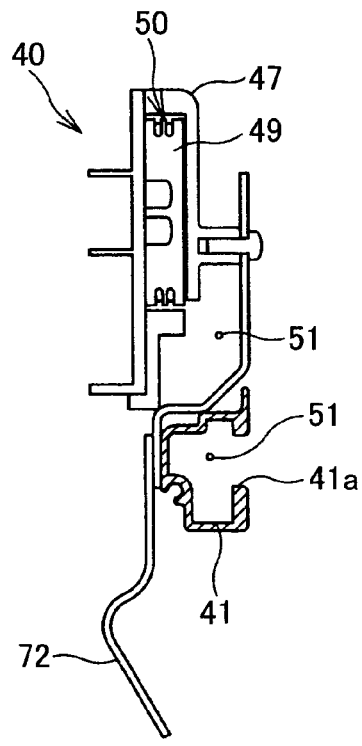
FIG. 23A is a cross-sectional view along a line XI-XI of FIG. 22.
Figure 23B:
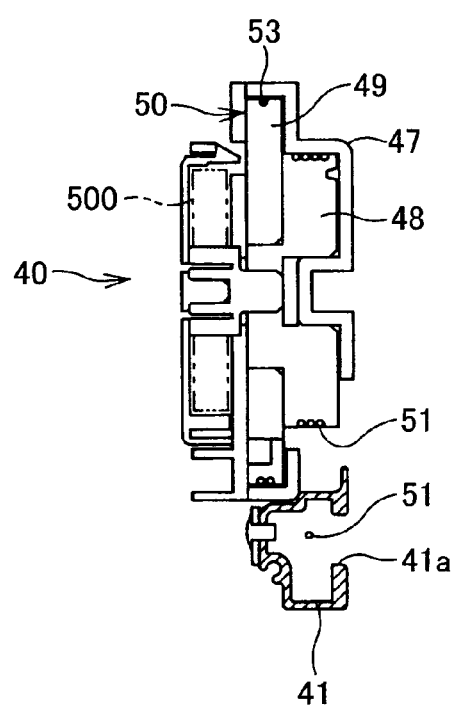
FIG. 23B is a cross-sectional view along a line XII-XII of FIG. 22.
Figure 23C:
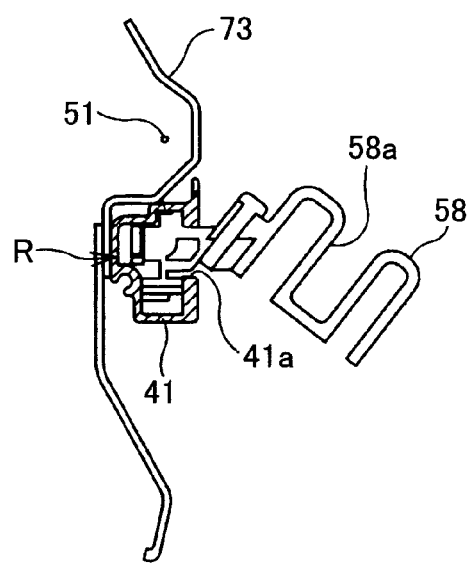
FIG. 23C is a cross-sectional view along a line XIII-XIII of FIG. 22.
Figure 24B:
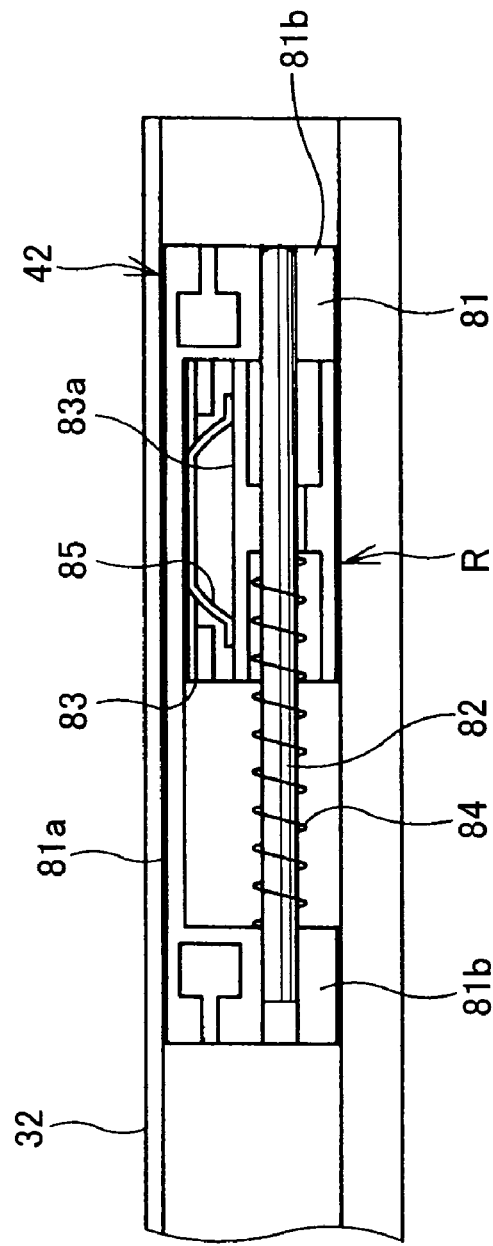
FIG. 24B is a side cross-sectional view showing the slider.
Figure 24A:
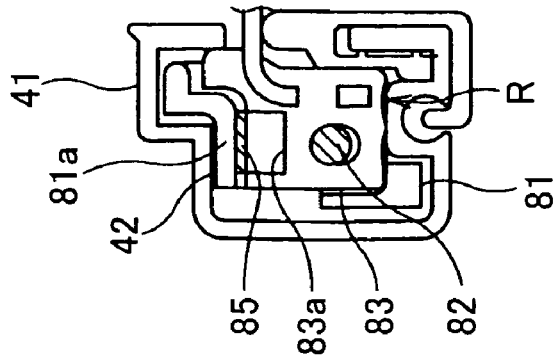
FIG. 24A is cross-sectional view showing an interior mechanism of the slider.
Figure 25:
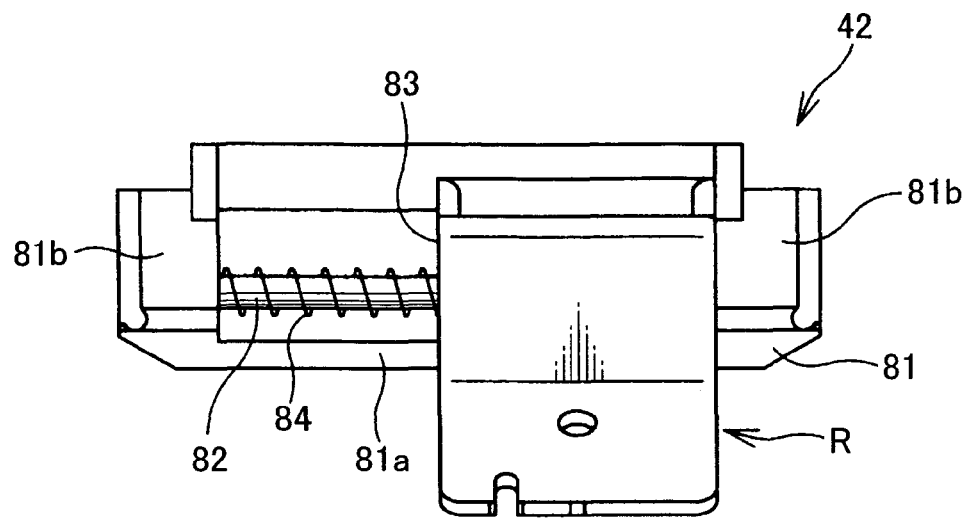
FIG. 25 is a diagram illustrating an operation of the slider.
Figure 26:
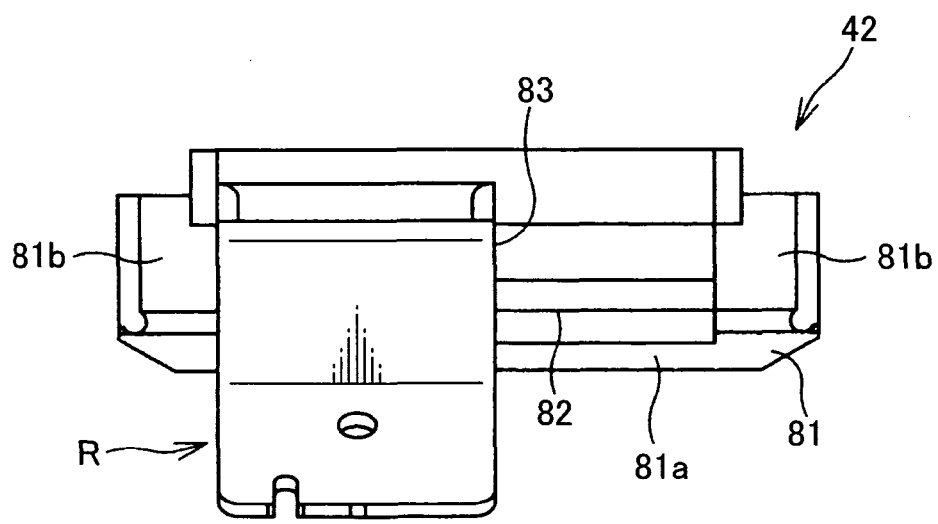
FIG. 26 is a diagram illustrating an operation of the slider.

FIG. 22 shows the interlocking mechanism 40 of FIG. 10 viewed from the opposite direction thereof, FIG. 23A is a sectional view taken along the line XI-XI of FIG. 22, FIG. 23B is a sectional view taken along the line XII-XII of FIG. 22, FIG. 23C is a sectional view taken along the line XIII-XIII of FIG. 22, FIG. 24 is a diagram illustrating the slider 42, and FIGS. 25 and 26 are diagrams explaining an operation of the slider 42.

Figure 27:
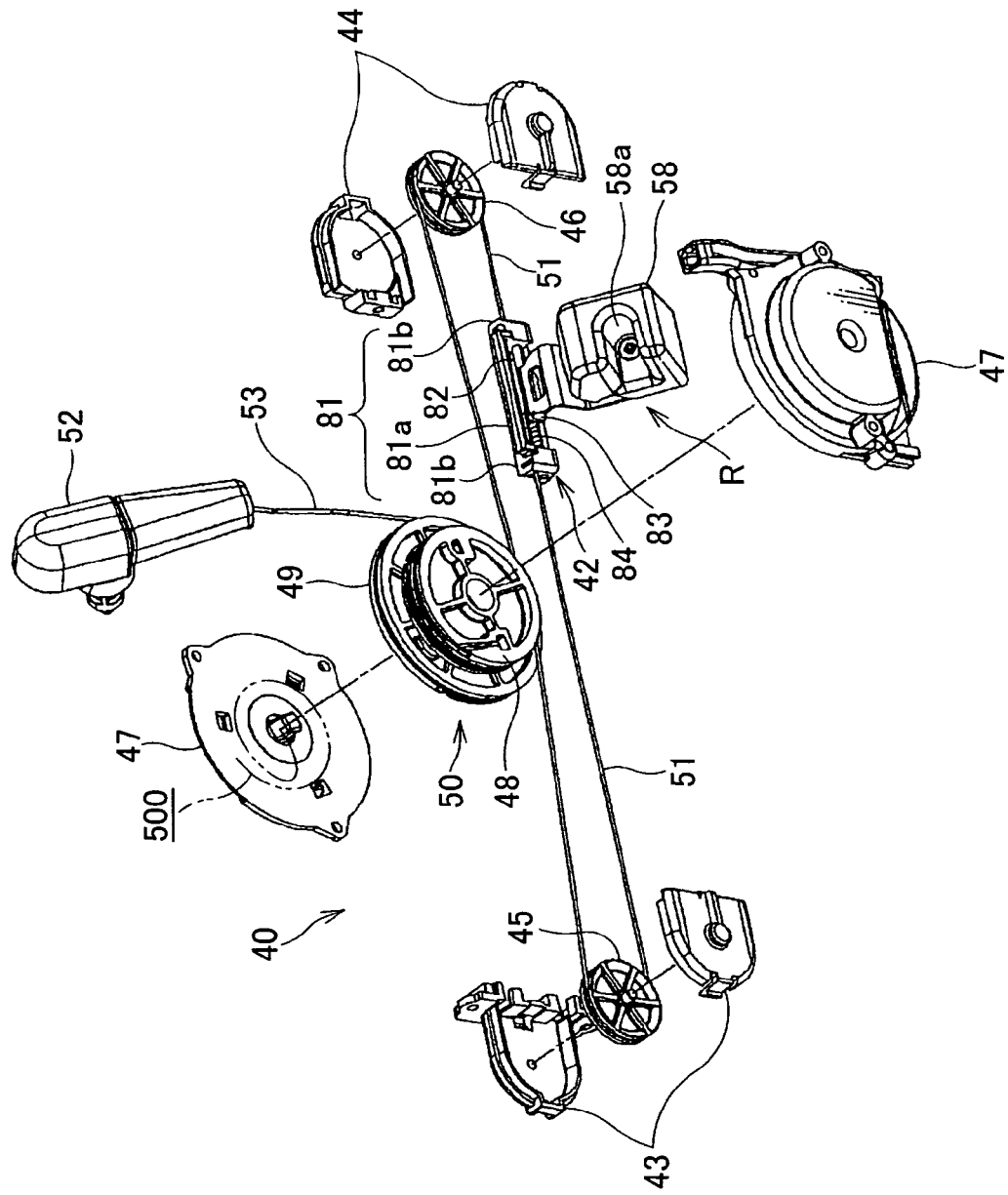
FIG. 27 is an exploded perspective view showing the interlocking mechanism and the slider.

FIG. 27 is an exploded perspective view showing the interlocking mechanism 40 and the slider 42 and differs from FIG. 12 in that the spiral spring 500 is shown.

Figure 28A:
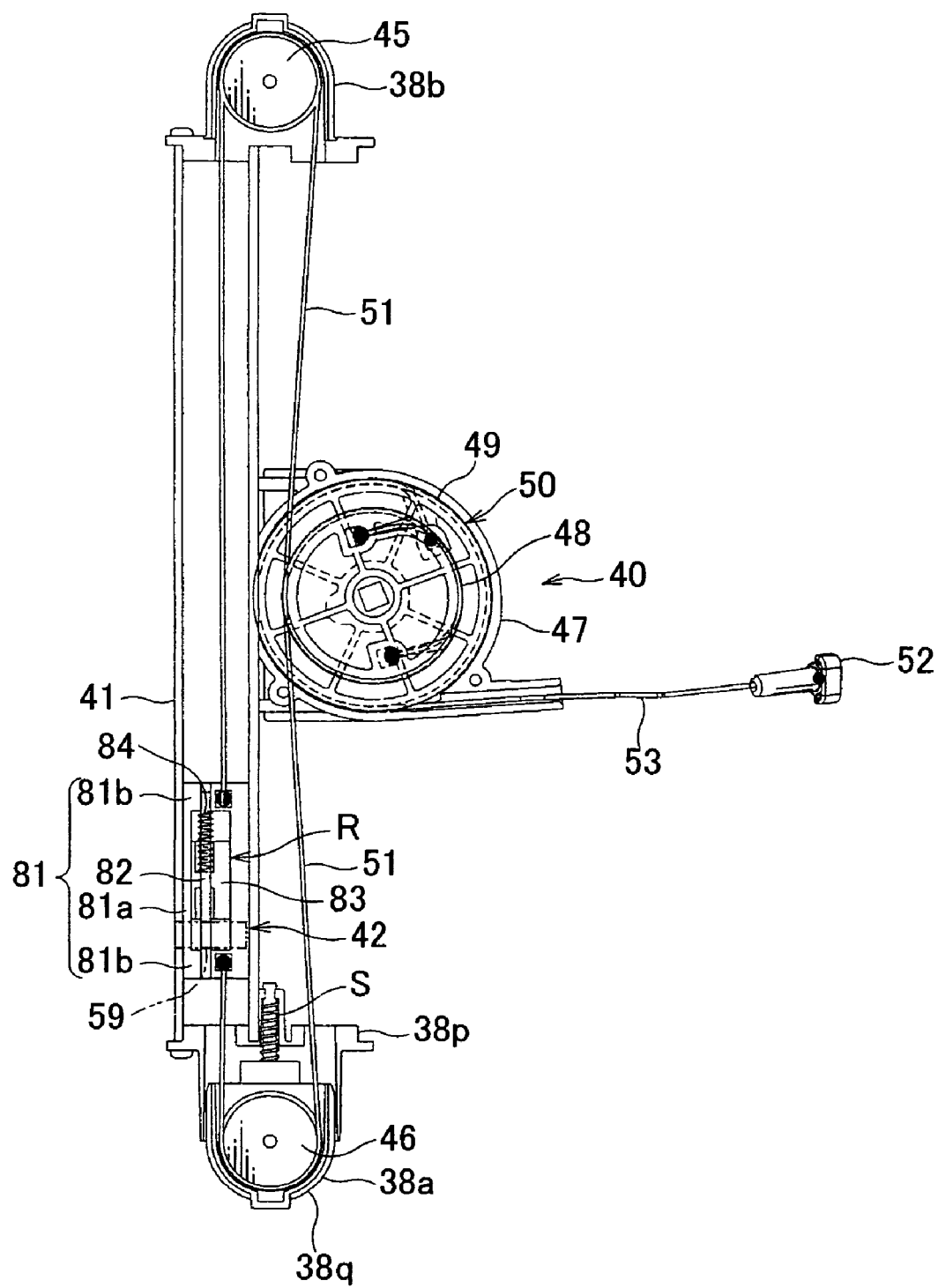
FIG. 28A is a diagram illustrating a condition wherein the slider is positioned at a rear end section of the guide rail.
Figure 28B:
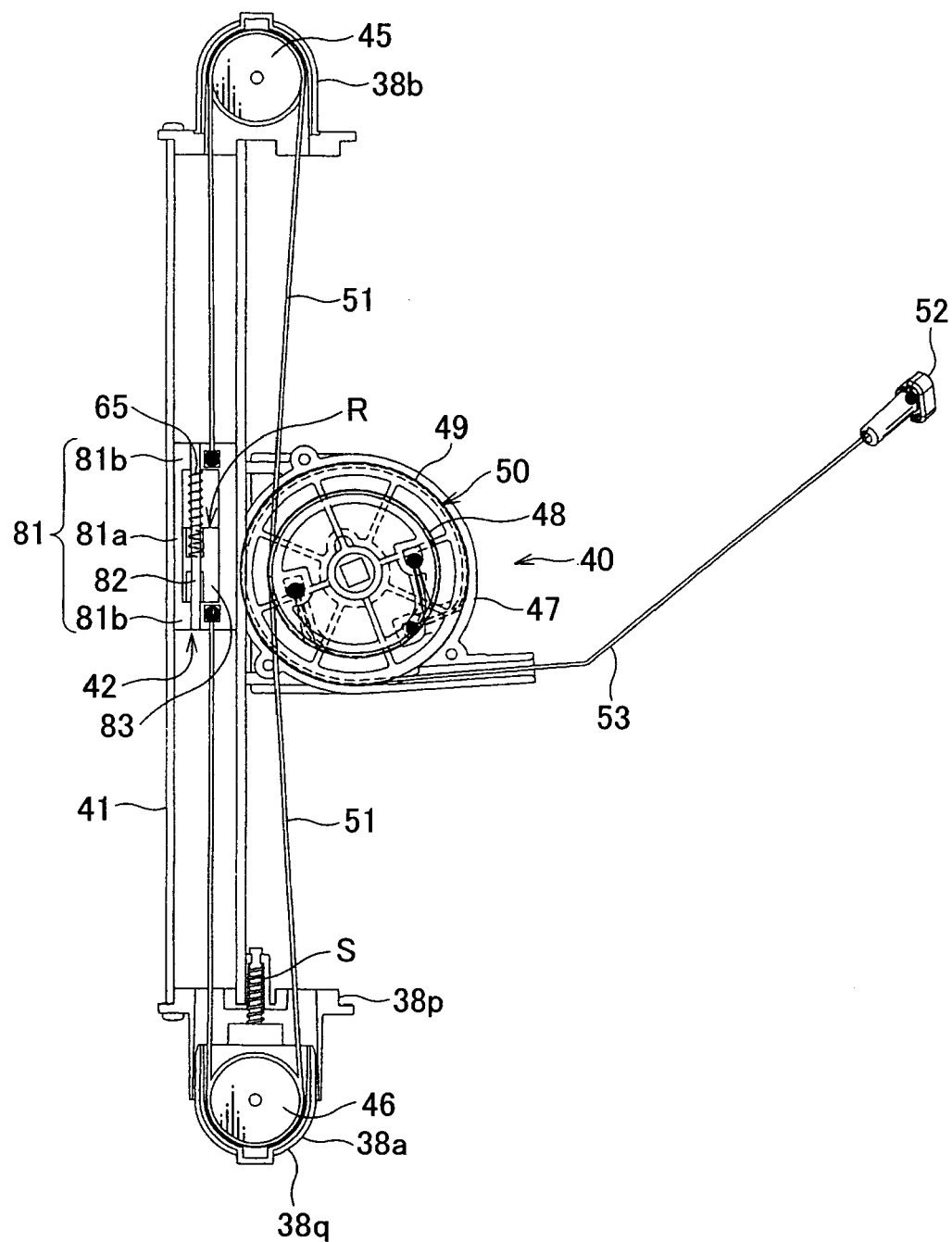
FIG. 28B is a diagram illustrating a condition wherein the slider is positioned at an intermediate section of the guide rail.
Figure 28C:
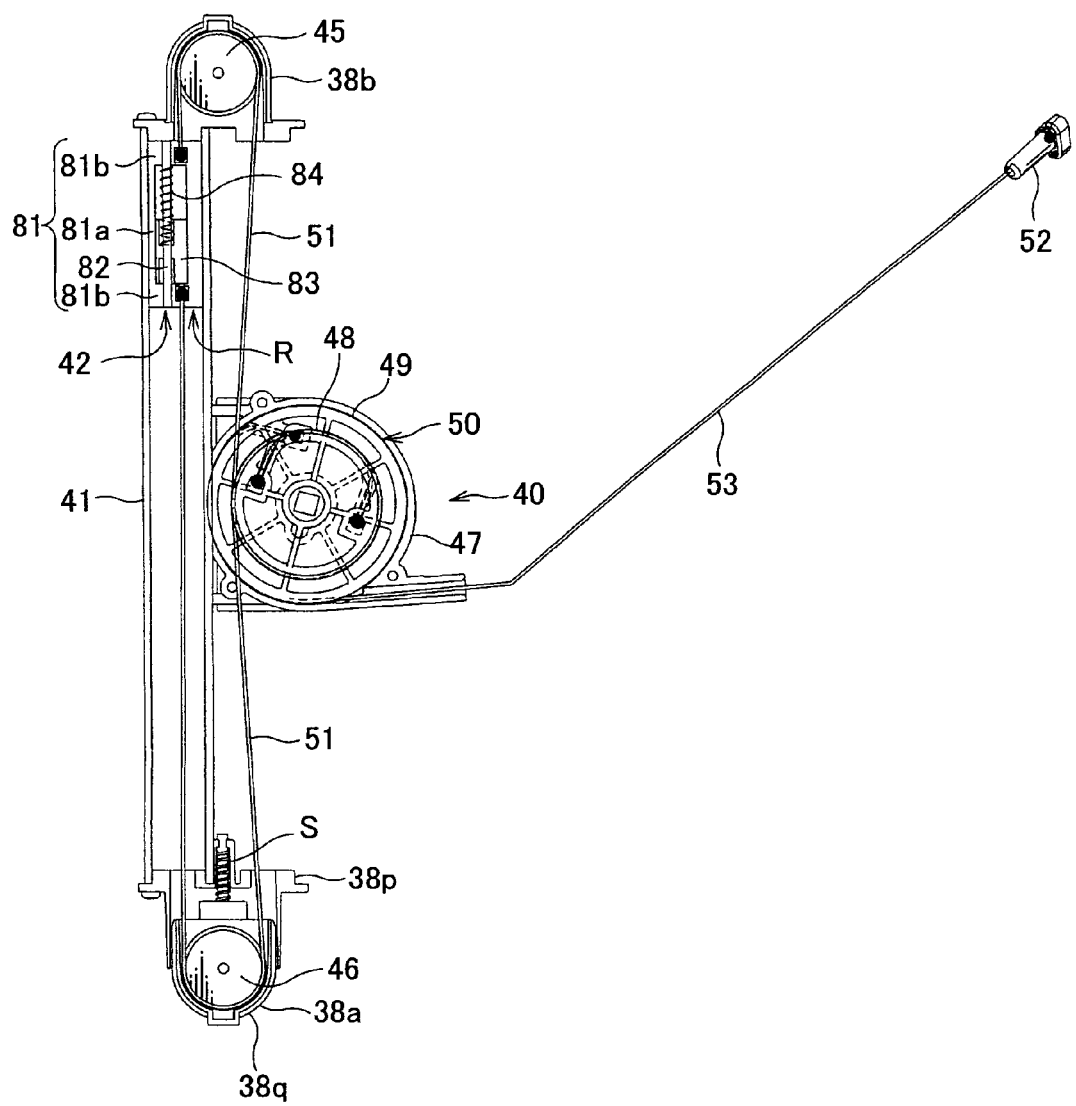
FIG. 28C is a diagram illustrating a condition wherein the slider is positioned at a front end section of the guide rail.

FIGS. 28A to 28C are diagrams showing conditions of motion of the slider 42 along the guide rail 41. Specifically, FIG. 28A shows a condition wherein the slider 42 is positioned at a rear end section of the guide rail 41, FIG. 28B shows a condition wherein the slider 42 is positioned at an intermediate section of the guide rail 41, and FIG. 28C shows a condition wherein the slider 42 is positioned at a front end section of the guide rail 41.

As shown in FIGS. 22 to 23C and FIGS. 28A to 28C, each of the two guide rails 41 is of a substantially square cylindrical shape formed having an opening at each end thereof and a long opening 41c on a wall section thereof. The slider 42 is provided so as to be capable of moving reciprocally inside the guide rail 41 in a longitudinal direction thereof.

The guide rail 41 is mounted on the trunk side lower trim 13 inclined upwards and towards the front of the vehicle 1. More specifically, the guide rail 41 is mounted inclined on the trunk side lower trim 13 such that an end section thereof is disposed at a rear end section of the front tonneau cover 20, deployed having a planar shape as explained above, and another end section thereof is disposed above the end section and more towards the front of the vehicle 1 in the longitudinal direction thereof (see FIG. 3B).

It should be noted that the guide rail 41 need not necessarily be mounted having the above-explained inclined orientation, and for example, may be provided oriented in the longitudinal direction of the vehicle 1. That is to say, as it is sufficient for the front tonneau cover 20 to be deployed and folded as a result of motion of the slider 42 along the guide rail 41, it is acceptable for the left and right guide rails 41 to be mounted on the left and right side wall sections 13 of the cargo compartment T, respectively, having a component thereof oriented in the longitudinal direction of the vehicle 1.

Furthermore, as shown in FIG. 22 to FIG. 28C, each of the pair of sliders 42 is configured so as to be capable of moving along one of the guide rails 41. More specifically, a slider member comprises a slider 42 capable of moving inside the guide rail 41 as explained above and a holder member 58 capable of supporting an end section of the above-explained engagement boss 36. (The holder member 58 is omitted from FIGS. 25 and 26, and only a plate section for mounting thereof is shown.)

The slider 42 comprises an outer slider member 81 connected to the first linking wire 51 and capable of sliding motion within the guide rail 41, an inner slider member 83 supported by the outer slider member 81 so as to be capable of relative motion in the longitudinal direction of the guide rail 41, and a coil spring 84 acting as a runner urging member urging the inner slider member 83 towards a prescribed initial position with respect to the outer slider member 81 in the longitudinal direction of the guide rail 41. It should be noted that a runner R is a member combining the inner slider member 83, capable of moving relative to the slider 42, and the holder member 58 connected as one therewith.

The outer slider member 81 comprises a pair of support end members 81b supported with an interval therebetween by an intermediate support member 81a and a rod-shaped shaft 82 provided between the support end members 81b. The outer slider member 81 is capable of moving freely inside the guide rail 41 and the motion thereof towards each end of the guide rail 41 is regulated through contact thereof with pulley support cases 43, 44 provided at each end of the guide rail 41. That is to say, the outer slider member 81 is capable of moving along the guide rail 41 in a range between contact thereof with the pulley support cases 43, 44 provided at each end of the guide rail 41.

As a result of passing of the shaft 82 through a hole formed in the inner slider member 83, the inner slider member 83 is supported so as to be capable of reciprocal motion between the support end members 81b.

A coil spring insertion hole wherein the coil spring 84 can be inserted is formed at both end sections of the hole of the inner slider member 83 through which the shaft 82 is passed. Furthermore, the coil spring 84 is fitted onto the shaft 82, and with one end section thereof inserted into the coil spring insertion hole as explained above, is interposed between the support end member 81b positioned towards the front of the vehicle 1 and the inner slider member 83. The coil spring 84 urges the inner slider member 83 towards the support end member 81b positioned towards the rear of the vehicle 1. That is to say, the position whereat the inner slider member 83 makes contact with the support end member 81b positioned towards the rear of the vehicle 1 constitutes an initial position of the inner slider member 83 with respect to the outer slider member 81 (see FIGS. 24A, 24B, and 25). With the above-explained configuration, therefore, in a condition wherein the inner slider member 83 is disposed at a specific position along the guide rail 41, the outer slider member 81 can move further backwards along the guide rail 41 by compressing and deforming the coil spring 84 (see FIG. 26).

The holder member 58 is formed as one with the inner slider member 83 and configured so as to be capable of moving along the guide rail 41 in the longitudinal direction thereof together with the inner slider member 83. As explained above, the runner R comprises the holder member 58 and the inner slider member 83. It should be noted that the holder member 58 and the inner slider member 83 are configured as one member, and the runner R is supported by the outer slider member 81 so as to be capable of moving along the guide rail 41 in the longitudinal direction thereof. Furthermore, the holder member 58 passes through the opening 41c and an opening formed in the rear pillar 7 and protrudes into the cargo compartment T, and a fitting groove 58a capable of supporting the front tonneau cover 20 is formed in the holder member 58 for insertion of an engagement boss 36 of the front tonneau cover 20. It should be noted that the engagement boss 36 is supported so as to be capable of rotating by the fitting groove 58a.

As shown in FIG. 28A, the outer slider member 81 makes contact with, and is stopped by, the stopper member 59 of the guide rail 41 disposed towards the rear of the vehicle 1 before the outer slider member 81 reaches the rear-most position of the guide rail 41, and therefore, the positions of the holder member 58 and the inner slider member 83 are regulated by the stopper member 59. That is to say, the runner R makes contact with the stopper member 59 at a rear end section of the guide rail 41, and as such, the stopper member 59 functions as a stopper regulating a range of motion of the runner R. Upon motion of the slider 42 towards the rear of the vehicle 1 along the guide rail 41, the outer slider member 81 can move further towards the rear of the vehicle 1 after the position of the holder member 58 and the inner slider member 83 has been regulated by the stopper member 59.

A recess 83a for housing a leaf spring is formed at a section of the inner slider member 83 facing an inner surface of the outer slider member 81, and a leaf spring 85 functioning as a runner slide urging member is housed inside the recess 83a for housing the leaf spring. The leaf spring 85 is formed having a substantially U-shaped bend at an approximate center section of a long plate-like spring piece thereof and is housed inside the recess 83a for housing the leaf spring such that the concave curving section at the approximate center section thereof faces an inner surface of the outer slider member 81. Furthermore, by pressing an outer surface of the concave curving section of the leaf spring 85 against an inner surface of the outer slider member 81 with a prescribed elastic force, the inner slider member 83 constituting a part of the runner R is urged towards an inner surface of the guide rail 41. Accordingly, with this configuration, looseness and rattling of the slider 42 within the guide rail 41 is suppressed, and even in a case wherein variation occurs in the distance between the opposing inner surfaces of the guide rail 41, the slider 42 can slide in a stable manner inside the guide rail 41.

As shown in FIG. 27, the interlocking mechanism 40 comprises the second rotary member 49, the first rotary member 48, the first linking wire 51, and the spiral spring 500 as a member urging winding of the wire.

The second rotary member 49, the first rotary member 48, and the first linking wire 51 are configured as a transmission mechanism capable of moving the slider 42 towards the front of the vehicle in response to an opening operation of the back door 4.

That is to say, the second rotary member 49 and the first rotary member 48 are disposed coaxially and connected so as to rotate in unison and are supported so as to be capable of rotation by the rotary member support case 47 at a central section of the guide rail 41 in the longitudinal direction thereof.

The second rotary member 49 is formed having a substantially disk-like shape and is configured so as to be capable of winding the second linking wire 53. The second linking wire 53 is a linear member capable of being wound, and an end section thereof is connected to the back door 4. When the back door 4 is opened, the end section of the second linking wire 53 is pulled towards an outer side of the opening of the cargo compartment T, and therefore, when the back door 4 is closed, the second linking wire 53 becomes excessively long. Furthermore, the other end of the second linking wire 53 is connected to the second rotary member 49, and the second rotary member 49 is capable of winding the excess length of the second linking wire 53 occurring due to closing of the back door 4. It should be noted that the second linking wire 53 is provided so as to pass through a pillar forming a part of the trunk side lower trim 13 of the cargo compartment T.

The first rotary member 48 is configured so as to be capable of rotating interlocked with the second rotary member 49. Although, in this embodiment, the second rotary member 49 is configured so as to rotate in unison with the first rotary member 48 as a result of connection as one with the first rotary member 48 in a coaxial manner, the second rotary member 49 may be separately supported so as to be capable of rotation and configured so as to be capable of rotating in unison via a gear or endless annular belt, etc.

In this embodiment, the first linking wire 51 comprises a pair of wires. One of the wires is wound around and connected to the first pulley 45, supported so as to be capable of rotating freely at an end of the guide rail 41, and the other wire is wound around and connected to the second pulley 46, supported so as to be capable of rotating freely at the other end of the guide rail 41. Furthermore, each of the end sections of the first linking wire 51 passes through a side of the guide rail 41 and is wound around the first rotary member 48 at the central section of the guide rail 41 in the longitudinal direction thereof, and in addition, each of the other end sections thereof passes through the guide rail 41 and is connected to and fixed to one of the support end members 81b of the slider 42, respectively. Upon rotation of the first rotary member 48, the first linking wire 51 moves so as to rotate around the guide rail 41 interlocked with the rotation, and the slider 42 is pulled pursuant to this rotation and moves along the guide rail 41. It should be noted that this configuration can also be realized with the first linking wire 51 comprising a single wire.

A coil spring S (equivalent to the spring 55 of FIG. 11) is assembled into one of the pulley support cases 43, 44 housing the first pulley 45 and the second pulley 46, respectively, as a member urging the first pulley 45 and the second pulley 46 apart. In specific terms, as shown in FIGS. 28A to 28C, the pulley support case 44 comprises a pulley mounting member 38p fixed to one end of the guide rail 41, a pulley support member 38q supporting the second pulley 46 so as to be capable of rotating freely and mounted on the pulley mounting member 38p so as to be capable of moving freely in the longitudinal direction of the guide rail 41, and a coil spring S urging the pulley support member 38q away from the pulley mounting member 38p. The first pulley 45 and the second pulley 46 are urged apart by the coil spring S.

As a result, the first linking wire 51 can be easily wound around the first pulley 45 and the second pulley 46 by moving the first pulley 45 and the second pulley 46 closer together against the urging force of the coil spring S. Furthermore, as the first pulley 45 and the second pulley 46 are urged apart by the urging force of the coil spring S after winding of the first linking wire 51 around the first pulley 45 and the second pulley 46, error, etc. of the first pulley 45 and the second pulley 46 and of the first linking wire 51 is absorbed, and when the first linking wire 51 is pulled out to the extended condition, slipping between the first linking wire 51 and the first rotary member 48 is eliminated and transmission efficiency therebetween is improved.

The spiral spring 500 is configured so as to store an urging force for urging the second linking wire 53 in the winding direction and the slider 42 towards the rear of the guide rail 41 as the second linking wire 53 is pulled out of the second rotary member 49 and the second rotary member 49 rotates in response to an opening operation of the back door 4. An inner periphery end section of the spiral spring 500 is fixed to a central shaft member of the second rotary member 49, and an outer periphery end section of the spiral spring 500 is fixed to the rotary member support case 47. When the second rotary member 49 rotates so as to allow the second linking wire 53 to be pulled out, the slider 42 is moved towards the front of the vehicle 1 interlocked with the rotation thereof, and the spiral spring 500 is elastically deformed so as to become compressed and store a rotation force in a direction of reaction, or in other words, an urging force acting to move the slider 42 towards the rear of the vehicle 1. Furthermore, when the back door 4 is closed, the stored force is released, the second linking wire 53 is wound due to the second rotary member 49 being rotated in the direction of reaction, and in addition, the slider 42 is moved towards the rear of the vehicle due to the first rotary member 48 being rotated in the same direction in an interlocked manner.

It should be noted that a gap between an outermost peripheral section of the second rotary member 49 and an inner peripheral surface of the rotary member support case 47 enclosing the second rotary member 49 is set so as to be half the size of a diameter of the second linking wire 53 or smaller. Furthermore, a gap between an outermost peripheral section of the first rotary member 48 and an inner peripheral surface of the rotary member support case 47 enclosing the first rotary member 48 is set so as to be half the size of a diameter of the first linking wire 51 or smaller. As a result thereof, detachment of the second linking wire 53 and the first linking wire 51 from the second rotary member 49 and the first rotary member 48, respectively, is prevented upon winding, etc. thereof by the second rotary member 49 and the first rotary member 48, respectively.

It should be noted that, even in a condition wherein the back door 4 is closed, or in other words, a condition wherein the slider 42 has moved towards the rear of the vehicle and the front tonneau cover 20 is deployed having a planar shape, the spiral spring 500 is elastically deformed so as to be compressed, and therefore, the spiral spring 500 urges the second rotary member 49 in the direction of winding of the second linking wire 53 and urges the first rotary member 48 in the direction of motion of the slider 42 towards the rear of the guide rail 41.

In the interlocking mechanism 40 for the tonneau cover according to this embodiment of the present invention, the second rotary member 49 and the first rotary member 48 are rotated and the slider 42 is moved towards the front of the vehicle 1 due to pulling of the second linking wire 53 in line with an opening operation of the back door 4. Furthermore, the second rotary member 49 and the first rotary member 48 are rotated in an opposite direction to the above-mentioned direction, the second linking wire 53 is wound, and in addition, the slider 42 is moved towards the rear of the vehicle 1 by the urging force of the spiral spring 500 due to a closing operation of the back door 4.

It should be noted that, upon motion of the slider 42 along the guide rail 41 towards the rear thereof, a weight of the slider 42 and a weight of the front tonneau cover 20, etc. act on the slider 42. Accordingly, the urging force generated by the spiral spring 500 is set with the above weights taken into consideration so as to be capable of deploying the front tonneau cover 20. When the above weights are taken into consideration, the urging force required of the spiral spring 500 does not need to be set particularly high.

It should be noted that an end section of the second linking wire 53 is connected to and fixed to the back door 4 via the linking member 52.

The linking member 52 comprises a long first bracket 372, a third bracket 373, and a spring member 374 acting as an urging member (see FIGS. 13 and 17A to 17D) and is connected to and fixed to the back door 4 via a door-side connecting section 52b mounted on and fixed to the back door 4.

The long first bracket 372, the third bracket 373, and the spring member 374 function as a wire feed section.

The third bracket 373 is configured having rod-like section and a head section having a larger diameter than that of the rod-like section and disposed at an end thereof, and furthermore, an end of the second linking wire 53 is connected to and fixed to the other end of the third bracket 373. Furthermore, a spring member 374 is fitted onto the rod-like section of the third bracket 373. The first bracket 372 is formed having a hollow case-like shape, and in the interior thereof, the third bracket 373 is provided so as to be capable of moving and the spring member 374 is provided so as to be capable of compression and expansion. When the second linking wire 53 is pulled, the spring member 374 is compressed and the second linking wire 53 is pulled out of the linking member 52 by a degree corresponding to the amount of compression thereof. Furthermore, when the pulling force of the second linking wire 53 is released, the spring member 374 expands, and the second linking wire 53 is pulled back into the linking member 52 by a degree corresponding to the amount of expansion thereof. In addition, the door-side fixing member (i.e., the clip member 76, etc. of FIG. 13) is configured so as to be capable of being mounted on and fixed to the back door 4 using a screw, etc., and the linking member 52 is connected to the back door 4 via the door-side connecting section 52b by engaging an end of the first bracket 372 with the door-side connecting section 52b.

Accordingly, the second linking wire 53 is fed from the linking member 52 in accordance with an actual maximum degree of opening of the back door 4.

It should be noted that a configuration facilitating feeding and returning of the second linking wire 53 is not limited to that explained above. For example, the configuration may be such that an end section of a coil spring on a back door 4 side thereof is connected to the first bracket 372, the other end of the coil spring connected to the second linking wire 53, and the second linking wire 53 is fed as a result of extension of the coil spring and returned as a result of compression of the coil spring.

It is preferable that the configuration of this embodiment be set such that, as shown in FIG. 17A, by compressing and expanding the spring member 374 to a suitable length at the upper and lower limits of the designed opening and closing range of the back door 4, the third bracket 373 is positioned at approximately the center of the range of motion thereof within the first bracket 372. By setting the configuration in this way, in a case wherein the actual opening and closing range of the back door 4 is larger than the designed opening and closing range (for example, by +5° as shown in FIG. 17B), the second linking wire 53 can be pulled out to compensate for insufficiency in the length thereof by compressing the spring member 374. Meanwhile, in a case wherein the actual opening and closing range of the back door 4 is smaller than the designed opening and closing range (for example, by −5° as shown in FIG. 17D), the second linking wire 53 can be drawn in to eliminate excess in the length thereof by expanding the spring member 374. In this case, excess length of the second linking wire 53 occurring upon closing of the back door 4 can be preferentially drawn in by the linking member 52 or preferentially wound by the second rotary member 49. Selection of the linking member 52 or the second rotary member 49 to function preferentially in this case can be performed arbitrarily using the urging force of the spring member 374 or of the spiral spring 500.

Overall Operation

An overall operation of a tonneau cover device 10 configured in this way is explained hereinafter.

Figure 29A:
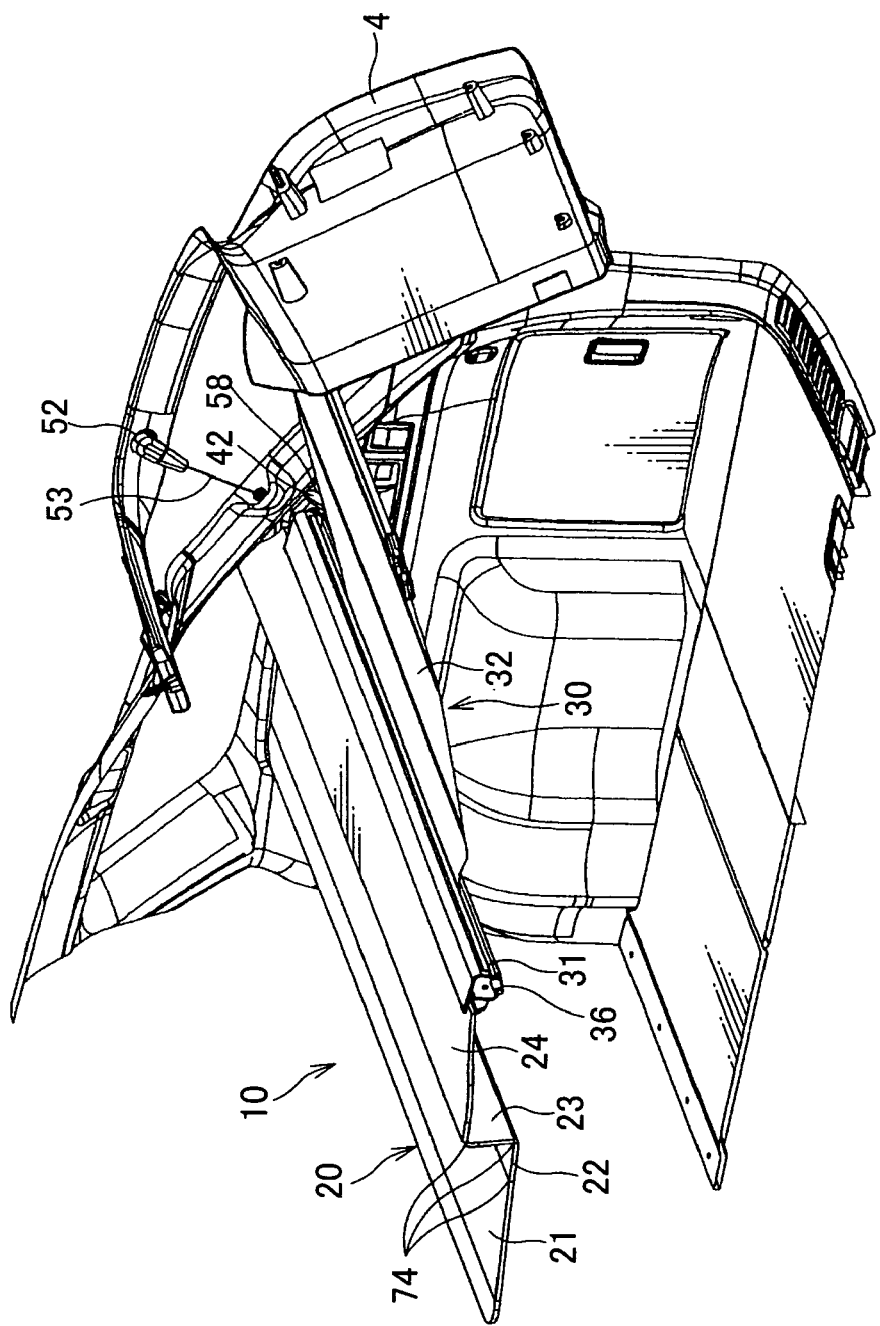
FIG. 29A is a perspective view showing a condition wherein the back door has opened through rotation by approximately 30° from a closed position.
Figure 31A:
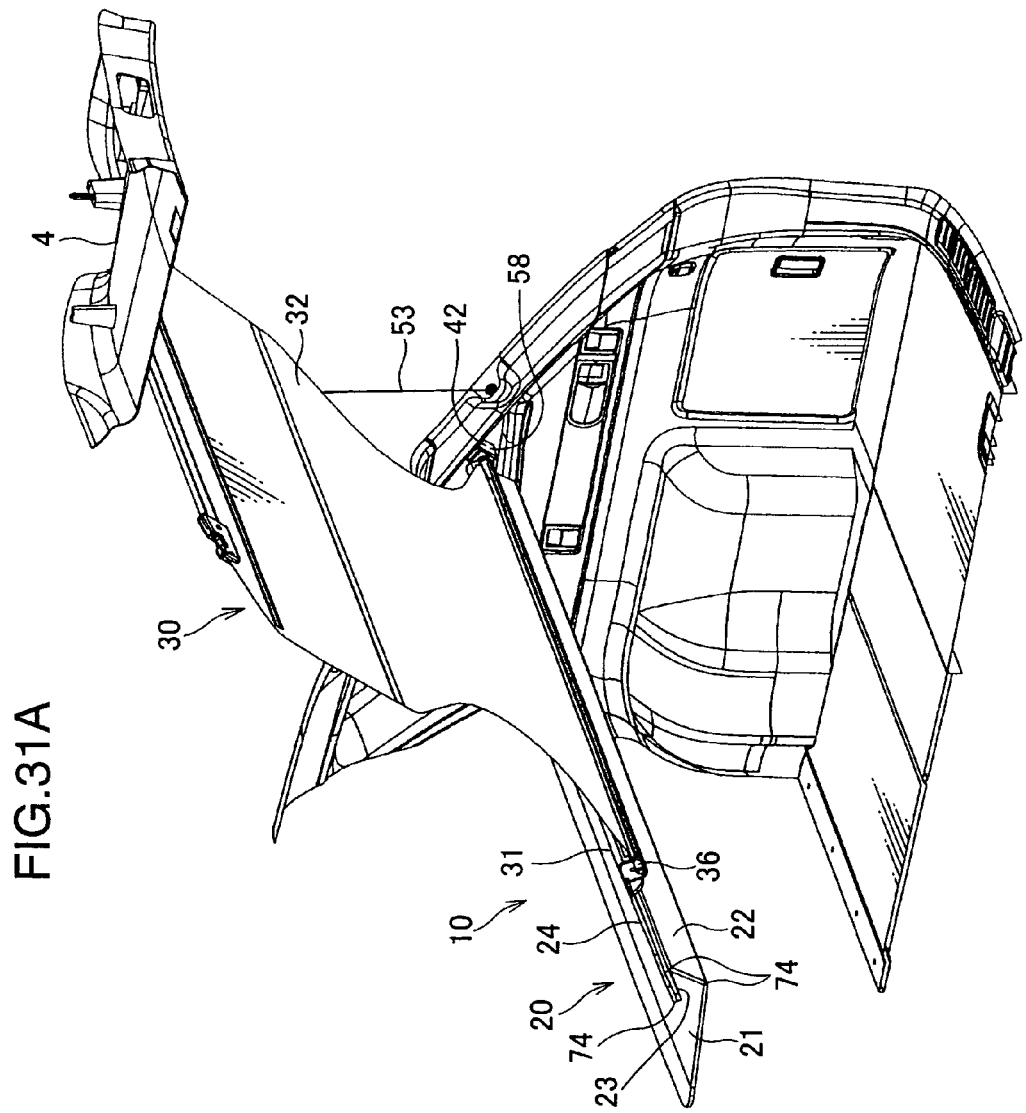
FIG. 31A is a perspective view showing a condition wherein the back door is fully opened.

FIG. 29A is a perspective view showing a condition wherein the back door 4 has opened due to rotation by approximately 30° about a hinge from a closed position, FIG. 29B is a side view showing the same condition, FIG. 30A is a perspective view showing a condition wherein the back door 4 has opened due to rotation by approximately 60° about a hinge from the closed position, FIG. 30B is a side view showing the same condition, FIG. 31A is a perspective view showing a condition wherein the back door 4 has fully opened due to rotation by approximately 90° about a hinge from the closed position, and FIG. 31B is a side view showing the same condition.

First of all, in a condition wherein the back door 4 is closed, the slider 42 is positioned at the rear end of the guide rail 41 as shown in FIG. 28A, and the front tonneau cover 20 is deployed having a planar shape so as to cover the top of the cargo compartment T. Furthermore, the rear tonneau cover 30 is extended at the rear of the front tonneau cover 20 so as to cover the top of the cargo compartment T. The second linking wire 53 is wound around the second rotary member 49. Even in this initial condition, furthermore, the outer slider member 81 of the slider 42 is urged towards the rear of the guide rail 41 against the urging force of the coil spring 84 by an initial urging force of the spiral spring 500, and the inner slider member 83 is positioned at an approximate center section between the pair of support end members 81b (see FIG. 28A). In this initial condition, the slider 42 is urged towards the rear. Looseness and rattling of the slider 42 and the front tonneau cover 20 are suppressed by the corresponding urging force. It should be noted that the configuration is set such that the inner slider member 83 is positioned at an initial position in this condition.

In this condition, furthermore, when the back door 4 is opened due to an operation of a user, etc., the second linking wire 53 is pulled out from the second rotary member 49 as shown in FIGS. 28B and 29B, and the second rotary member 49 and the first rotary member 48 rotate pursuant to the pulling out. As a result thereof, the first linking wire 51 rotates around the first pulley 45 and the second pulley 46 and the slider 42 moves towards the front of the vehicle 1 along the guide rail 41. Consequently, the slider 42, the rear end section of the front tonneau cover 20 connected to and fixed to the slider 42, and the winding unit 31 of the rear tonneau cover 30 move forward and are raised up from the initial positions thereof. As a result, the front tonneau cover 20 bends at the bending sections 74 between the rear board members 22, 23, 24. As the rear end section of the front tonneau cover 20 moves forward while being raised upwards at this time, the front tonneau cover 20 can be bent smoothly and with a relatively small force so as to position the rear section thereof above the front section thereof. In addition, the sheet member 32 of the rear tonneau cover 30 is gradually pulled out from the winding unit 31.

When the back door 4 opens widely, the second linking wire 53 is pulled out by a larges degree and the slider 42 moves further towards the front of the vehicle 1 along the guide rail 41 as shown in FIGS. 28C, 31A, and 31B. Consequently, the rear end section of the front tonneau cover 20 and the winding unit 31 of the rear tonneau cover 30 move forwards and are further raised up. As a result, the front tonneau cover 20 bends further by a larges degree at the bending sections 74 between the rear board members 22, 23, 24 and is folded to form a substantial Z shape. In addition, the sheet member 32 of the rear tonneau cover 30 is further pulled out from the winding unit 31.

It should be noted that, in a condition wherein the slider 42 has moved to a central section of the guide rail 41 in a longitudinal direction thereof as shown in FIG. 28B, positional restriction of the holder member 58 and the inner slider member 83 by the stopper member 59 (or limiting member 59) is released, and therefore, the inner slider member 83 is urged towards the rear support end member 81*b* by the urging force of the coil spring 84.

When the back door 4 opens fully, the second linking wire 53 is pulled out by a larges degree and the slider 42 moves along the guide rail 41 to the front position thereof in the longitudinal direction of the vehicle 1 as shown in FIGS. 28C, 31A and 31B. Consequently, the rear end section of the front tonneau cover 20 and the winding unit 31 of the rear tonneau cover 30 move forwards and are further raised up. As a result, the front tonneau cover 20 also bends from the above-explained condition at the bending section 74 between the front board member 21 and the board member 22 disposed to the rear thereof, and the front tonneau cover 20 folds with the rear section thereof above the front section thereof, opening the top of the cargo compartment T, and in particular, the top rear section thereof. In addition, the rear tonneau cover 30 is further pulled out from the winding unit 31.

Consequently, the user becomes able to access the cargo compartment T from the top rear section thereof and can load and unload cargo onto and from the cargo compartment T.

It should be noted that, in this condition, the front tonneau cover 20 can rotate around the tonneau-cover hinge unit 27 on the front side thereof and the rear section thereof can be lifted upward. Therefore, the upper area of the cargo compartment T can be opened wider, and as a result, loading and unloading of cargo onto and from the cargo compartment T can be performed more smoothly.

Furthermore, in this condition, the rear end section of the front tonneau cover 20 rises to the upper end section of each of the pair of guide rails 41. As the front tonneau cover 20 is bent in a plurality of locations, the uppermost edge section thereof is disposed in a considerably lower position than that of conventional tonneau covers that are folded in two. Accordingly, sufficient space can be provided between the rear end section, that is, the uppermost edge section of the front tonneau cover 20 and the ceiling of the cargo compartment T. Therefore, if the front end of the sheet member 32 is released from the back door 4, the space between the front tonneau cover 20 and the ceiling of the cargo compartment T can be used to easily pass cargo between the rear seat and the opening of the cargo compartment T.

When the back door 4 is closed from the above-explained condition, the force stored in the spiral spring 500 is released and the second rotary member 49 and the first rotary member 48 are rotated by the urging force of the spiral spring 500. Furthermore, the second linking wire 53 is wound by the rotation of the second rotary member 49. As a result of the rotation of the first rotary member 48, the first linking wire 51 is moved in an orbiting path around the first pulley 45 and the second pulley 46, and the slider 42 moves towards the rear of the vehicle 1 along the guide rail 41. Consequently, the slider 42, the rear end section of the front tonneau cover 20 connected to and fixed to the slider 42, and the winding unit 31 of the rear tonneau cover 30 move downwards and rearwards. When the slider 42 reaches the rear end position of the guide rail 41, the front tonneau cover 20 returns to the above-explained initial condition, deployed having a planar shape so as to cover the top of the cargo compartment T.

Furthermore, in a case wherein, as a result of error in production or assembly, etc., the slider 42 reaches the frontmost position of the guide rail 41 and stops before the back door 4 is fully opened, the second linking wire 53 is pulled out from the linking member 52 by a small degree. As a result of this, even in a condition wherein the slider 42 is disposed at the frontmost position of the guide rail 41, the back door 4 can be further opened to a fully opened condition. That is to say, if the length dimension of the second linking wire 53 in a condition wherein the slider 42 has stopped at the frontmost position of the guide rail 41 and the length dimension of the second linking wire 53 required in the condition wherein the back door 4 is fully opened are not equal, the difference thereof can be absorbed.

It should be noted that, in this condition, the outer slider member 81 of the slider 42 returns to a condition of being urged towards the rear of the guide rail 41 against the urging force of the coil spring 84 by an initial urging force of the spiral spring 500. That is to say, in a condition wherein the holder member 58 and the inner slider member 83 of the slider 42 are stopped at the rear end section position of the guide rail 41, the outer slider member 81 can be moved further towards the rear of the vehicle 1 while compressing the coil spring 84 by the spiral spring 500 and the second rotary member 49 and the first rotary member 48 can be rotated. As a result thereof, in a condition wherein the back door 4 is closed and the runner R (that is, the holder member 58 and the inner slider member 83) of the slider 42 is stopped, the second linking wire 53 can be further wound. Consequently, if the length dimension of the second linking wire 53 in a condition wherein the runner R has stopped at the rear position and the length dimension of the second linking wire 53 suitably applied for the back door 4 to be fully closed are not equal, the difference thereof can be absorbed.

With a tonneau cover device 10 configured as explained above, the slider 42 moves towards the front of the vehicle 1 upon opening of the back door 4 in response to the opening operation. As a result of this, the rear section of the front tonneau cover 20 is folded above the front section thereof, opening the top of the cargo compartment T. As each of the pair of guide rails 41 is inclined upwards and towards the front of the vehicle 1, the rear end section of the front tonneau cover 20 is also raised towards the front of the vehicle while being folded on to the top of the front section of the front tonneau cover 20 at this time, and therefore, the front tonneau cover 20 can be bent smoothly from the deployed condition to realize an open condition at the top of the cargo compartment T.

If the bending section 74 is positioned above the front board members 21, 22, 23, the plurality of board members 21, 22, 23, 24 can be easily folded. It should be noted that, as the rear end section of the front tonneau cover 20 is raised towards the front of the vehicle 1 while being folded onto the top of the front section of the front tonneau cover 20 as explained above, positioning thereof above the bending section 74 is rare or non-existent. As a result thereof, the front tonneau cover 20 can be made flatter, improving appearance.

Furthermore, when the back door 4 is closed, the slider 42 is moved towards the rear of the vehicle 1 by the spiral spring 500 of the interlocking mechanism 40 for the tonneau cover, the front tonneau cover 20 is deployed having a planar shape, and the top of the cargo compartment T can be covered.

As the second linking wire 53 is wound up by, and housed within, the second rotary member 49 at this time, hanging down of the second linking wire 53 can be prevented, eliminating noise as a result of contact thereof with other members and improving the appearance of the interior of the passenger compartment.

Furthermore, as the front of the front tonneau cover 20 is supported via the hinge unit 27 so as to be capable of rotating freely, the top of the cargo compartment T can be opened wider by rotating the rear section of the front tonneau cover 20 so as to lift up the rear section. As a result thereof, visibility inside the cargo compartment T can be improved and the loading and unloading of cargo can be performed easily.

Furthermore, an urging force is stored in the spiral spring 500 due to an opening operation of the back door 4, and the urging force can be used to urge the second rotary member 49 in the direction of winding of the second linking wire 53 and to urge the slider 42 towards the rear of the guide rail 41. Consequently, when the back door 4 performs a closing operation, the second linking wire 53 can be wound and stored and the slider 42 can be moved towards the rear of the guide rail 41 so as to deploy the front tonneau cover 20 covering the top of the cargo compartment T.

As the second rotary member 49 and the first rotary member 48 are disposed coaxially, the rotation of the second rotary member 49 and the first rotary member 48 can be interlocked using a simple and compact configuration.

The spiral spring 500 urges the slider 42 towards the rear of the guide rail 41 even in a condition wherein the front tonneau cover 20 is deployed having a planar shape, and therefore, looseness and rattling of the slider 42 and the front tonneau cover 20 when the front tonneau cover 20 is in the deployed state can be effectively suppressed.

With a tonneau cover device 10 configured as explained above, in a condition wherein the front tonneau cover 20 is fully deployed so as to fully cover the cargo compartment T and the runner R is stopped and in contact with the stopper member 59, the outer slider member 81 is moved relative to the runner R towards the rear of the vehicle 1 by the urging force of the spiral spring 500 and the second rotary member 49 and the first rotary member 48 can be rotated. Furthermore, the second linking wire 53 is wound by the rotation of the second rotary member 49. As a result thereof, excess length of the second linking wire 53 can be eliminated so as to compensate for disparity between the angle of opening of the back door 4 and the pull-out length of the second linking wire 53, and the tonneau cover device 10 can be operated stably.

In cases wherein, upon opening of the back door 4, the pull-out length of the second linking wire 53 that can be pulled out from the second rotary member 49 is insufficient, the second linking wire 53 can be fed from the linking member 52. Consequently, disparity between the angle of opening of the back door 4 and the pull-out length of the second linking wire 53 can be absorbed, and the tonneau cover device 10 can be operated free of problems.

It should be noted that the operation shown in the above-described FIGS. 35B and 35C can also be performed in cases wherein assembly error occurs or the second linking wire 53 stretches during extended usage. Consequently, the tonneau cover device 10 can be used successfully over extended periods of time and durability can also be improved.

Variations

Hereinafter, variations of the first embodiment are explained.

First Variation

Figure 21:
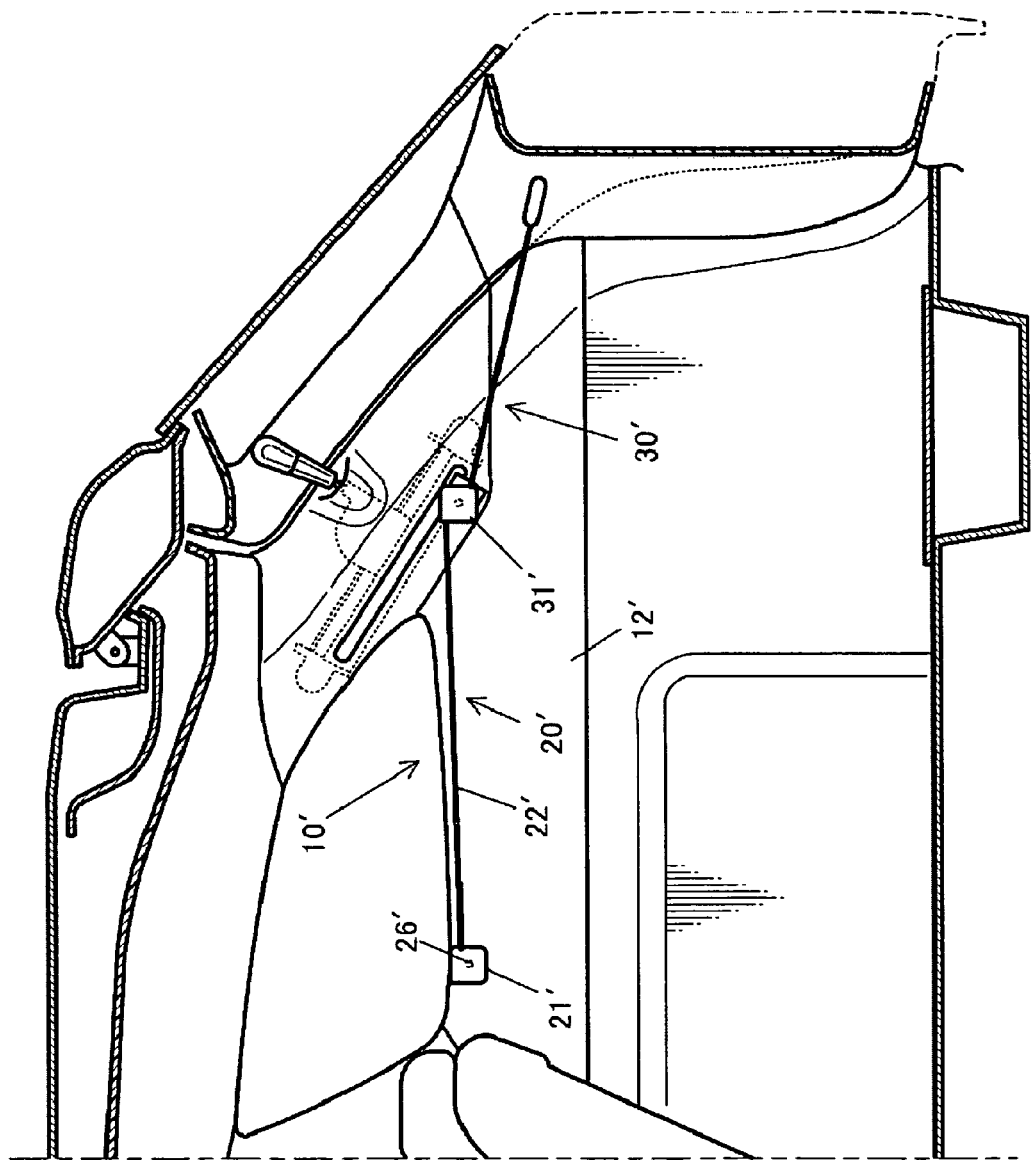
FIG. 21 is a view equivalent to FIG. 2 of a tonneau cover device according to another embodiment (i.e., a variation) of the present invention.

The front tonneau cover 20' is, as shown in FIG. 21, configured similar to the rear tonneau cover 30 of the above-explained first embodiment so as to be capable of being wound. The front tonneau cover 20' comprises a winding unit 21' and a sheet member 22', an engagement boss 26' is provided at each of the left and right edge sections of the winding unit 21', and the engagement bosses 26' are supported by the trunk side upper trim 12' so as to be capable of rotating. Meanwhile, a rear end section of the sheet member 22' is connected to a winding unit 31' of the rear tonneau cover 30'. With this configuration, when the back door 4 is opened, the winding unit 31' of the rear tonneau cover 30' moves upwards while the sheet member 22' of the front tonneau cover 20' is wound into the winding unit 21'. As the front tonneau cover 20' of this embodiment can also be wound, the tonneau cover device 10 can be made more compact when not needed.

Second Variation

FIG. 32 is a diagram illustrating a variation using a tonneau cover 170 comprising three divided board members 121, 122, 123 arranged in the longitudinal direction of the vehicle and capable of bending at bending sections 174 thereof. In such a case, when the slider 42 moves towards the front of the vehicle 1 in the same way as in the first embodiment, the tonneau cover 170 is folded to form a substantial Z shape with the rear section thereof disposed above the front section thereof. The top of the cargo compartment T can also be opened with a variation of this type.

Third Variation

Figure 33A:
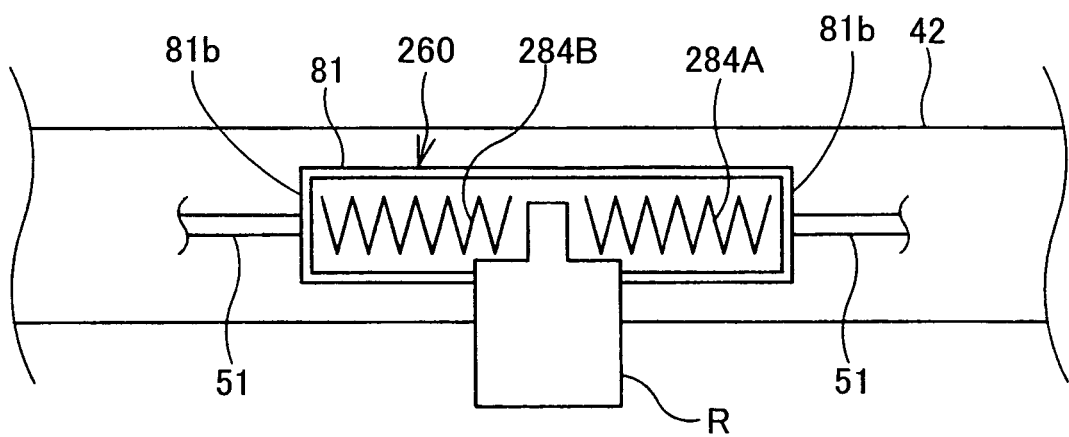
FIG. 33A is a diagram illustrating a guide rail and a slider of another variation.
Figure 33B:
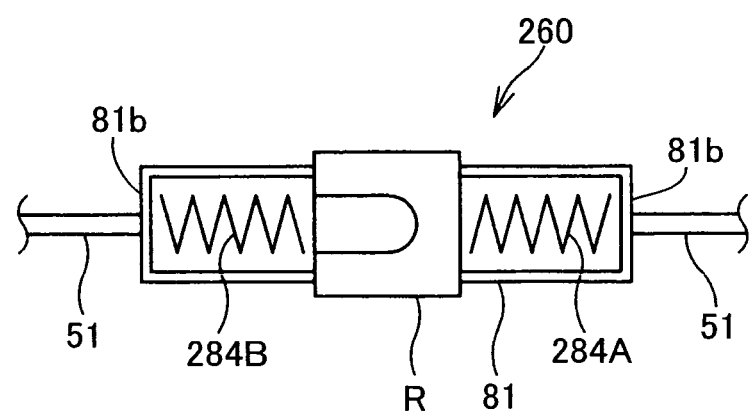
FIG. 33B is a diagram showing a slider of that version.
Figure 34A:
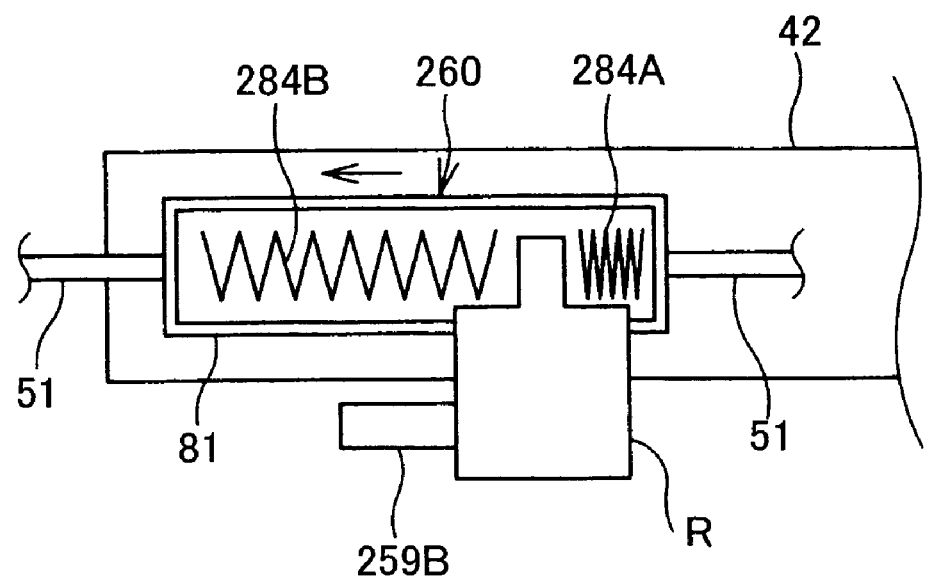
FIGS. 34A and 34B are diagrams showing an operation of the variation of FIGS. 33A and 33B.
Figure 34B:
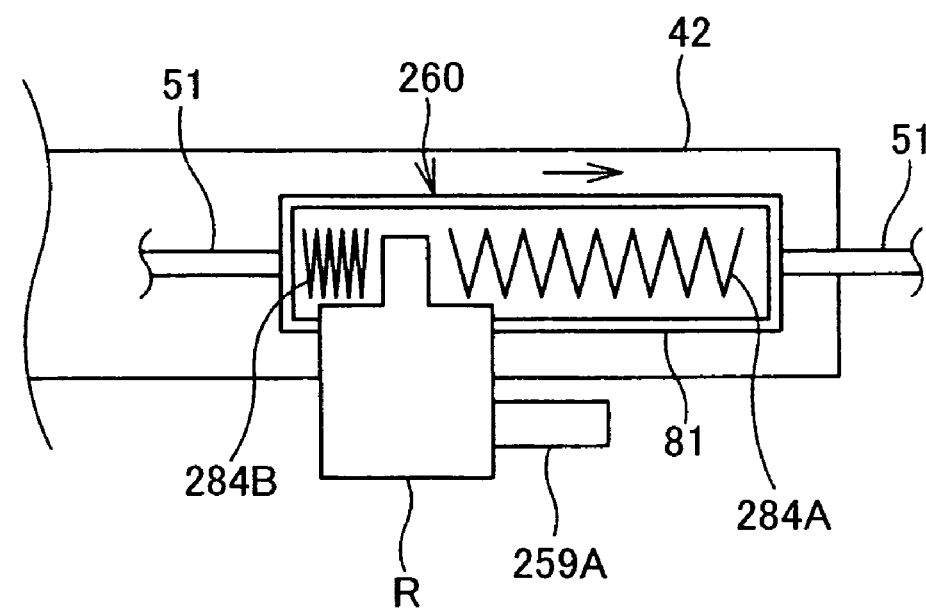

FIGS. 33A to 34B show a variation wherein one of two limiting pieces 259A and 259B is provided at each of the end sections of the guide rail 41 and the runner R is urged towards an initial position at the approximate center section of the outer slider member 81 by runner urging members. Specifically, FIG. 33A shows a condition wherein a slider section 260 is positioned in an approximate center section of the guide rail 41, FIG. 33B shows the slider section 260 viewed from one side, FIG. 34A shows a condition wherein the slider section 260 is positioned at the front end of the guide rail 41, and FIG. 34B shows a condition wherein the slider section 260 is positioned at the rear end of the guide rail 41. It should be noted that the slider section 260 and the guide rail 41 are presented conceptually in FIGS. 33A and 33B.

Although shown conceptually in the figures, the slider section 260 is, in principal, configured in the same way as the slider 42 of the above-explained first embodiment, and numerical references are assigned to the component parts thereof in an identical fashion. This variation differs in that two coil springs 284A, 284B are used as the runner urging members, one of the coil springs 284A, 284B is fitted onto each end of a shaft 82 (equivalent to the internal slider support member) so as to sandwich the runner R therebetween, each of the coil springs 284A, 284B is provided between the runner R and one of two support end sections 81b, and the coil springs 284A, 284B urge the runner R towards an initial position at an approximate center section between the support end sections 81b.

Furthermore, a limiting piece 259A similar to the stopper member 59 of the above-explained first embodiment is provided at the rear end of the guide rail 41, and a limiting piece 259B substantially identical to the limiting piece 259A (and in a substantially symmetrical position) is provided at the front end of the guide rail 41.

As shown in FIG. 33B and as explained with regard to the first embodiment, in a condition wherein the runner R has made contact with the limiting piece 259A and stopped upon closing of the back door 4, the second linking wire 53 can be wound by moving the outer slider member 81 further backwards.

Meanwhile, as shown in FIG. 34B, even in a case wherein when the back door 4 is being opened and the front tonneau cover 20 adopts the prescribed condition for opening the rear of the cargo compartment T just before the back door 4 is fully opened, the outer slider member 81 can move further forwards after the runner R has made contact with the limiting piece 259B and stopped. Accordingly, the back door 4 can be opened by pulling out the second linking wire 53 as the outer slider member 81 moves further forwards. With this configuration also, disparity between the angle of opening of the back door 4 and the pull-out length of the second linking wire 53 can be absorbed, and the tonneau cover device 10 can be operated as free of problems as possible.

It should be noted that the configuration may provide the limiting piece 259B only at the front end of the guide rail 41 in order to urge the runner R forwards with respect to the outer slider member 81.

Furthermore, the configuration for adjusting the length of the second linking wire 53 using the slider 42, the slider section 260, and the interlocking mechanism 40 for the tonneau cover and the configuration for adjusting the length of the second linking wire 53 using the linking member 52 can each function independently. In a case wherein both configurations are used at the same time, one thereof can be preferentially used to wind in or wind out, etc. the second linking wire 53. Selection of a configuration to function preferentially in this case can be performed arbitrarily using the urging force of the spring member 374 or of the spiral spring 500.

SUMMARY

In a vehicle comprising a back door covering the opening section on a rear surface thereof and capable of opening and closing and a cargo compartment floor extending forward from the opening section, a tonneau cover device according to a first aspect of the present invention comprises a tonneau cover deployed above the cargo compartment floor and separated therefrom and an interlocking means moving a rear end of the tonneau cover in a substantially vertical direction interlocked with opening and closing of the back door, the interlocking means comprising a pair of pulleys disposed separated in a vertical direction at each of the left and right sides of the cargo compartment, a first linking member wrapped around the pulleys and connected to the rear end of the tonneau cover, a rotating member wherearound the first linking member is wrapped or wound, and a second linking member having an end connected to the back door, having another end wrapped around and engaged with the rotating member, and rotating the rotating member interlocked with opening and closing of the back door.

With this first aspect of the present invention, when the back door opens and closes, the second linking member moves and the rotating member rotates interlocked with this motion. Consequently, the first linking member, wrapped around or wound around the rotating member and the pair of pulleys, rotates and the rear end of the tonneau cover, connected to the first linking member, moves in a substantially vertical direction.

In such a case, it is sufficient for the second linking member to rotate the rotating member interlocked with opening and closing of the back door, and therefore, the relationship between the motion direction of the second linking member and the positions of the pair of pulleys, etc. can be freely set. Accordingly, the positions of, for example, a connection section whereat the second linking member is connected to the back door, the rotating member, and the pair of pulleys can be freely set, or in other words, restrictions related to the shape of vehicle side surfaces such as, for example, the rear pillar can be eliminated and the degree of freedom in vehicle design can be enhanced.

In a tonneau cover device according to a second aspect of the present invention, the rotating member comprises a first rotating member wherearound the first linking member is wrapped or wound and a second rotating member wherearound the second linking member is wrapped and wherewith the second linking member is engaged, the first rotating member and the second rotating member disposed coaxially and rotating in unison.

With this second aspect of the present invention, as the rotating member comprises the first rotating member, wherearound the first linking member is wrapped or wound, and the second rotating member, wherearound the second linking member is wrapped and wherewith the second linking member is engaged, a diameter of the first rotating member and a diameter of the second rotating member may be different. Furthermore, as the first rotating member and the second rotating member are disposed coaxially and rotate in unison, a degree of motion of a linking section of the first linking member and the tonneau cover and a degree of pull-out of the second linking member from the second rotating member upon opening and closing of the back door may be different. In addition, by adjusting a ratio between a diameter of the first rotating member and the diameter of the second rotating member, the degree of motion of the linking section of the first linking member and the tonneau cover and the degree of pull-out of the second linking member from the second rotating member upon opening and closing of the back door can be freely and independently set. That is to say, possible angles of opening and closing, etc. of the back door can be freely set, irrespective of the degree of motion of the linking section. Furthermore, the relationship between, for example, a motion direction of the second linking member and positioning of the pair of pulleys, etc. and the shape, etc. of a rear pillar can be set arbitrarily, and possible angles of opening and closing, etc. of the back door can be freely set.

In a tonneau cover device according to a third aspect of the present invention, a guide rail defining a path of motion of the linking section of the tonneau cover and the first linking member is provided in a forward-inclined condition on the rear pillar.

With this third aspect of the present invention, as the guide rail defining the path of motion of the linking section of the tonneau cover and the first linking member constitutes a section of an interlocking means, slight movement to the front, back, left, and right of the rear end of the path of motion of the tonneau cover can be prevented. Furthermore, as the guide rail is provided on the rear pillar in a forward-inclined condition, the guide rail and the rear pillar can be designed in parallel in a case wherein the rear pillar is inclined forward.

In a tonneau cover device according to a fourth aspect of the present invention, the rear pillar comprises a pillar member and a pillar trim covering the pillar member, the guide rail is provided in a space between the pillar member and the pillar trim, and the rotating member is provided in a space between the front edges or the rear edges of the guide rail and the rear pillar trim.

With this fourth aspect of the present invention, in a case wherein the rear pillar comprises the pillar member and the pillar trim covering the pillar member and the guide rail is provided in a space between the pillar member and the pillar trim, as the rotating member is provided in a space between the front edges or the rear edges of the guide rail and the rear pillar trim, the rotating member can be positioned so as to make effective use of dead space inside the rear pillar.

In a tonneau cover device according to a fifth aspect of the present invention, the tonneau cover is supported at a front end thereof by the left and right sides of the cargo compartment, is divided in a longitudinal direction comprising a plurality of board members, and is connected so as to be capable of bending at intervals between adjacent board members.

With this fifth aspect of the present invention, as the tonneau cover is divided in a longitudinal direction comprising a plurality of board members, and is connected so as to be capable of bending at intervals between adjacent board members, in a case wherein the front end thereof is supported by the left and right sides of the cargo compartment, the rear end thereof is connected to the first linking member, and the back door is opened or closed, the tonneau cover folds in an interlocked manner therewith. Furthermore, appearance can be improved through the use of the board members.

In a tonneau cover device according to a sixth aspect of the present invention, the board members are connected so as to be capable of folding in an overlapped manner in a condition wherein one or both of the front support section and the rear linking section are disconnected.

With this sixth aspect of the present invention, as the board members are connected so as to be capable of folding in an overlapped manner in a condition wherein one or both of the front support section and the rear linking section are disconnected, the tonneau cover can be made compact when not needed.

In a tonneau cover device according to a seventh aspect of the present invention, the tonneau cover is supported at a front end thereof by the left and right sides of the cargo compartment and is configured as a sheet member so as to be capable of winding.

With this seventh aspect of the present invention, as the tonneau cover is supported at a front end thereof by the left and right sides of the cargo compartment and is configured as a sheet member so as to be capable of winding, the tonneau cover can be made compact when not needed.

In a tonneau cover device according to an eighth aspect of the present invention, a second tonneau cover having a front end thereof linked to the rear end of the tonneau cover, having a rear end thereof linked to the back door, and configured as a sheet member so as to be capable of winding is provided.

With this eighth aspect of the present invention, as a second tonneau cover having a front end thereof linked to the rear end of the tonneau cover and having a rear end thereof linked to the back door is provided, a space between the rear end of the tonneau cover and the back door can be favorably covered. Furthermore, as the second tonneau cover is configured as a sheet member so as to be capable of winding, even in a case wherein a distance between the linking section connecting with the rear end of the tonneau cover and the linking section connecting with the back door changes in line with opening or closing of the back door, the second tonneau cover can favorably adapt to this change.

In a tonneau cover device according to a ninth aspect of the present invention, the tonneau cover is configured so as to be capable of being removed from the vehicle.

With this ninth aspect of the present invention, as the tonneau cover is configured so as to be capable of being removed from the vehicle, the tonneau cover can be removed when not needed so as to enlarge the cargo compartment upwards.

In a tonneau cover device according to a tenth aspect of the present invention, an urging force storage member storing an urging force acting to move the rear end of the tonneau cover downwards upon an opening operation of the back door and releasing the stored urging force upon a closing operation of the back door so as to move the rear end of the tonneau cover downwards is provided.

With this tenth aspect of the present invention, when the back door is opened, a slider moves forward in response to the opening operation thereof. Consequently, the rear section of the tonneau cover is folded above the front section thereof, opening the top of the cargo compartment. As the pair of guide rails is mounted inclined upwards and towards the front of the vehicle in the longitudinal direction thereof, the rear end of the tonneau cover also moves upwards and towards the front of the vehicle at this time. Accordingly, as the rear of the tonneau cover is raised up, the rear of the tonneau cover can be folded onto the front thereof, and therefore, the tonneau cover can be smoothly folded from the deployed condition, opening the top of the cargo compartment.

Furthermore, the urging force storage member of the interlocking means for the tonneau cover can move the rear end of the tonneau cover towards the rear of the vehicle when the back door is closed. As a result thereof, the tonneau cover can be deployed having a planar shape covering the top of the cargo compartment.

In a tonneau cover device according to an eleventh aspect of the present invention, the second linking member is pulled out of the rotating member upon an opening operation of the back door, rotating the rotating member, and the urging force storage member stores an urging force acting so as to move the rotating member in a direction of winding the second linking member.

With this eleventh aspect of the present invention, an urging force is stored upon opening of the back door, and a force urging the second rotating member in the direction of winding the second linking member and urging the slider towards the rear end of the guide rail acts. Consequently, when the back door is closed, the second linking member is wound by the second rotating member, the slider is urged towards the rear end of the guide rail, and the tonneau cover is deployed so as to cover the top of the cargo compartment.

In a tonneau cover device according to a twelfth aspect of the present invention, even in a condition wherein the tonneau cover is deployed having a planar shape, the urging force storage member urges the rear end of the tonneau cover downward.

With this twelfth aspect of the present invention, as the urging force storage member urges the slider towards the rear end of the guide rail even in a condition wherein the tonneau cover is deployed having a planar shape, looseness and rattling of the tonneau cover in the deployed condition thereof can be suppressed.

A tonneau cover device according to a thirteenth aspect of the present invention comprises a pair of guide rails mounted on left and right side wall sections of the cargo compartment, respectively, having a component thereof oriented in the longitudinal direction of the vehicle and a pair of sliders capable of moving on the pair of guide rails; each slider comprising an outer slider connected to the first linking member, a runner supported by the outer slider so as to be capable of relative motion in a longitudinal direction of the guide rail, and a runner urging member urging the runner towards a prescribed initial position with respect to the outer slider in a longitudinal direction of the guide rail; comprises a stopper restricting a range of motion of the runner as a result of contact therewith at one or both of the end sections of the guide rail; and in a condition wherein the runner makes contact with and is stopped by the stopper, is capable of rotating the rotating member and winding in, winding out, or both winding in and winding out the second linking member by moving the outer slider relative to the runner.

With this thirteenth aspect of the present invention, in a condition wherein the tonneau cover either covers the cargo compartment or opens the top thereof and the runner makes contact with the stopper and stops, as the runner is moved related to the outer slider, the rotary member can be rotated so as to wind in or wind out the second linking member. Accordingly, insufficient or excess length or looseness of the second linking member can be eliminated.

In a tonneau cover device according to a fourteenth aspect of the present invention, an end section of the second linking member is connected to the back door via a wire feed section having an elastic member feeding the second linking member due to the back door being further opened from a condition wherein the runner is stopped at the front end of the guide rail and returning the second linking member due to the back door being closed from said condition.

With this fourteenth aspect of the present invention, the second linking member can be fed from the wire feed section in accordance with an opening degree of the back door. Accordingly, insufficient or excess length or looseness of the second linking member can be eliminated.

In a tonneau cover device according to a fifteenth aspect of the present invention, the end section of the second linking member is connected to the back door via a link release section releasing the condition of linking of the end section of the second linking member and the back door when a tensile force exceeding a prescribed value acts thereupon.

With this fifteenth aspect of the present invention, when the second linking member is pulled out by a considerable degree and a large tensile force acts due to, for example, catching of the second linking member against members in the vicinity thereof upon opening of the back door, the linking condition of the second linking member and the back door is released, allowing the back door to open widely, and even in such a case, therefore, the second linking member is not damaged.

In a tonneau cover device according to a sixteenth aspect of the present invention, the slider comprises a runner-slide urging member urging the runner towards the guide rail.

With this sixteenth aspect of the present invention, as the runner is urged towards the guide rail by the runner-slide urging member, looseness and rattling of the slider inside the guide rail can be suppressed and the slider slides stably with respect to the guide rail.

In a tonneau cover device according to a seventeenth aspect of the present invention, a pulley urging member urging the two pulleys apart is also provided.

With this seventeenth aspect of the present invention, as the two pulleys can be moved closer together in order that the first linking wire can be easily wrapped around the pulleys and the first linking wire is placed in a state of tension by the urging force applied to the pulleys, assembly error can be absorbed and transmission efficiency between the first linking wire and the first rotating member can be improved.

In a tonneau cover device according to an eighteenth aspect of the present invention, a housing member housing the first rotating member and the second rotating member is also provided, an interval between an outer peripheral section of the first rotating member and the housing member is no more than one half the diameter of the first linking member wound around the first rotating member, and an interval between the second rotating member and the housing member is no more than one half the diameter of the second linking member wound around the second rotating member.

With this eighteenth aspect of the present invention, dislocation of the first linking member and the second linking member from the first rotating member and the second rotating member, respectively, can be prevented.

In a tonneau cover device according to a nineteenth aspect of the present invention, the rotating member is provided between the pair of pulleys. Moreover, in a tonneau cover device according to a twentieth aspect of the present invention, the rotating member is provided in concentrically with one of the pulleys.

This application is based on Japanese Patent Application Serial Nos. 2007-227639, 2007-234040, 2007-233970, filed in Japan Patent Office on Sep. 3, 2007, Sep. 10, 2007, and Sep. 10, 2007, respectively, the contents of which are hereby incorporated by reference.

Although the present invention has been fully described by way of example with reference to the accompanying drawings, it is to be understood that various changes and modifications will be apparent to those skilled in the art. Therefore, unless otherwise, such changes and modifications depart from the scope of the present invention hereinafter defined, they should be construed as being included therein.

What is claimed is:

1. A first tonneau cover device for a vehicle having a back door capable of opening and closing and covering an opening section at a rear surface of a chassis thereof, comprising:
   a first tonneau cover disposed above, and separated from, a floor of a cargo compartment extending forward from the opening section;
   interlocking means moving a rear end of the first tonneau cover in a substantially vertical direction interlocked with opening and closing of the back door, wherein the interlocking means includes:
      a pair of pulleys disposed separated in a substantially vertical direction at each of the left and right sides of the cargo compartment;
      a first linking member wrapped around the pulleys and connected to the rear end of the first tonneau cover;
      a rotating member interlocked with and connected to the first linking member; and
      a second linking member having an end connected to the back door, having another end connected to the rotating member, and rotating the rotating member interlocked with opening and closing of the back door; and
   a second tonneau cover configured as a sheet member so as to be capable of winding, wherein a front end of the second tonneau cover is linked to the rear end of the first tonneau cover, and a rear end of the second tonneau cover is linked to the back door.

2. The tonneau cover device according to claim 1, wherein the rotating member comprises a first rotating member wherearound the first linking member is wrapped and wherewith the first linking member is engaged and a second rotating member wherearound the second linking member is wrapped and wherewith the second linking member is engaged, and
   the first rotating member and the second rotating member are disposed coaxially and configured so as to rotate in unison.

3. The tonneau cover device according to claim 1, further comprising a guide rail defining a path of motion of a linking section of the first tonneau cover and the first linking member, wherein the guide rail is provided in a forward-inclined state on a rear pillar of the vehicle.

4. The tonneau cover device according to claim 3,
   wherein the rear pillar comprises a pillar member and a pillar trim covering the pillar member,
   the guide rail is provided in a space between the pillar member and the pillar trim, and
   the rotating member is provided in a space between front edges or rear edges of the guide rail and the rear pillar trim.

5. The tonneau cover device according to claim 1, wherein the first tonneau cover is supported at a front end thereof by the left and right sides of the cargo compartment, is divided in a longitudinal direction comprising a plurality of board members, and is connected so as to be capable of bending at intervals between adjacent board members.

6. The tonneau cover device according to claim 5, wherein the board members of the first tonneau cover are connected so as to be capable of folding in an overlapped manner in a condition wherein one or both of the front support section and the rear linking section are disconnected.

7. The tonneau cover device according to claim 1, wherein the first tonneau cover is supported at a front end thereof by the left and right sides of the cargo compartment and is configured as a sheet member so as to be capable of winding.

8. The tonneau cover device according to claim 1, wherein the first tonneau cover is configured so as to be capable of being removed from the chassis.

9. The tonneau cover device according to claim 1, further comprising:
- a pair of guide rails provided on both side wall sections of the cargo compartment, respectively, having a component thereof oriented in the longitudinal direction of the vehicle; and
- a pair of sliders capable of moving on the pair of guide rails, wherein the sliders comprise an outer slider connected to the first linking member, a runner supported by the outer slider so as to be capable of relative motion in a longitudinal direction of the guide rails, and a runner urging member urging the runner towards a prescribed initial position with respect to the outer slider in the longitudinal direction of the guide rails,
- a stopper restricting a range of motion of the runner as a result of contact therewith is provided at one or both of both end sections of the guide rails, and
- in a condition wherein the runner makes contact with the stopper and stops, the outer slider can be moved relative to the runner so as to rotate the rotating member and to wind in, wind out, or both wind in and wind out the second linking member.

10. The tonneau cover device according to claim 9, wherein an end section of the second linking member is connected to the back door via a wire feed section having an elastic member feeding the second linking member due to the back door being further opened from a condition wherein the runner is stopped at the front end of the guide rails and returning the second linking member due to the back door being closed from said condition.

11. The tonneau cover device according to claim 9, wherein an end section of the second linking member is connected to the back door via a link release section releasing the condition of linking of the end section of the second linking member and the back door when a tensile force exceeding a prescribed value acts thereupon.

12. The tonneau cover device according to claim 9, further comprising a pulley urging member urging the two pulleys apart.

13. The tonneau cover device according to claim 9, further comprising a housing member housing a first rotating member and a second rotating member,
- wherein an interval between an outer peripheral section of the first rotating member and the housing member is no more than one half the size of a diameter of the first linking member wound around the first rotating member, and
- an interval between the second rotating member and the housing member is no more than one half the size of a diameter of the second linking member wound around the second rotating member.

14. The tonneau cover device according to claim 1, wherein said rotating member is provided between said pair of pulleys.

15. The tonneau cover device according to claim 1, wherein said rotating member is concentrically provided with one of said pair of pulleys.

16. A tonneau cover device for a vehicle having a back door capable of opening and closing and covering an opening section at a rear surface of a chassis thereof, comprising:
- a first tonneau cover disposed above, and separated from, a floor of a cargo compartment extending forward from the opening section; and
- interlocking means moving a rear end of the first tonneau cover in a substantially vertical direction interlocked with opening and closing of the back door,
- wherein the interlocking means includes:
  - a pair of pulleys disposed separated in a vertical direction at each of the left and right sides of the cargo compartment;
  - a first linking member wrapped around the pulleys and connected to the rear end of the first tonneau cover;
  - a rotating member interlocked with and connected to the first linking member between the pulleys; and
  - a second linking member having an end connected to the back door, having another end connected to the rotating member, and rotating the rotating member interlocked with opening and closing of the back door,
- wherein the first tonneau cover is supported at a front end thereof by the left and right sides of the cargo compartment, is divided in a longitudinal direction comprising a plurality of board members, and is connected so as to be capable of bending at intervals between adjacent board members, and
- the first tonneau cover device further comprising a second tonneau cover configured as a sheet member so as to be capable of winding, having a front end thereof linked to the rear end of the first tonneau cover and having a rear end thereof linked to the back door.

17. A tonneau cover device for a vehicle having a back door capable of opening and closing and covering an opening section at a rear surface of a chassis thereof, comprising:
- a first tonneau cover disposed above, and separated from, a floor of a cargo compartment extending forward from the opening section;
- a second tonneau cover configured as a sheet member so as to be capable of winding, the second tonneau cover having a front end linked to a rear end of the first tonneau cover, and having a rear end linked to the back door;
- an interlocking mechanism moving the rear end of the first tonneau cover and the front end of the second tonneau cover in a substantially vertical direction interlocked with opening and closing of the back door.

* * * * *